July 21, 1959     A. H. DICKINSON     2,895,672
ELECTRONIC MULTIPLYING SYSTEM
Filed Jan. 15, 1954     28 Sheets-Sheet 9

INVENTOR
ARTHUR H. DICKINSON
BY
ATTORNEYS

July 21, 1959

A. H. DICKINSON 2,895,672

ELECTRONIC MULTIPLYING SYSTEM

Filed Jan. 15, 1954

INVENTOR
ARTHUR H. DICKINSON
BY
ATTORNEYS

July 21, 1959  A. H. DICKINSON  2,895,672
ELECTRONIC MULTIPLYING SYSTEM
Filed Jan. 15, 1954

INVENTOR
ARTHUR H. DICKINSON

July 21, 1959 A. H. DICKINSON 2,895,672
ELECTRONIC MULTIPLYING SYSTEM
Filed Jan. 15, 1954 28 Sheets-Sheet 17

INVENTOR
ARTHUR H. DICKINSON
BY
Kenyon & Kenyon
ATTORNEYS

July 21, 1959     A. H. DICKINSON     2,895,672
ELECTRONIC MULTIPLYING SYSTEM
Filed Jan. 15, 1954     28 Sheets-Sheet 22

INVENTOR
ARTHUR H. DICKINSON
BY
ATTORNEYS

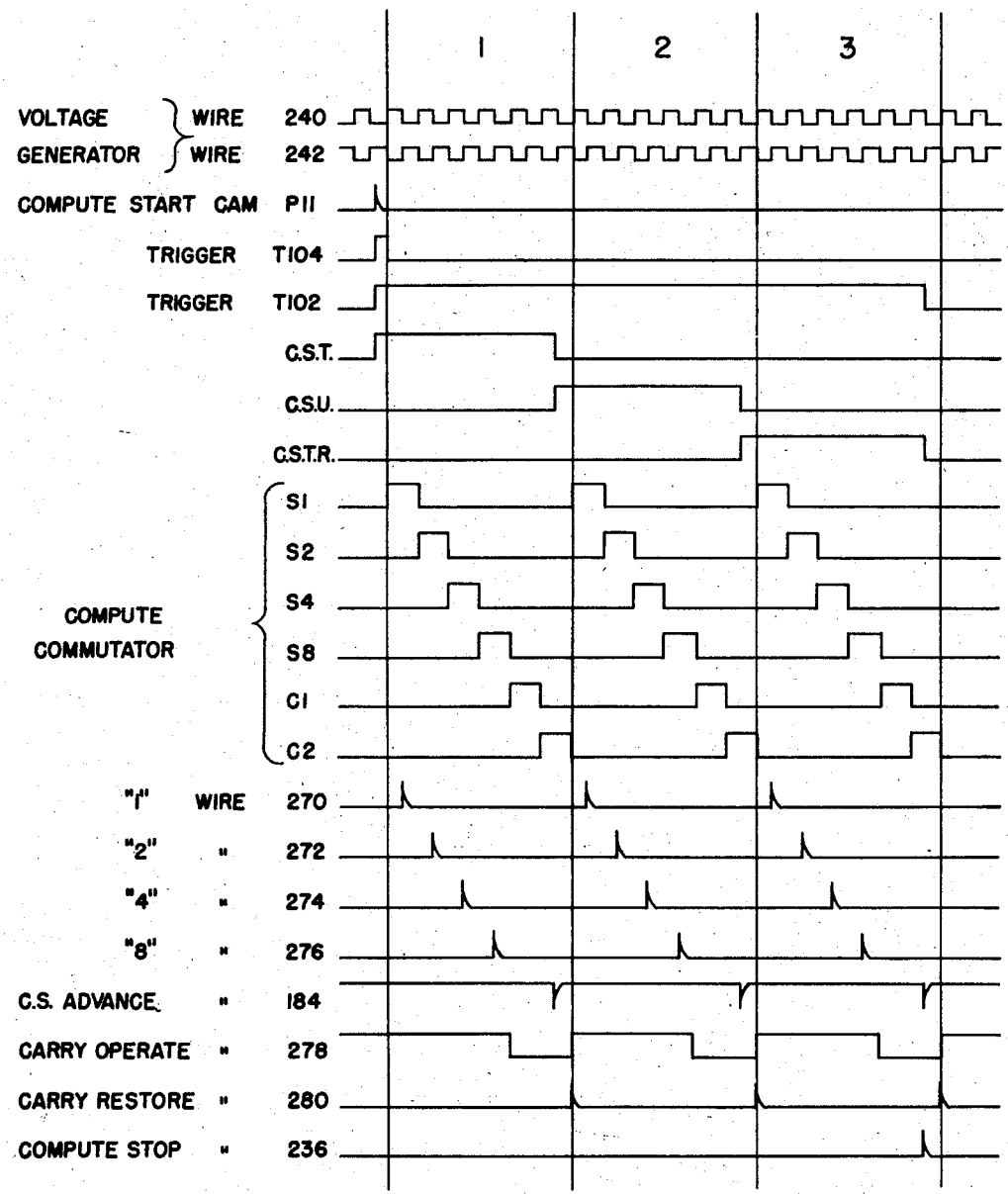

July 21, 1959

A. H. DICKINSON 2,895,672

ELECTRONIC MULTIPLYING SYSTEM

Filed Jan. 15, 1954

INVENTOR.
ARTHUR H. DICKINSON

BY

ATTORNEYS

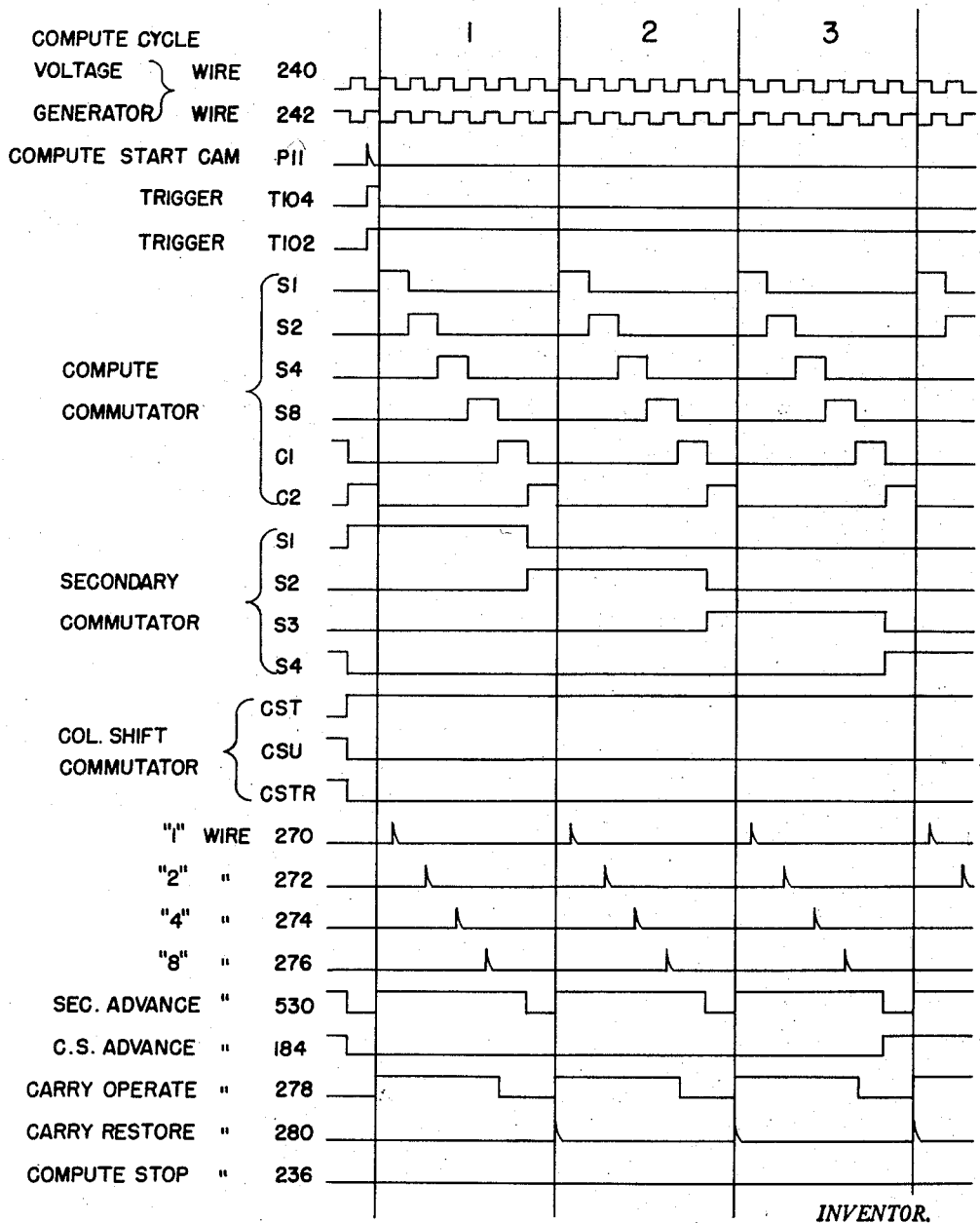
FIG. 7 ELECTRONIC TIMING DIAGRAM
INVENTOR.
ARTHUR H. DICKINSON

United States Patent Office 2,895,672
Patented July 21, 1959

2,895,672
ELECTRONIC MULTIPLYING SYSTEM

Arthur H. Dickinson, Greenwich, Conn., assignor to International Business Machines Corporation, New York, N.Y., a corporation of New York Application January 15, 1954, Serial No. 404,157

18 Claims. (Cl. 235—160)

The general object of this invention is to provide a multiplying system capable of computing results in a very short time and which is almost completely free of mechanical elements.

Multiplication in the system illustrated is accomplished purely electronically by the controlled flow of a cyclically repeated series of electric pulses, each pulse representing a value in a code of components which can be added selectively to form any digit. The pulses are first sent to nine gate groups (one group for each decimal digit). An electronic counter of the multiplier (MP) opens that gate group corresponding to the MP digit to be multiplied, and the opened gates let flow to an electronic counter of the multiplicand (MC) all pulses necessary to form the left-hand (LH) and right-hand (RH) components of the products of the MP digit by all possible MC quantities. An RH digit is the lower-order digit in a product formed by multiplying two digits together, and the LH digit is the higher-order digit of that product. For example, 9×3=27; the –7– is RH, and the –2– is LH. The MC electronic counter then filters out only those pulses required to form the LH and RH components of the product of the MC quantity and the MP digit which are to be multiplied.

All MC quantities are multiplied by one MP digit at a time. Gates shift the product (PR) pulses to proper order (units, hundreds, thousands, etc.) for each MP digit. Distributors then direct the PR pulses by code value into correspondingly valued counter tubes in final LH and RH accumulators which are pooled at the last instant.

Speed of operation comes about primarily because of the LH—RH components system combined with the lateral entry of the code values into the product accumulators. Additional time-saving is effected by a "zero analyzer" which prevents unnecessary operation of the apparatus if there is a zero in any one order of the MP.

The invention will be better understood from the several embodiments thereof described in the following text and shown in the drawings. In the drawings.

Fig. 3 is sub-divided into Figs. 3a through 3h, 3j, 3k, 3m, 3n, 3p and 3q through 3s which will complete a continuous drawing if laid down from left to right in that alphabetical order with adjacent sides abutting. It is a complete circuit diagram of the system including for the most part the electronic computing circuits but also showing schematically (Fig. 3a) some of the mechanical elements of Fig. 2.

Figure 4:
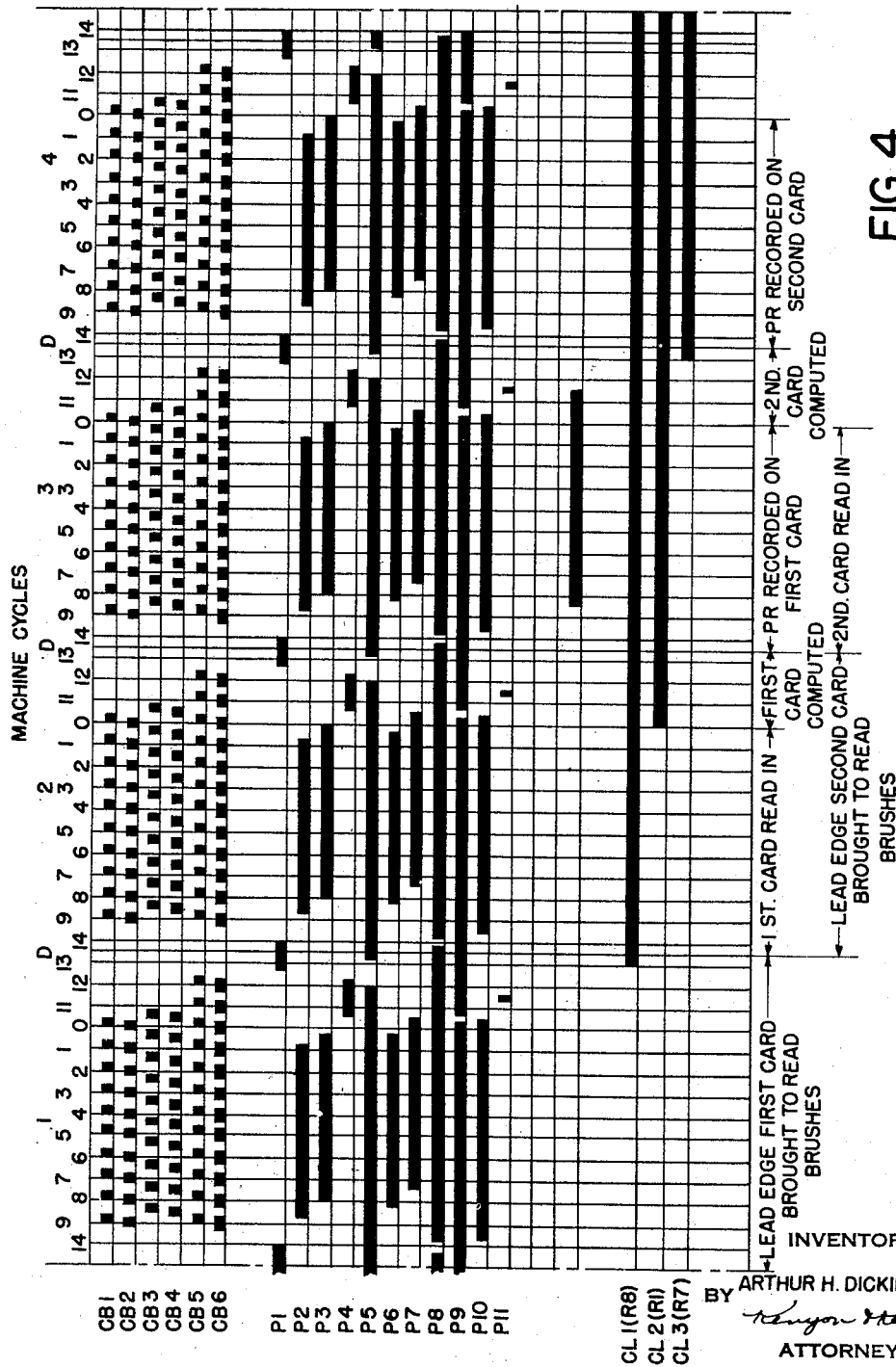
Figure 6A:
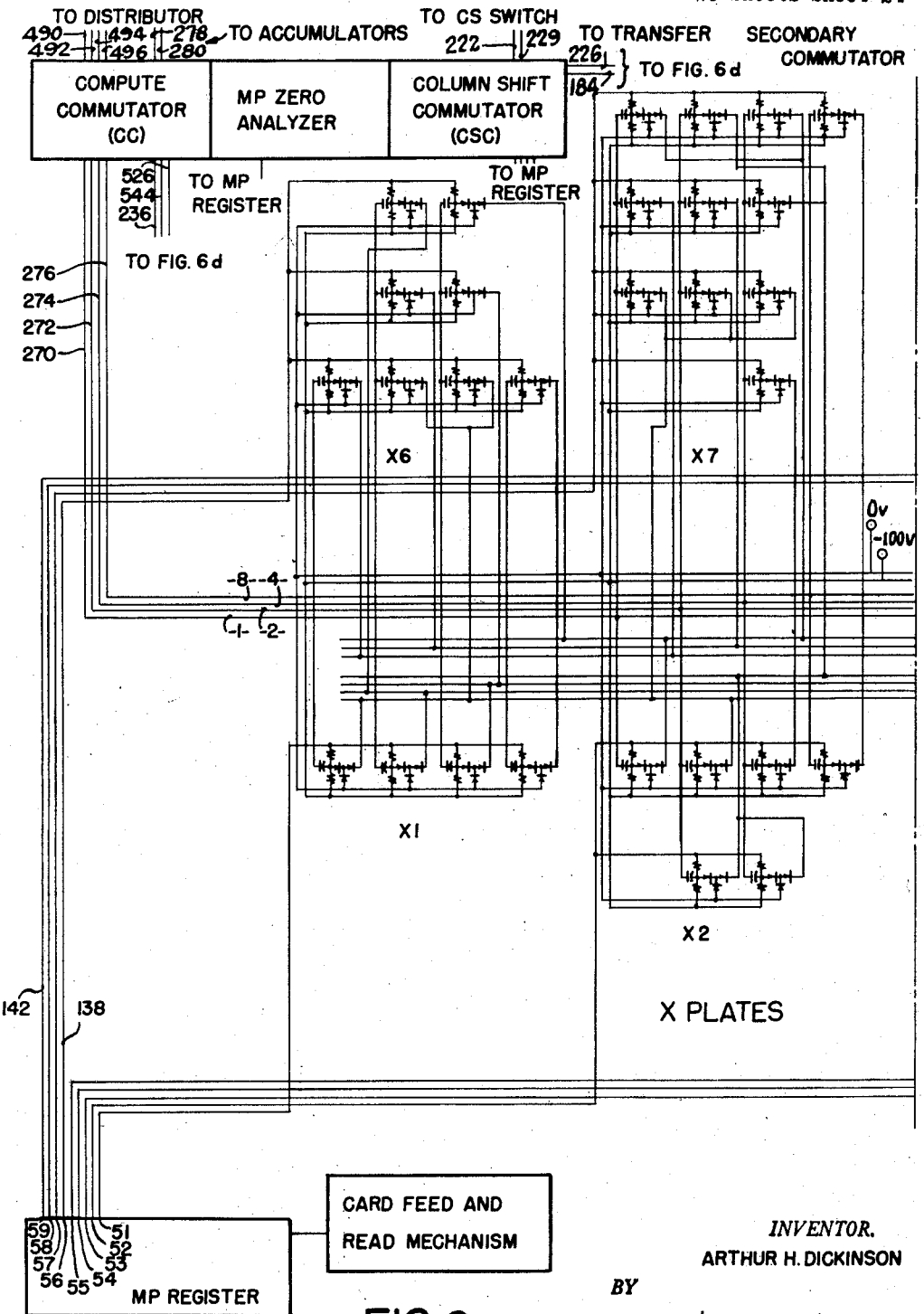
Figure 6B:
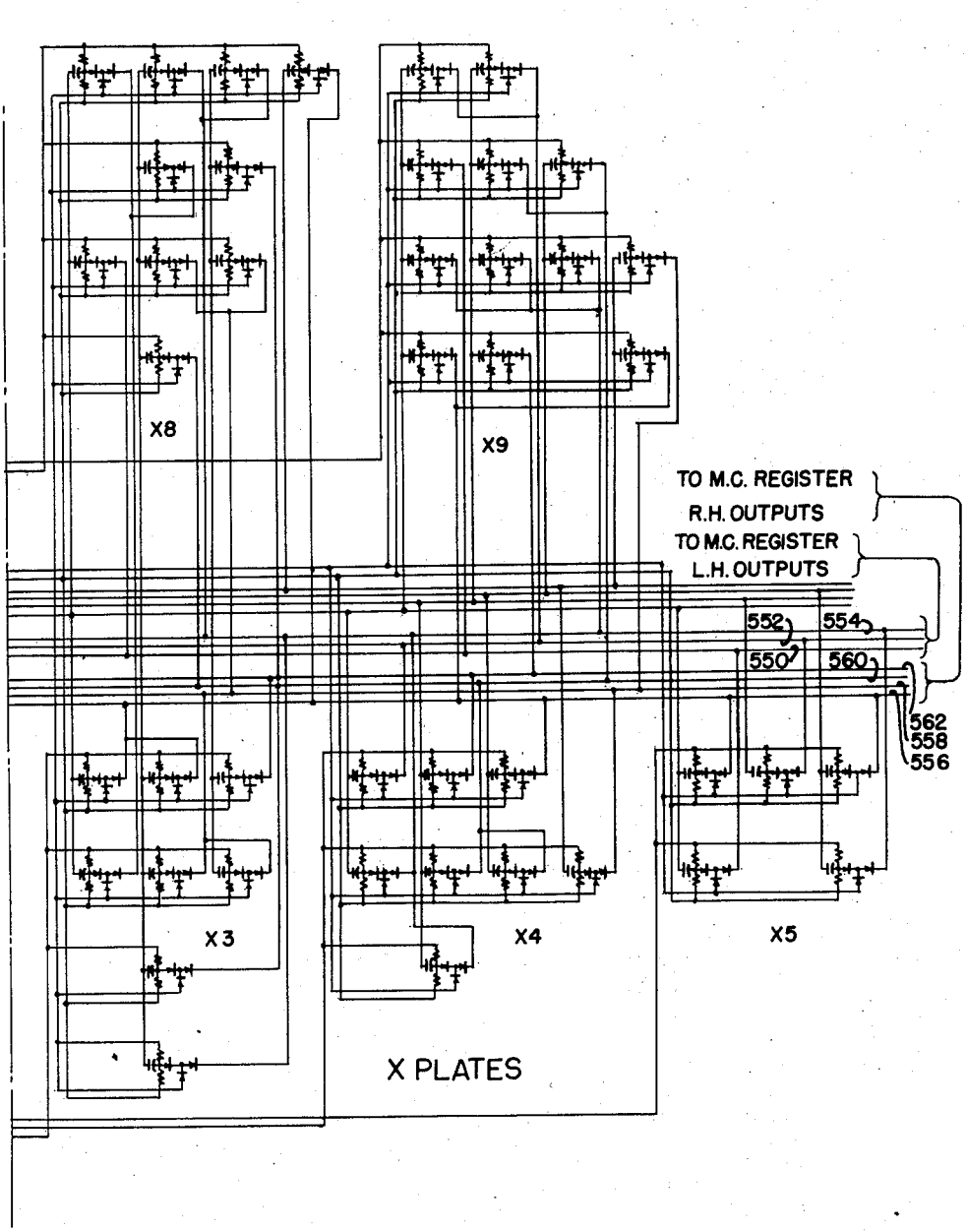
Figure 6C:
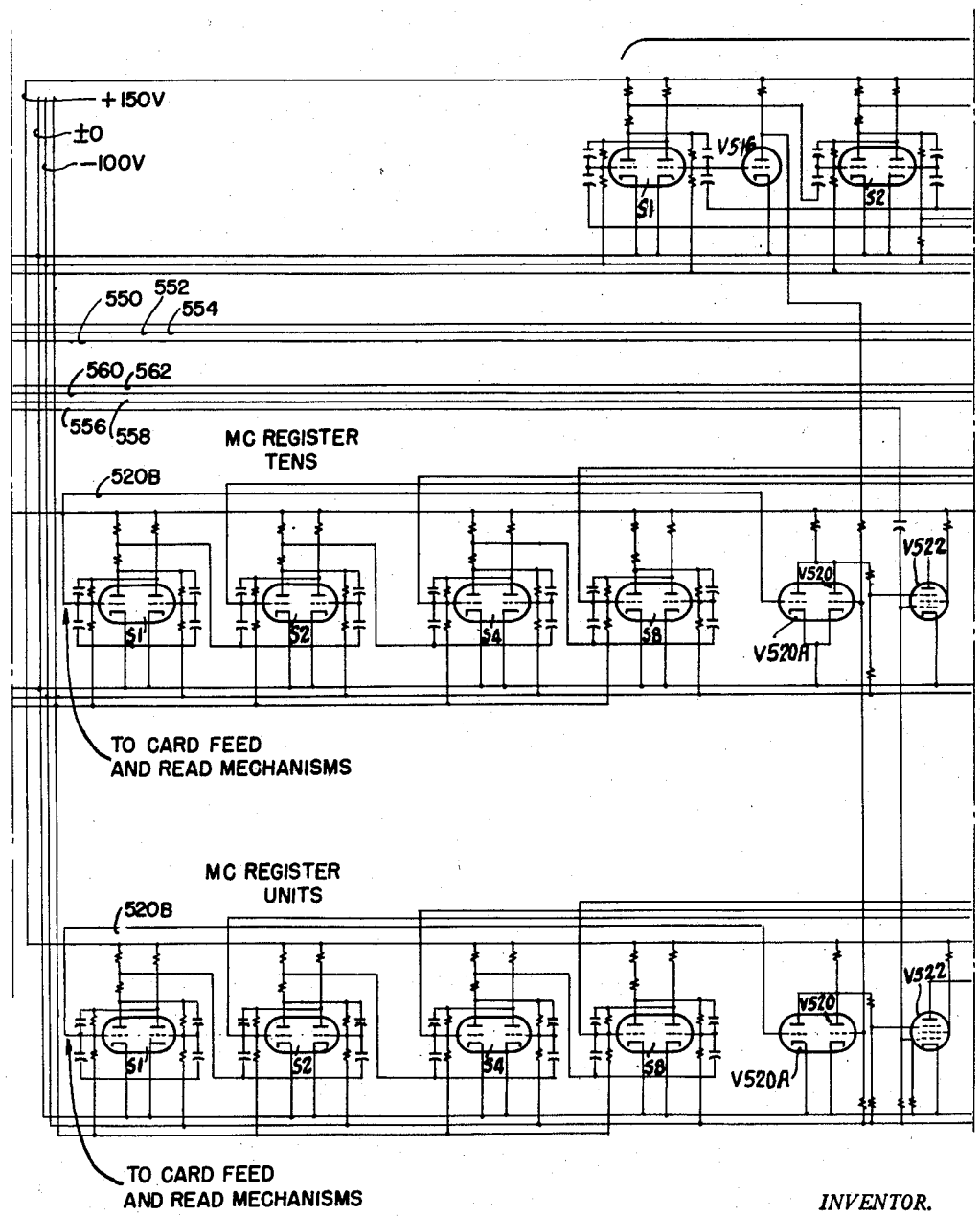
Figure 6D:
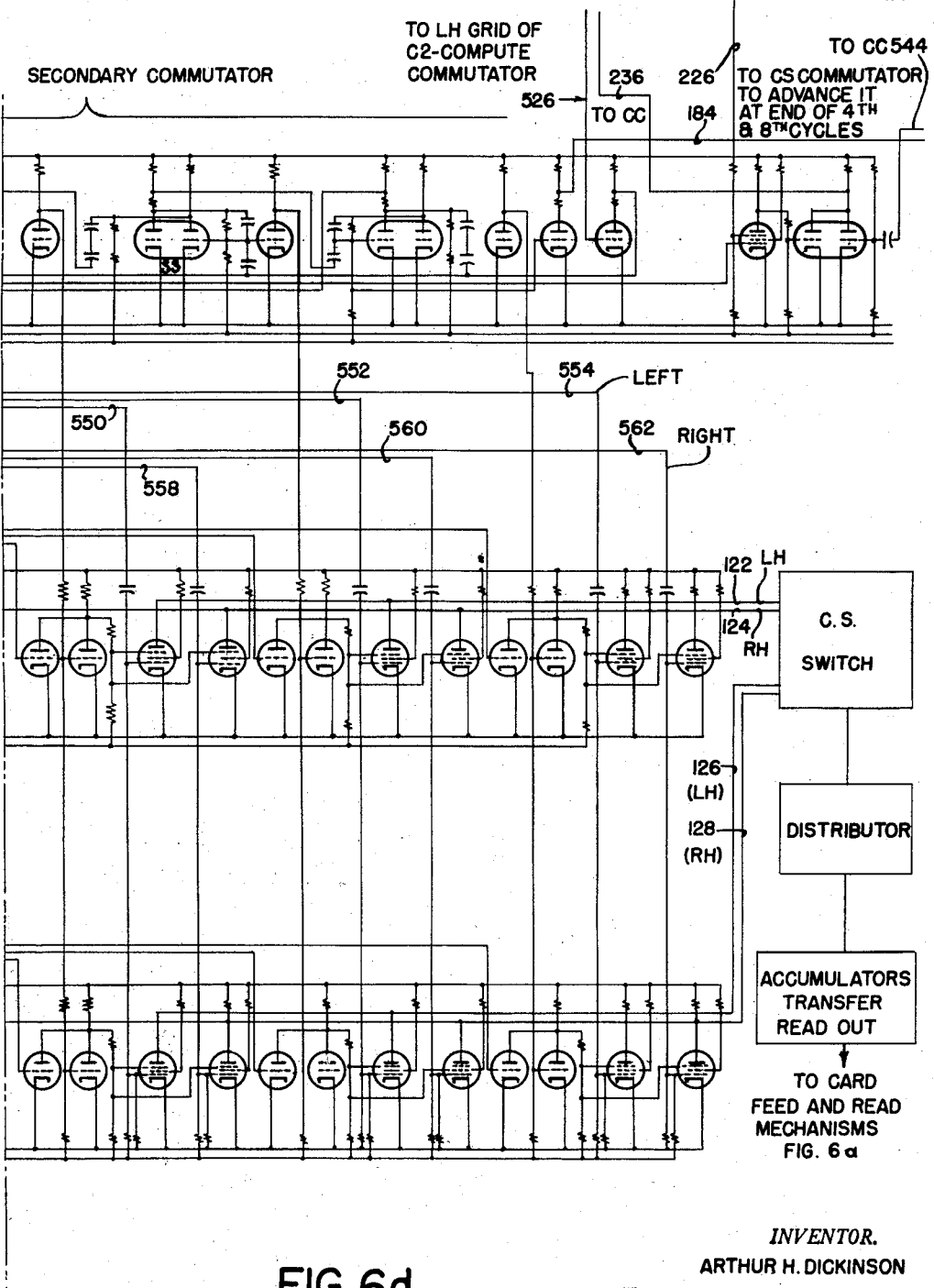

Fig. 4 is a mechanical timing diagram showing (in heavy black) the periods of closure of the various cams and contacts during the first four mechanical or machine cycles (the periods between the letters D and indicated by larger numerals). During these cycles, cards are moved from input to output hoppers between which the computing is accomplished and recorded—all in the indicated time relationships.

Fig. 5 is a complete electronic timing diagram.

Fig. 6, sub-divided alphabetically as 6a, 6b, 6c and 6d, illustrates a modification of the system of the preceding figures.

Fig. 7 is an electronic timing diagram of the modification corresponding to the Fig. 5.

The Fig. 1 is an attempt to facilitate the understanding of the complete system described in the remaining figures. To that end, Fig. 1 lacks many qualifying details which will, however, be supplied later in the more complete description of Fig. 3 after the general character and working inter-relationships of the system are understood.

Referring to Fig. 1, let it be assumed that means are available for moving the conventional record card 1 in the direction indicated by the arrows 2, so that each digit column 9 to 1 passes sensing or reading means in that order; and that the sensing or reading means establish a pulse corresponding to each digit in the MP and MC factors –83– and –91–, respectively. These pulses will occur chronologically in the sequence –9–8–3–1– along the lines 3, 4, 5 and 6 running to the MP and MC register groups. As an aid to exposition, we are going to assume throughout that the system is attempting to multiply the multiplicand 91 by the multiplier –83–.

The first job of the system is to make a record of these latter two numbers –91– and –83– from which the system can perform its various multiplying operations. This is done in the two register groups 7 and 8 for the MP and MC, respectively. Each of these comprises a ten stage electronic register or counter for the tens digits and a ten stage counter for the units digits. Each stage includes the familiar bistable double triode circuit, sometimes called "flip-flop" in which successive triggering pulses from a preceding stage cause the successive stage to shift its conduction from the right-hand to the left-hand triode, or vice versa. Any such stage or triode is said to be on when its right-hand triode is conducting and said to be off when its left-hand triode is conducting (this terminology is used throughout to describe the action of other bistable double-triode units, whether used for counting or other purposes). As is well understood, any series of pulses introduced into the input of such a ten stage register will cause the stages to go on and off progressively until the stage corresponding to the number of pulses is reached, and that is then left on. Thus, by the use of eight pulses, the MP register group will register the tens digit –8– in the S8 stage of its tens register; and by the use of three pulses, it will register the units digit –3– in the S3 stage of its units register. Similarly, nine pulses will place the tens digit –9– of the MC in S9 of the MC tens register; and one pulse will place its unit –1– in S1 of its units register.

The latter is accomplished in each case by applying at the input of each register a series of nine pulses from a common source 9, these nine pulses being synchronized with the passage of the digit positions –9– to –1– on the card 1 past the sensing means. However, these nine pulses do not enter the various registers to be counted unless a trigger 10 is first operated to permit them to enter the registers. If these triggers are not operated until most of the nine pulses have expired, the earlier of the nine pulses will not be counted; only those of the nine pulses which occur after the trigger 10 has been operated are counted. Thus, if the trigger 10 is not operated until five pulses have expired, then only the remaining four will be counted and the register will indicate the digit –4–. The triggers 10 are operated by pulses from the sensing or reading means coming over the wires 3, 4, 5 and 6, those pulses being generated by the movement past the sensing means of the familiar card perforations 11 corresponding to the digits of the MP –83– and the MC –91–.

Thus, since the MC tens perforation will actuate its trigger 10 shortly before the first of the nine pulses, all nine pulses will proceed through the register to be counted by the energization of the right-hand triode of the ninth stage, designated S9. The ten stages in the registers are designated S0 to S9, but for clarity for exposition, only the on stages for the operation of multiplying –83– by –91– are shown in the Fig. 1. Next, the MP tens trigger 10 will be operated by the MP tens perforation 11 shortly after the expiration of the first of the nine pulses, so that the remaining eight will be counted in the MP tens register to leave the right-hand triode of the S8 stage on. In a like manner, the MP units column on the card 1 will next actuate MP units trigger 10 in time to permit the last three of the nine pulses to enter the MP units register to be counted on S3; and finally the MC units perforation will permit the entry of the last of the nine pulses to enter the MC units register to be counted on S1.

Accordingly, we now have the situation where the multiplier is recorded by the on status of S8 in the MP tens register and S3 in the MP units register, while the multiplicand is recorded by the on status of S9 in MC tens register and the on status of S1 in the MC units register. It remains to cause these on stages to control the multiplication in the remaining parts of the system.

This will be accomplished in three computing cycles readily visualized from compute commutator 12. In the first cycle, the MP tens register will take its tens digit –8– and operate on the entire multiplicand –91–. In the second cycle, the MP units digit –3– will operate similarly on the entire MC –91–. The third cycle will take care of a transfer operation which combines the LH and RH columns in the final calculation. These multiplications 80×91 and 3×91 are accomplished basically by a plurality of code pulse channeling networks, hereinafter referred to as multiplying plates (× plates) which form the necessary left-hand (LH) and right-hand (RH) components. An important feature of the system is the way in which use is made of the binary code or bits –1–2–4–8– in handling the LH and RH components in the × plates and elsewhere.

Figure 1A:
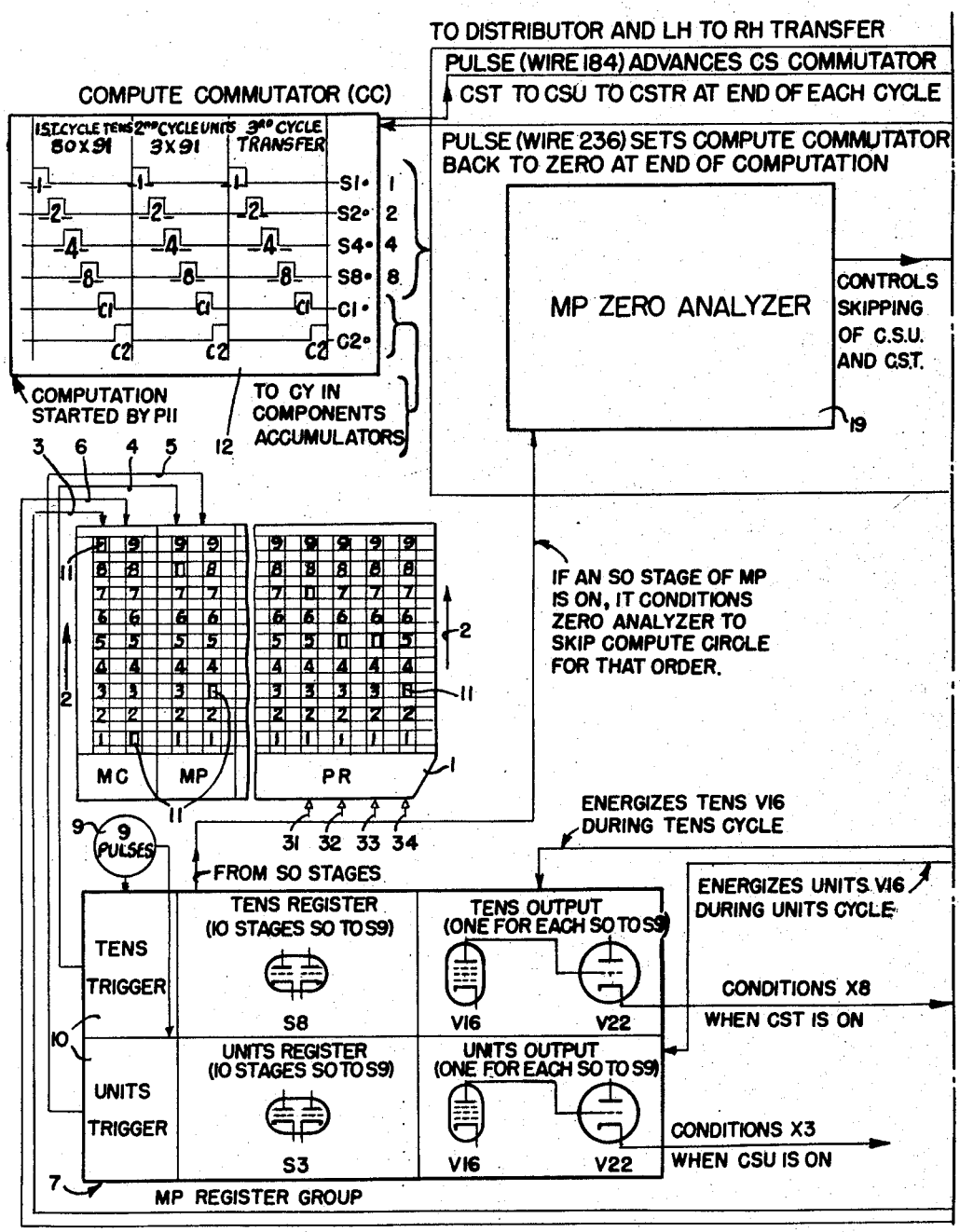
Fig. 1 is a schematic, functional layout of the entire system; it has alphabetical sub-divisions 1a, b, c and d which will complete a continuous drawing if laid down from left to right in alphabetical order with adjacent sides abutting.
Figure 1B:
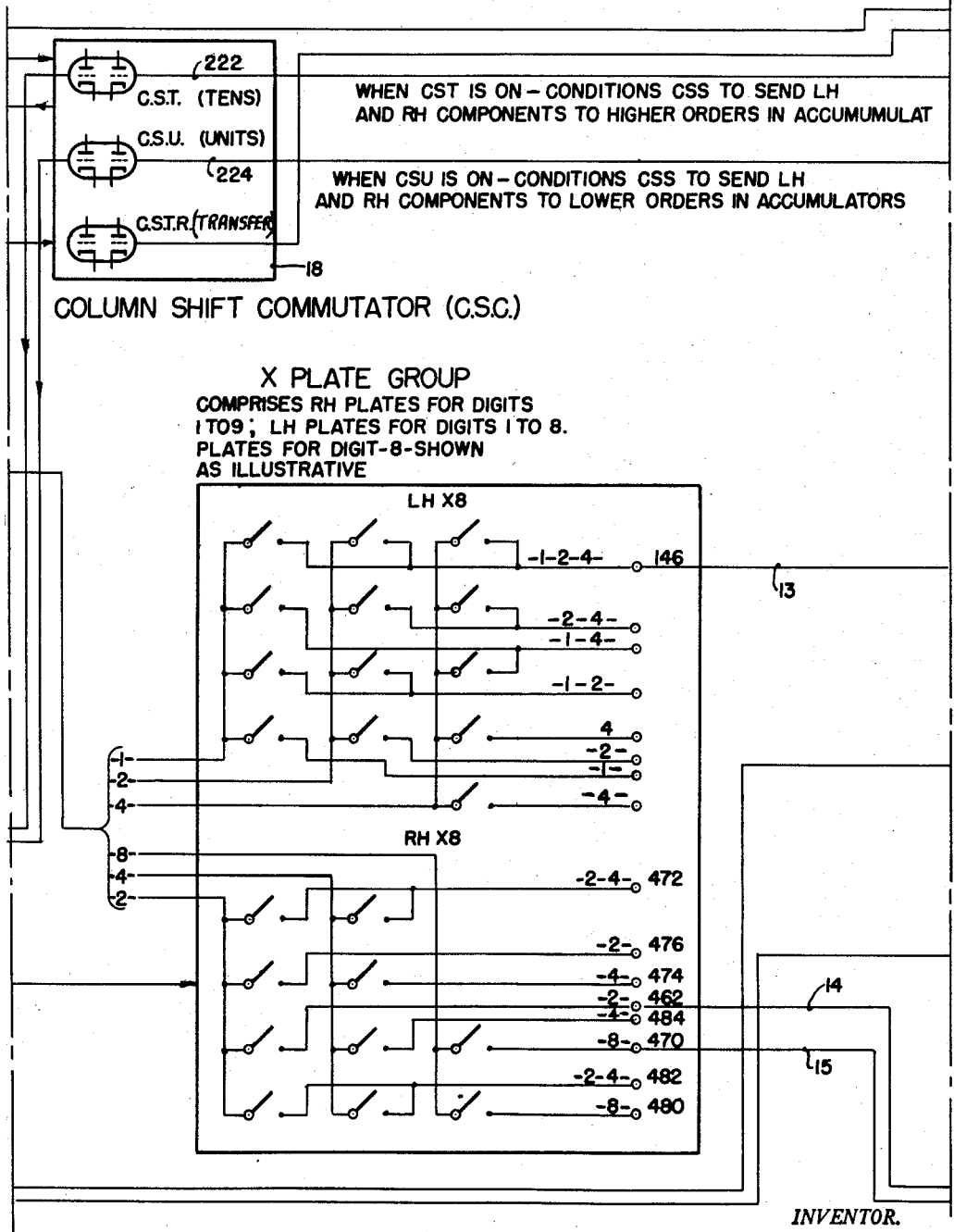
Figure 1C:
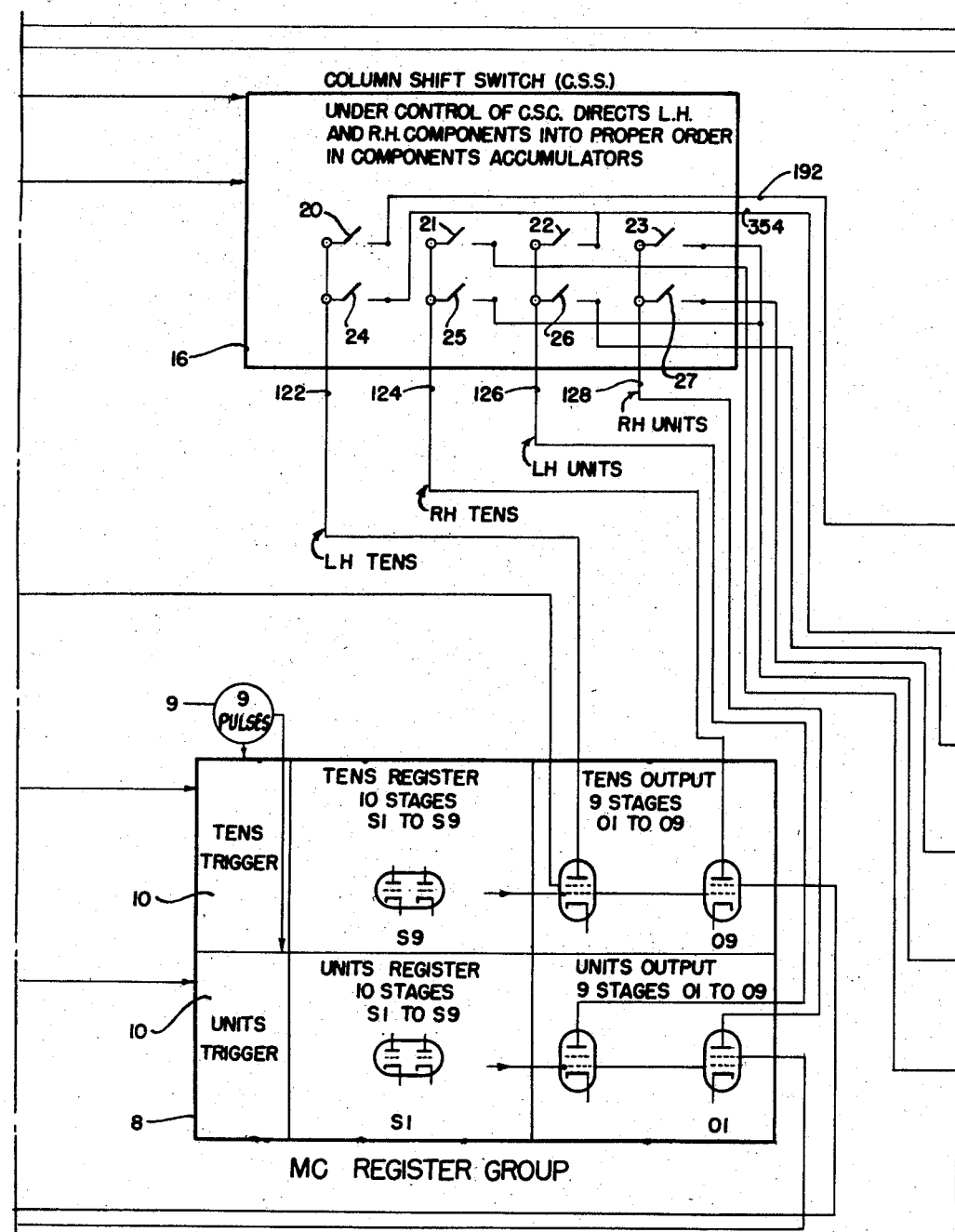
Figure 1D:
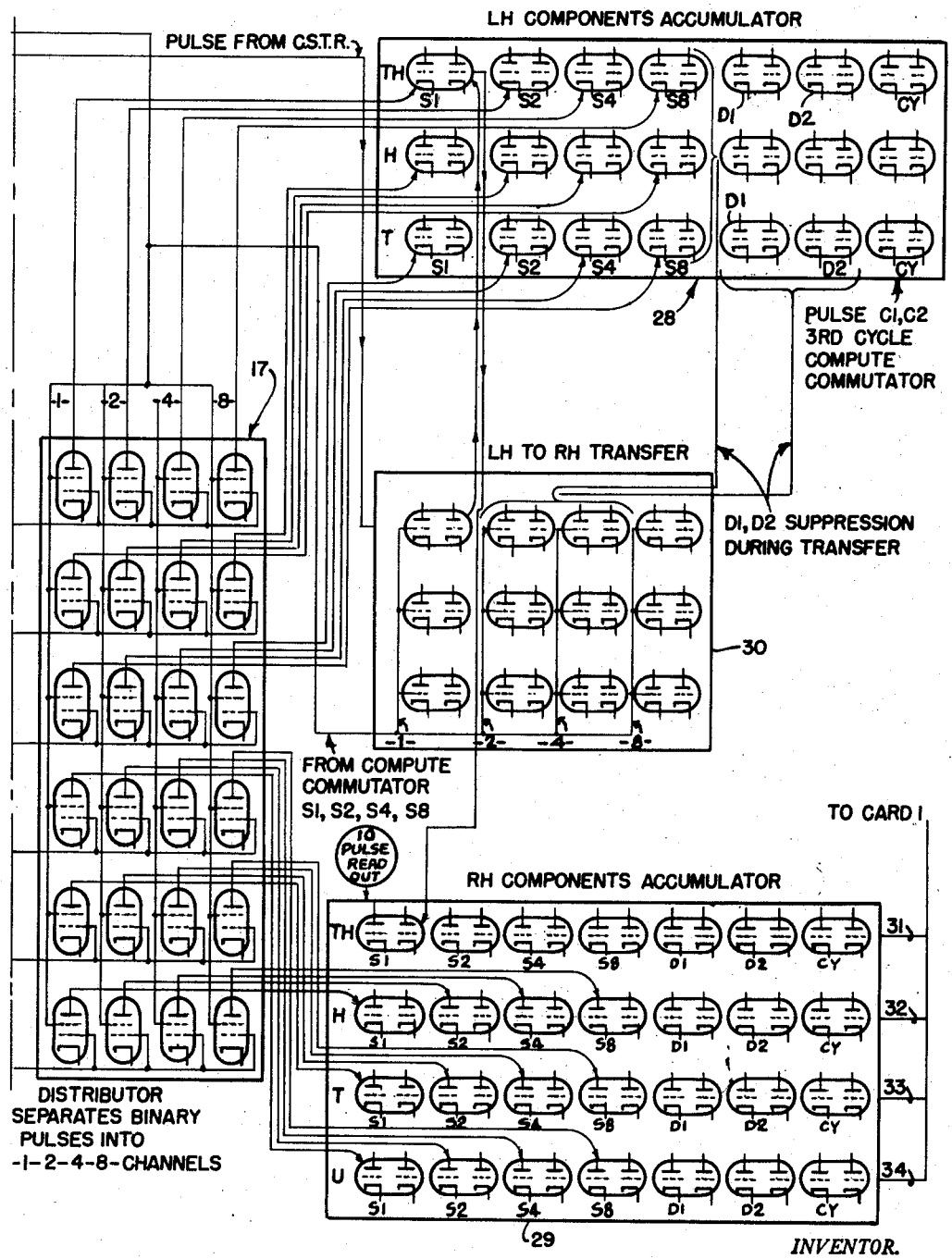

To clarify the exposition, only the × plate for the digit –8– is shown in Fig. 1b in both its LH and RH sections. Actually, there is an × plate for each digit from –1– to –9–. The MP register chooses those of these nine × plates which are needed to perform the two cyclic multiplications just indicated. Thus, in the first, or tens, cycle, it will choose the ×8 plate and in the second, or units, cycle it will choose the ×3 plate. With these choices, the pulse outputs of the × plates are then controlled by the MC register in such a way as to produce the result of the indicated multiplications for each of the first two compute cycles.

Before proceeding with the further explanation of the × plates, a word about the compute commutator is in order. The multiplications performed in the system are accomplished by use of various combinations of the binary code components (bits) –1–2–4–8–, which can be added selectively to produce the decimal digits –1– to –9–, as desired. The compute commutator 12 produces during each multiplying cycle a series of six successive electric pulses, the first four each representing a number corresponding to this binary code, as indicated by the drawing. The two remaining pulses in each cycle are used for carry-over operations in the final accumulators 28 and 29. Selective channeling of these bit pulses –1–2–4–8– through the × plates and the MC register under the selective control of the MP register and further elements to be described produces in binary code the information corresponding to the product of 83×91.

For example, we shall first want to cause the channeling through the MC register group of all binary code components necessary to indicate the product (PR) 80×91 and then all binary code components necessary to indicate the product 3×91. This is done in two steps. First, the MP tens register selects the ×8 plate which is thereby rendered capable of channeling from the compute commutator to the MC register group all binary components for the products of the MP digit –8– times all possible MC digits from –1– to –9–; and the MC register group then filters from these only those which go into the product of the MP –8– times the digits in the MC –91–. Secondly, the MP units register selects the ×3 multiplier plate which is capable of channeling from the compute commutator to the MC register all binary components of all products of –3– by any digit from –1– to –9–; and the MC register group then filters from these only those required for the multiplication of –3– times the digits in the multiplicand –91–.

We shall show how the MP tens register selects the ×8 plate and how the ×8 plate channels to the MC register all of the binary components or bits of –8– times any digit from –1– to –9–. From that, it will be understood how the MP units register operates similarly for its digit –3–.

Whenever stage ×8 in MP tens is on, it turns off its output stage V16 (each stage has its own V16). This turns on V22 to produce a voltage which can be used to select or condition the ×8 plate. This merely means that the ×8 plate is conditioned to pass on to the MC register group all the previously indicated binary pulses (8× –9– to –1–) from the compute commutator. This conditioning is analogous to the closure of a switch, permitting the binary pulses to be transmitted; and to simplify the understanding, the × plate units for that function have been designated as simple switches although in the more complete showing of the system (Fig. 3), this is done by diode gates. Thus, it may be considered that the MP tens register through V16 and V22 has closed all of the switches shown in Fig. 1b within the ×8 block. No other × plates have been so conditioned, and so they are out of operation at this stage. The ×3 plate only will be conditioned during the second compute cycle for the purposes of our problem of multiplying –83– and –91–, but no other × plates will be needed for this particular problem. The structure of the ×3 plate will not be explained here since it will be obvious from an understanding of the ×8 plate, and moreover its exact structure will be shown later in Fig. 3.

The arrangement of the ×8 plate will be readily understood from a consideration of the following table, showing all of the LH and RH components of –8– times all of the digits from –1– to –9– in binary code:

LH AND RH COMPONENTS OF 8 TIMES ALL DIGITS FROM 1 TO 9—BINARY CODE

|  | LH | RH |
|---|---|---|
| 8×1 | – – – – | – – – 8 |
| 8×2 | 1 – – – | – 2 4 – |
| 8×3 | – 2 – – | – – 4 – |
| 8×4 | 1 2 – – | – 2 – – |
| 8×5 | – – 4 – | – – – – |
| 8×6 | – – 4 – | – – – 8 |
| 8×7 | 1 – 4 – | – 2 4 – |
| 8×8 | – 2 4 – | – – 4 – |
| 8×9 | 1 2 4 – | – 2 – – |

From this table, all of the binary code combinations necessary for the multiplication of eight and any other digit can be seen. It will also be seen from the right side of the ×8 plate in Fig. 1 that the particular combination of switches and connections to the –1–2–4–8– pulsed wires of the compute commutator will give at the output of the × plate any one of these binary combinations which may be needed. Since in the first cycle we are multiplying –8– by –91–, we need only the –1–2–4– combination for the LH components and the –2–8– for the RH components. Accordingly, the ×8 plate is connected, as indicated by the wires 13, 14 and 15, to supply those particular combinations to the output O9 of the tens S9 stage and the output O1 of the units S1 stage of the MC register.

It is understood that a corresponding arrangement can be worked out for any other × plate and its necessary wire-connections to the stages of the MC register, so that the system will be able to accommodate any MP and MC digits.

Each of the ten stages of the MC tens register and each of the ten stages of the MC units register gates its own double output stage, carrying corresponding designations O1 to O9. That is to say: when any MC register stage is on, it prepares its output stage to conduct by suitably controlling the number one grids of the output stage, as indicated; conversely, when the register stage is off, it prevents operation of the corresponding output stage of O1 to O9 by imposing a suitable bias on these number one grids. Thus, when these output stages are gated on, pulses may be transmitted through them from the × plates to the column shift switch 16. The LH × plate components drive the left-hand tube of the outputs O1 to O9 while the RH × plate components drive the right-hand tube of the output.

Considering, again, the multiplication 8×91 and the above chart, it is noted that the LH ×8 plate drives the left-hand output tube of O9 of the MC tens order with the only necessary LH pulse components, namely, the binary pulse combination –1–2–4–. The RH ×8 plate drives the right-hand tube of O9 of the MC tens with the binary component –2– necessary to the RH column of multiplying 8×9. The RH ×8 plate drives the right-hand tube of O1 of the MC units register output with the binary component –8– necessary to the multiplication 8×1. It is, thus, seen that the first cycle 8×91 is complete in all necessary binary components at the output stages of the MC register group.

The output from the MC register group will thus comprise groupings of binary components in the form of any combinations of the four binary pulses. It will be necessary to allocate them to their proper higher and lower orders and then to separate all of the binary pulses into their own –1–2–4–8– categories for final counting or accumulation. These last two jobs are performed respectively by the column shift switch 16 and by the distributor 17. Before proceeding with those units, it is best to go back and note the column shift commutator 18 and the zero analyzer 19 which perform an important function in relating the activity of the MP and MC register groups as well as that of the × plates to the column shift switch 16, the distributor 17 and to the accumulators which will be discussed later.

The column shift commutator 18 controls the shift of various units from the tens to the units to the transfer cycle as one multiplies the MC, first by the –8– in the tens order of the MP, then by the –3– in the units order of the MP, and then performs the transfer operation.

A bistable trigger circuit CST in the column shift commutator energizes the output stage V16 of the tens MP register during the first computing cycle, while a similar CSU trigger energizes the units output V16 of the MP register during the second or units computing cycle. As later explained, a third such trigger CSTR controls the transfer of LH to RH components in the final accumulation. The shift from CST to CSU to CSTR in the column shift commutator is controlled by the compute commutator 12 which shifts successively from CST to CSU to CSTR, as required by the cycle order, indicated by the compute commutator.

It will frequently be the case that there is no digit in either the tens or the units register of the MP register group. In that case, it would be an unnecessary waste of time to permit the system to run through the first and second cycles or either of them which happens to contain a zero. It is the function of the zero analyzer 19 to prevent this unnecessary action. If there is a zero in either MP register, tens or units, it will be so indicated by the fact that the tens or units S0 stage is on. If the S0 stage is on, it will condition the zero analyzer in such a way as to cause the CST or the CSU stage of the column shift commutator to be skipped entirely, either one or both depending upon whether either one or both have zeros and, thus, their S0 stages on.

It might also be noted that the column shift commutator has a means for sending a pulse back to the compute commutator when the calculation is completed so that the compute commutator and the whole system is prepared for a new calculation.

CST and CSU also control the column shift switch 16. The column shift switch employs a plurality of diode gates (later explained in detail) which channel the binary pulses into the higher or lower orders of the accumulators to which they belong. During the first compute cycle, 8×91, when CST is on, one set of diode gates channel pulses to the higher order; and during the second compute cycle, 3×91, another set of gates, when CSU is on, channel components to the lower orders. These diode gates may, therefore, be represented by simple switches which when closed (conditioned) will pass the pulses of the binary components through and on to their destinations—yet when opened (unconditioned) are ineffective to permit any channeling. Thus, when CST is on, the four diode gates, represented by switches 20, 21, 22 and 23, are conditioned as though these switches 20 through 23 were actually closed; and so were able to pass on binary pulses from the MC register group 8 to the distributor 17. Four diode gates represented by switches 24 to 27 are open and ineffective when CST is on. Similarly, when CSU is on, the four diode gates represented by the switches 24 to 27 are conditioned or closed so as to pass binary pulses from the MC register group on to the distributor; and the four represented by switches 20 to 23 are unconditioned or open and ineffective. It will be seen that there is a higher and a lower order diode gate, or switch for each LH output, tens and units, in the MC register group as well as for each RH output, tens and units, in the MC register group.

The operations of the column shift switch will probably be grasped more quickly from a consideration of the following table, showing in decimal notation the LH and RH components involved in the multiplication 83×91:

|  | LH | | RH | | |
|---|---|---|---|---|---|
|  | Th | H | H | T | U |
| 80×90 |  | 7 |  |  |  |
| 80×1 |  |  |  | 2 | 0 |
| 3×90 |  |  | 2 | 8 | 0 |
| 3×1 |  |  |  | 7 | 0 |
|  |  |  |  |  | 3 |

From this, it will be seen that the LH components involved in the multiplication of the digit –8– of the MP by the digit –9– of the MC must go into a thousands order; while the LH components involved in the multiplication of the digit –3– by the digit –9– in the MP and MC, respectively, must go into the LH hundreds order. Similarly, multiplication of the digit –8– by the digit –9– for the RH order requires directing RH components into the hundreds order; while multiplying the MP –3– by the MC –9– requires directing components into the RH tens order. The chart will indicate a corresponding relation when the digits in the MP operate on the –1– of the MC. Moreover, if one follows the working of the various switches 20 to 27 when CST and CSU are successively on, in turn, he will see how this result is accomplished, i.e.: that the various components just discussed are directed into their proper orders in the accumulator through the distributor which will now be explained.

The distributor 17 comprises six banks of tubes, each bank having four tubes corresponding successively to the binary components –1–2–4–8–. The upper three banks channel LH components from the column shift switch to the LH components accumulator 28; the lower three banks channel RH components from the column shift switch to the RH component accumulator 29 which also happens to be the product accumulator. The tubes in the distributor operate as follows.

It is understood that the pulses coming from the column shift switch are not yet segregated into separate binary groups –1–2–4–8–. In other words, along any one wire leading from the column shift switch to the distributor, there will occur a series of any where from one to four pulses, depending upon the combination of binary component pulses allowed to sift through by the X plates and MC register. It is now necessary to take all of these series of pulses and sort them out into four groups, corresponding to the four code compenents –1–2–4–8–. This is done by applying the pulses from the column shift switch to the number one grids of the distributor tubes, as indicated, and then applying to the number two grids of the first tube of each bank a pulse timed as S1 in the compute commutator, to the number two grids of the second tubes of each bank a pulse corresponding to S2 of the compute commutator, to the number two grids of the third tube in each bank a pulse corresponding to S4 of the compute commutator, and similarly for S8 and the second grid of the last tube in each bank.

As will be apparent, the anodes of the first tubes of each bank will then transmit the –1– components; the anodes of the second tubes of each bank will transmit the –2– components; the anodes of the third tubes of each bank will transmit the –4– components; and the anodes of the last tubes of each bank will transmit the –8– components. From these anodes in the distributor, such pulses may then be delivered to the corresponding counter-stages S1, S2, S4, and S8 in the components accumulators.

The components accumulators, both LH and RH, comprise a plurality of banks, corresponding to thousands, hundreds, tens, and units, as indicated, each bank including seven bistable dual triode trigger elements similar to those in the MP and MC registers. The first four of each bank are for the parallel or serial entry of pulses representing the respective binary components –1–2–4–8–. The fifth and sixth tubes D1 and D2 are for adjustment to decimal notation, as will be indicated later; the seventh is a carry trigger for carrying over to a higher order when a lower order has been filled up.

Whenever any one trigger in the components accumulators is pulsed, it reverses its conduction from the left-hand to the right-hand triode, or vice versa. Whenever it is turned off, i.e., conduction transfers from the right-hand triode to the left-hand triode, it will pulse its successor in the bank to reverse that successor—i.e.: turn the successor off if it is initially on or on if it is initially off. Moreover, whenever S8 goes on, it will actuate the monostable triggers D1 and D2 in which case D1 will reverse S2 after a short delay, and a short time later D2 will reverse S4. The reason for this latter feature will be explained in detail later, but for the moment it will suffice to state that this expedient is part of the shift back to decimal notation for the final accumulation of the product. The carry triggers CY constituting the seventh tube of each bank will pulse the first tube of the next higher order during the C1 and C2 pulses of the compute commutator 12 if, of course, the lower order is filled up. This is accomplished during the C1 and C2 pulse periods, in order to preclude interference with the counting during the first four or binary code pulses.

For the final calculation of the product, it is necessary to transfer the LH accumulator components to the RH components accumulator, and this is done through the medium of the transfer 30 which when actuated by CSTR operates essentially as follows during the third compute cycle. The first gate tubes in each of the three banks of the transfer 30 are impulsed by S1 or the first binary pulse; the second tubes are similarly impulsed by S2; the third tubes by S4; and the fourth tubes by S8. The operation of the first tube of the upper bank will illustrate the behavior of all the rest.

When impulsed, this first tube in the upper bank will impulse S1 of the TH order of the LH accumulator and reverse it. The act of reversal of S1 in the TH order in this manner will convey an impulse to S1 in the TH order of the RH components accumulator, thereby effecting the transfer. This action occurs, however, only for those tubes in the LH accumulator which are on. In this manner, all on tubes in the LH accumulator are caused to impulse their counterparts in the RH accumulator to effect the complete transfer of all LH components to the RH accumulator. In this process, it is, however, necessary to suppress the action of D1 and D2 in the LH accumulator; and this is accomplished by a circuit controlled by the S8 tubes of the LH accumulator. In response to signals from the second and third tubes in each bank of the transfer 30, these S8 tubes in the LH accumulator suppress the action of the tubes D1 and D2 during the transfer operation.

At this stage, the calculation of the product of $MP \times MC$ is complete and the record thereof stands in the RH accumulator 29. It remains to convey this record to the card 1 in the form of perforations 11.

In order to transfer the record of the product in the RH accumulator to the card 1 or to any other permanent form of recordation, it is only necessary to apply to the first stages S1 of each bank of tubes in the RH accumulator a series of ten "read-out" pulses. If this is done, the counter order in the RH accumulator will be advanced by ten digital amounts, thus returning it to its original value. In this process, the last stages, triggers CY will be turned on coincidentally with the turning-off of the S8 stages, thereby applying impulses to the output terminals designated 31, 32, 33 and 34. These impulses may be employed to operate the punch-magnet which will be used to punch the product perforations 11 on the card 1.

*Record handling*

The record cards for which multiplying computations are to be effected are handled by a record controlled machine of the type fully described in U.S. Patent No. 2,372,909 and again in U.S. Patent No. 2,624,508. The construction and manner of operation in respect to the derivation of data in pulse form from the reading brushes will readily be understood by those skilled in the art from Figs. 2, 3a, and 4. Therefore, the description of this phase will be brief.

Figure 2:
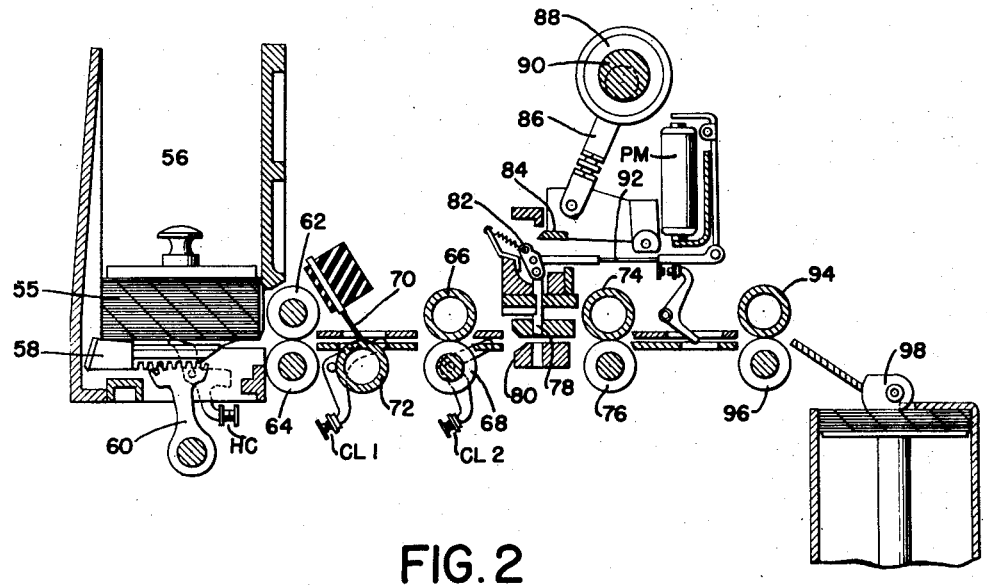
Fig. 2 shows in schematic cross-section the mechanical arrangements which move cards between input and output hoppers through intermediate positions where the multiplication of data on the cards is performed and the product indicated on them.
Figure 3A:
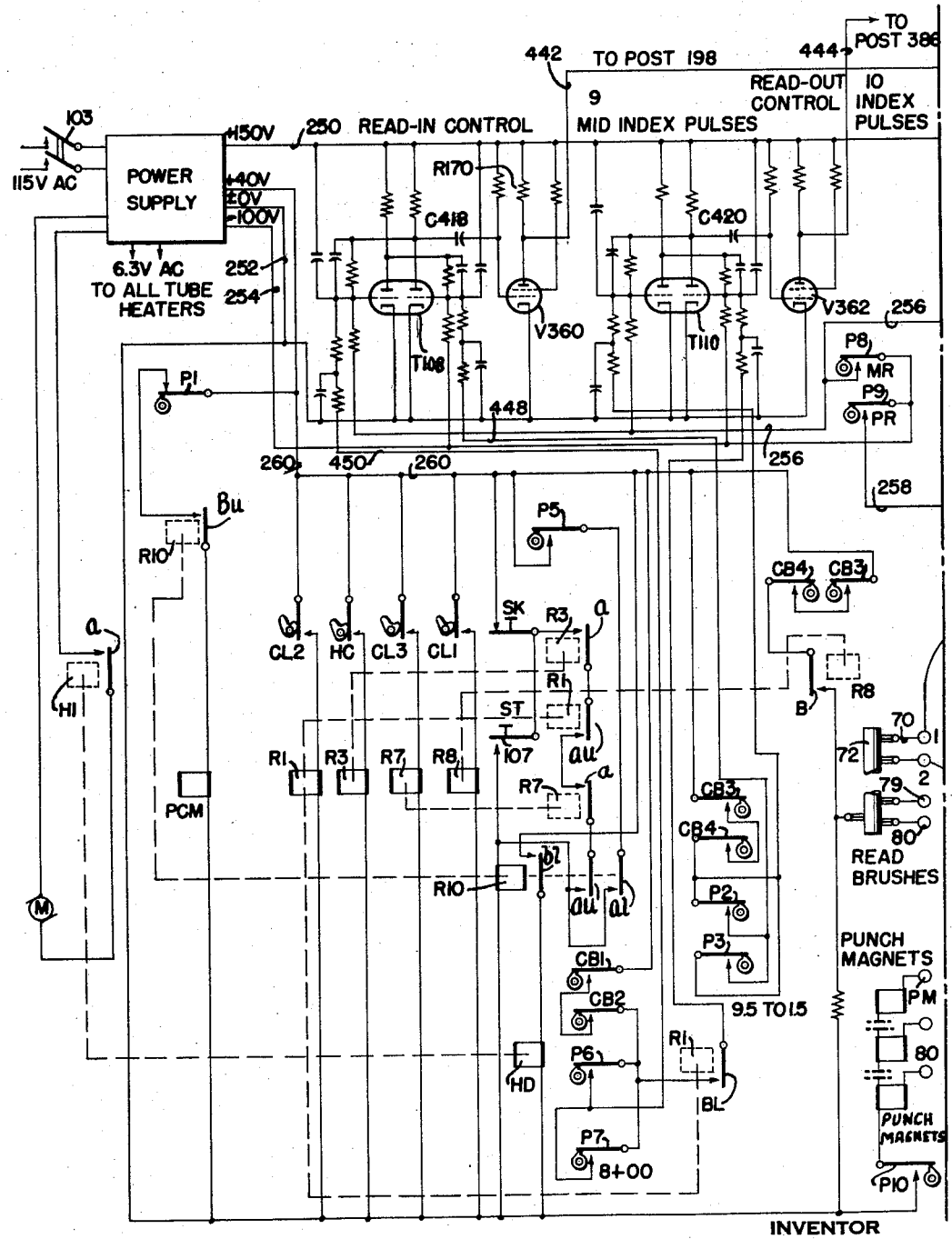

Fig. 2 shows the essential elements of the structure, some of which are also indicated in Fig. 3a. The stack of cards 55 punched with multiplicand (MC) and multiplier (MP) data is placed in hopper 56 with the digit 9 index position leading and as long as there is a card in the hopper, the hopper card lever contacts HC remain closed. Cards are fed one after another from the bottom of the stack by picker 58 operated by rocker 60.

As the card emerges from the hopper, it is seized by feed rolls 62 and 64 and fed into the reading station and into the grasp of feed rolls 66 and 68. At the reading station, the MC and MP data are read from the card to the machine. To that end, there is a row of sensing brushes 70, one for each card column, and a coacting contact roll 72. Brushes 70 and roll 72 come into contact through holes previously punched through the cards at appropriate digit index positions for the MC and MP. Feed rolls 66 and 68 next advance the card from the reading station to a punching station and into the grasp of feed rolls 74 and 76. At the punching station, there is a row of punches 78, one for each card column, and a co-acting punch die 80. The function of the punching station is to punch holes in the cards at appropriate digit index positions to indicate the product (PR).

Each of the punches pivotally carries an interposer 82 which is normally out of the path of the continuously oscillating punch depressor plate 84. Plate 84 is operated through connecting rods 86 by eccentrics 88 on a rotating shaft 90. For each punch, there is a call magnet PM which, upon energization, acts through its armature lever and a link 92 to hook the interposer 82 to the plate 84 during its down stroke. Accordingly, as plate 84 effects its down stroke, it acts through the interposers hooked thereon to drive the selected punches through the card. After punching, feed rolls 74 and 76 feed the card from the punching station to a pair of feed rolls 94 and 96 which eject the card to a stacker 98.

The card picker, feed rolls and contact roll are driven by a motor operated mechanism through the usual clutch and, in a manner fully explained in the previously mentioned Patent No. 2,372,909, the feed and contact rolls operate to feed the card intermittently when the clutch is engaged. In this manner, the digit index point positions of the card successively traverse the brushes 70 during one machine cycle. In a similar manner, the card is presented to punches 78 during the following machine cycle. There is a dwell between each index point of feed during which interval selected punches are depressed to perforate the card. Figs. 4a and 4b show the timing of various circuit breaker contacts labeled CB and other cam contacts labeled P during the first four cycles. These contacts are mechanically operated by the machine and control circuits. Figs. 4 and 4b also indicate when certain card lever contacts generally denoted CL are effective to control machine operations.

With cards in hopper 56 and with power switch 103 closed (Fig. 3a), the machine is ready to commence operation on a series of cards. The presence of cards in hopper 56 causes closure of card lever contacts HC bringing about energization of relay coil R3 which causes closure of its contacts designated a. To initiate operation, the start key ST is depressed to complete a circuit from line 260 through stop key contacts SK, start key contacts 107, through relay coil R10 to line 252. Energization of R10 closes its contacts a whereupon the coil of relay HD is energized. The contacts a of relay HD thereupon complete a circuit from one side of the 115 A.C. volt line through motor M to the other side of the line. Motor M is the driving motor for the reading and recording (punching) section of the machine.

The energization of coil R10 effects closure of its contacts b and a circuit is completed from line 260 through the normally closed cam contacts P1 and clutch magnet PCM to line 252. The energization of PCM effects operation of the clutch to operate the mechanism of Fig. 2. With the aforementioned clutch operated and with motor M operating, the initial machine cycle takes place. During this cycle, the first card is fed from hopper 56 to a position in which the leading edge of the card is about to traverse brushes 70. Reference to Fig. 4 indicates that near the end of this first cycle the card effects closure of card lever contacts CL1, and such operation causes energization of relay coil R8 (see Fig. 3a).

Assuming that the operator has released the start key contacts prior to the end of the first card feed cycle, the relay coil R10 becomes de-energized when cam contacts P5 open interrupting its previously established stick circuit which also includes the contacts c of relay R10. Such de-energization of R10 also results in de-energization of relay HD and opening of the circuits to motor M and clutch magnet PCM. Accordingly, the machine stops at the end of the first cycle.

During the second cycle (initiated by depressing start key ST), the first card is traversed past the sensing brushes 70 to a point where its leading edge is just under the punches 78. During this second card feed cycle, the data for multiplying is sensed by brushes 70 and entered into the proper registers. And, late in this cycle, the required computing operations are effected.

Near the end of this second card feed cycle, the card lever contacts CL2 close, as indicated in Fig. 4a, closure of such contacts causing energization of relay coil R1, which closes its a and b contacts. Also, during the second card feed cycle, the leading edge of a second card from hopper 56 is fed to the brushes 70.

A third machine cycle is automatically initiated if the operator maintains start key ST depressed or is initiated upon a third depression of this start key. Near the end of such third machine cycle card lever contacts CL3 close, and there is energization of relay coil R7 which effects closure of its contacts a. Assuming that the operator maintains start key ST depressed throughout the entire third machine cycle, R10 will remain energized through a stick circuit which includes its d contacts, the a contacts of R7, R1 and R3, and stop key contacts SK, all now closed. Machine cycles continue thereafter automatically as long as cards are present in the hopper 56. It will be recalled that at the end of the second card cycle the first card was about to traverse punches 78. During the third card feed cycle, the first card has punched thereon the result of the computing effected near the end of the second card feed cycle.

*Read-in*

As a card passes brushes 70, the MC factor will be entered into the MC register and the MP factor will be entered into the MP register. Prior to such read-in, the related registers are reset to zero condition in a manner to be explained. As a hole in the card encounters brush 70, a circuit is completed which is effective to produce a differential timed impulse, which is converted into a series of impulses equal in number to the magnitude of the digit to be entered. Thus, an entry into the required register is effected by a series of impulses. One such read-in circuit will now be described in detail.

It is required that certain pulses be produced invariably during each card feed cycle. For this purpose, a read-in control trigger T108 (Fig. 3a) is provided. This trigger includes tubes V356 and V358. At the beginning of a machine cycle, this trigger is reset to off status by the opening of cam contact P8 connected to (—) 100-volt line 254. Accordingly, V356 is conductive and V358 is shut off. Shortly after the −9− digit index time (see Fig. 4), cam contacts P2 and P3 close and shortly thereafter, cam contacts CB3 and CB4 close. Such action applies a positive pulse to wire 448 shifting T108 to on status. This causes a drop in the T108 right-hand anode potential which is applied via capacitor C418 to the grid of zero biased tube V360. The resulting positive pulse produced on resistor R170 is applied to wire 442 which leads (Fig. 3b) to post 198 of the MC and MP registers in the electronic unit. From post 198, this positive pulse is applied to the suppressor grid of a pentode input control tube V10 located in each order of MC and MP registers via line 284 (note extension to Fig. 3e). The exact manner in which these pulses effect entry of the required digit will be explained in the section describing the operation of the MP and MC registers. It suffices at this point to note that a series of pulses will occur on wire 448 each at mid-index time, i.e., beginning at a half point after −9− digit index time and ending a half point after −1− digit index time of the machine cycle (Figs. 4a and 4b). Thus, nine positive mid-index pulses are provided on wire 442. Cam contacts CB1 and CB2 are arranged to close at index times. Cam contacts P6 and P7 are closed from −8− through −0− of each machine cycle. Thus, wire 450 will apply positive pulses to trigger T108 which are effective to restore this trigger to off status at index times.

Read-out

Figure 3B:
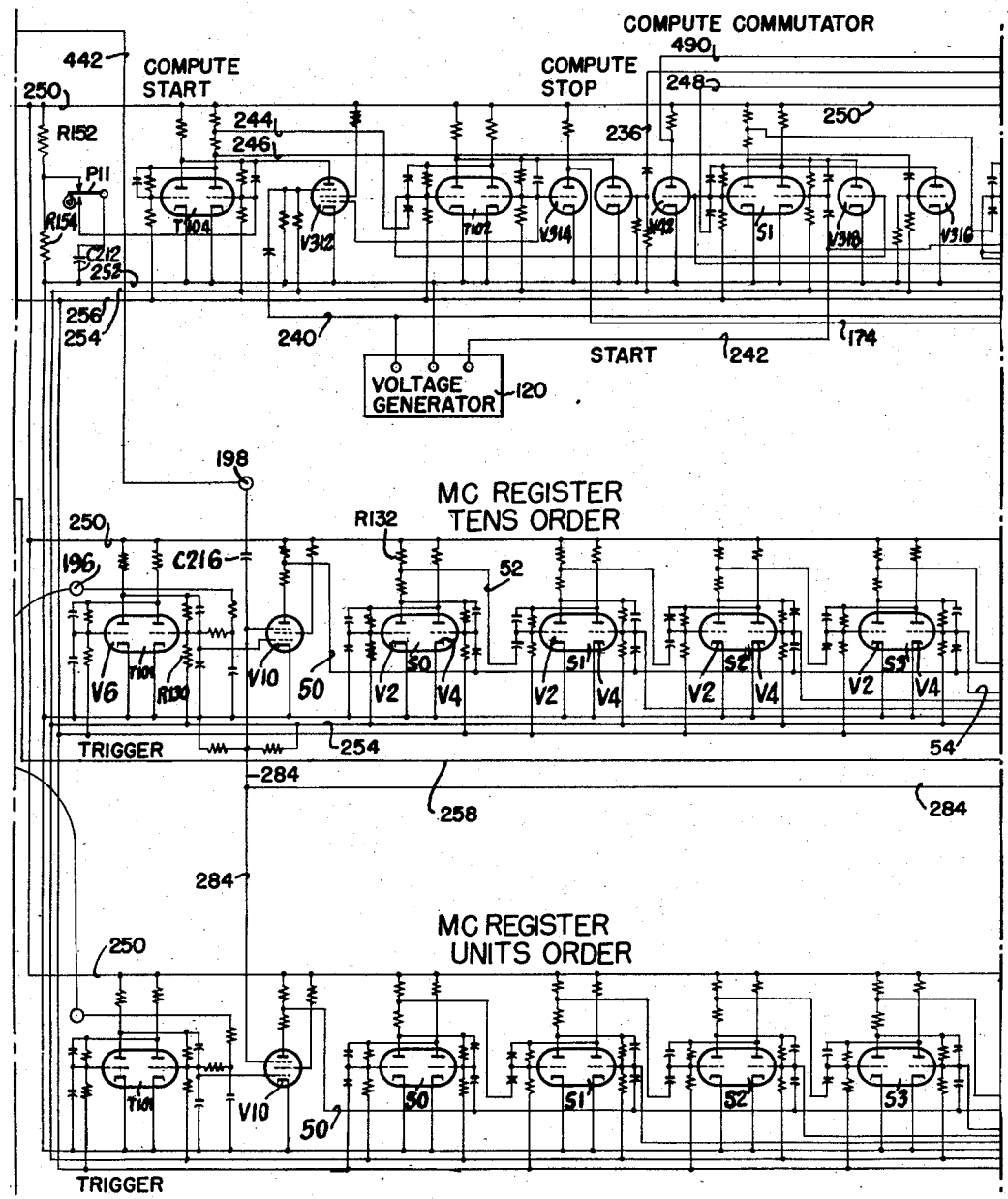
Figure 3C:
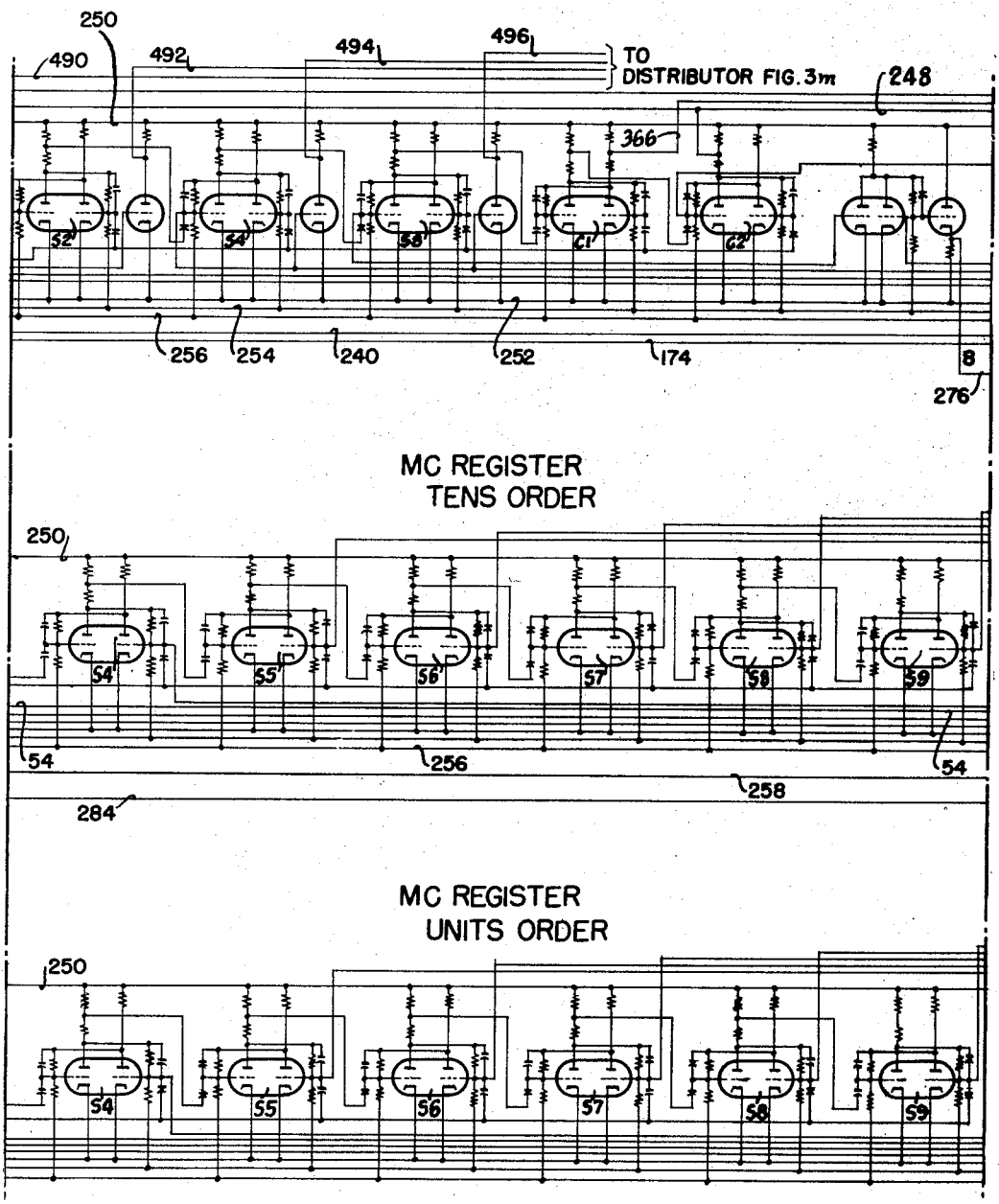

In order to read out the computed result or product from the RH register, ten impulses must be generated for the purpose of advancing each RH register order through ten positions. For this purpose, a read-out control trigger T110 is provided. This circuit is brought into operation during each read-out cycle. It should be appreciated that an initial read-out cycle will follow the first read-in cycle. During this read-out cycle, relay R1 is energized by operation of card lever contact CL2 as the first card reaches the punching station. With relay R1 energized, its contacts b are closed to complete the following circuit: beginning at +40 volt line 260 CB1 and CB2, the now closed points b of R1 to the right-hand side of trigger T110. Thus, trigger T110 turns on, and the resulting negative pulse on this right-hand anode is applied via capacitor C420 to the grid of tube V362. V362 is thereby momentarily shut off to apply a positive pulse on wire 444 which is connected to post 386 in the electronic unit (Fig. 3r). At the next mid-index point, cam contacts CB3 and CB4 will close to impress a positive potential at the LH grid of trigger T110 causing it to restore to off status. At the next index point, CB1 and CB2 again make to again turn on trigger T110. Thus, a second positive impulse is applied to wire 444. Trigger T110 in this manner is caused to turn on and off ten times. The resulting ten index impulses applied to post 386 in the electronic unit are effective to advance each RH order through ten index points.

Figure 3D:
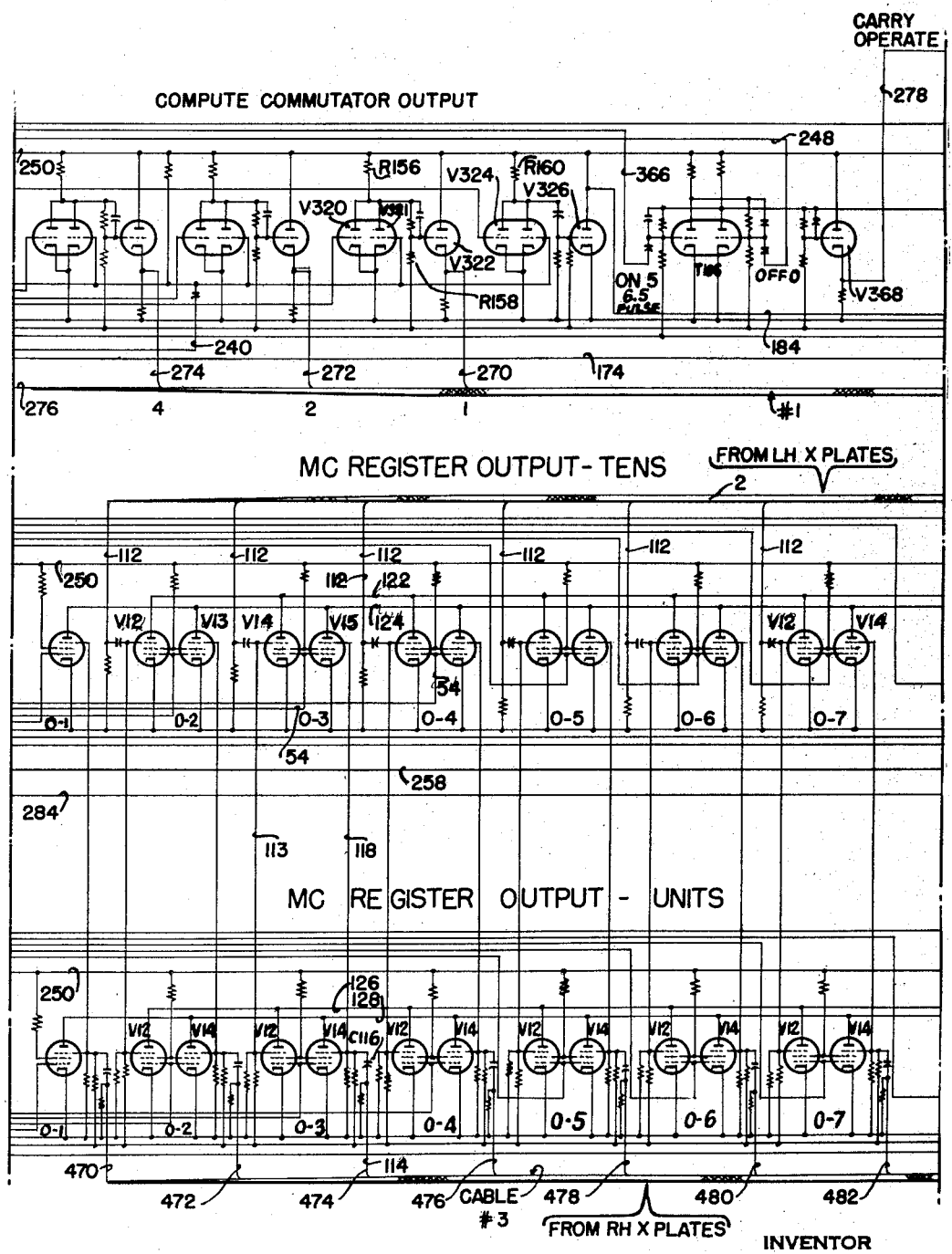
Figure 3E:
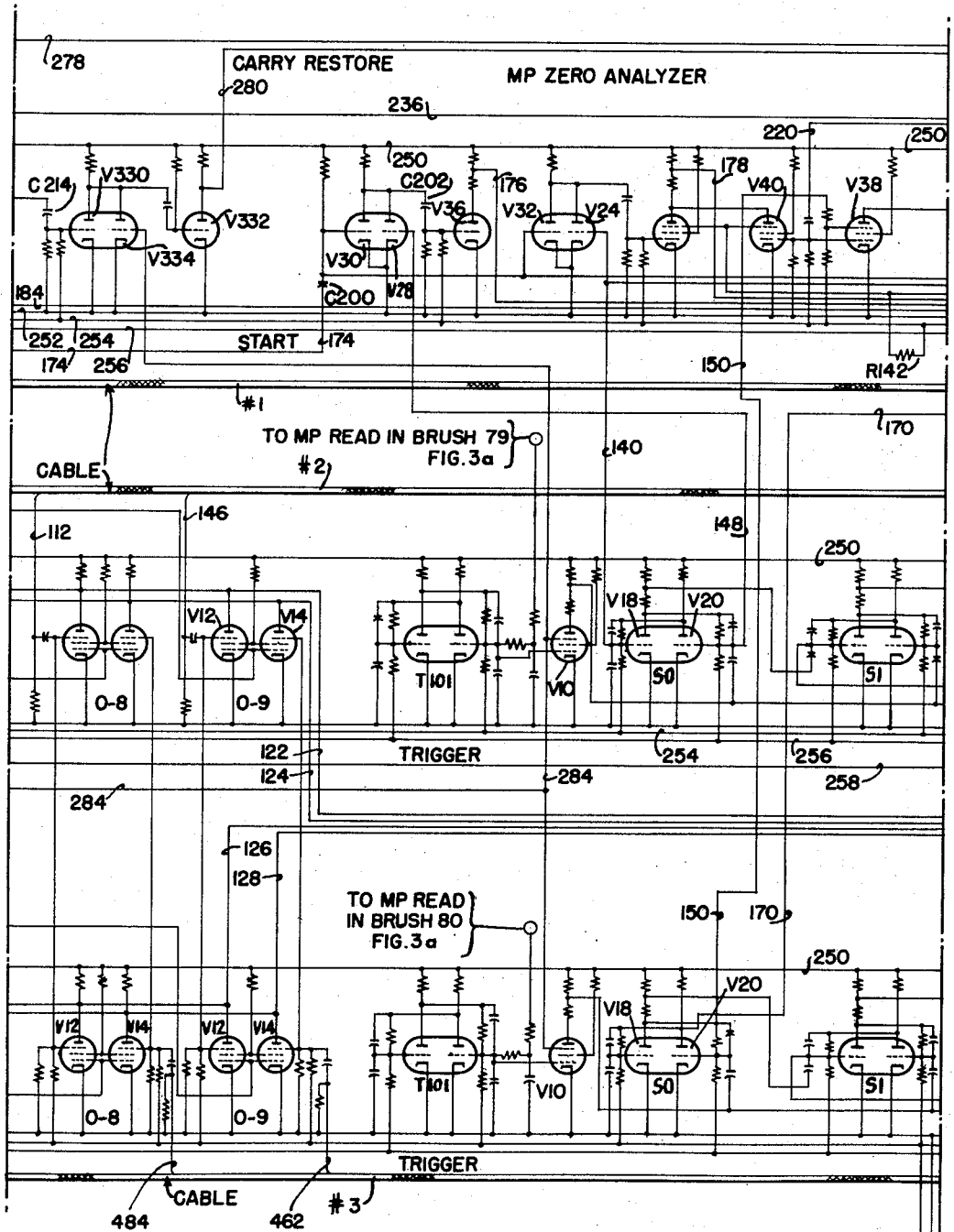
Figure 3F:
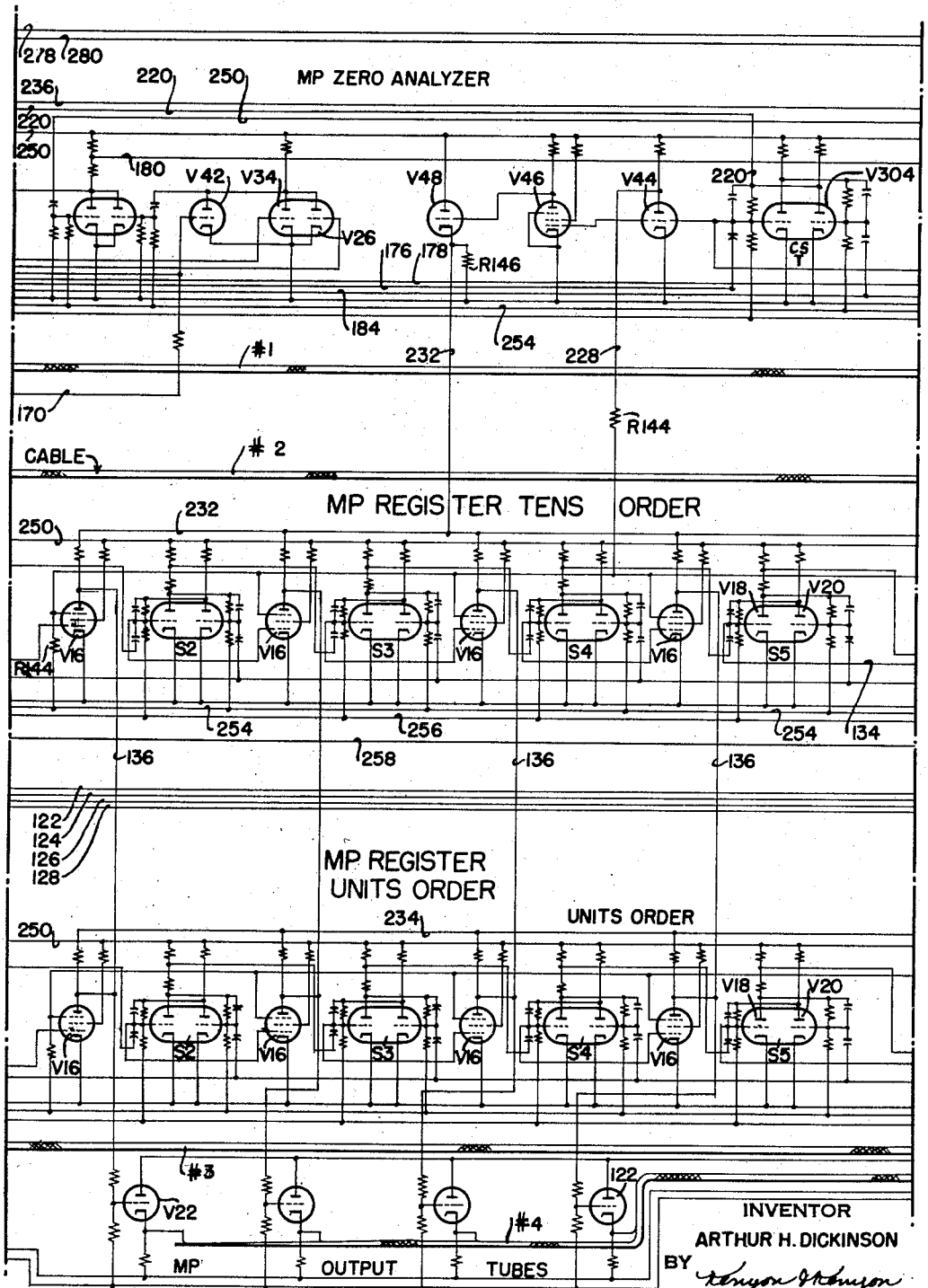
Figure 3G:
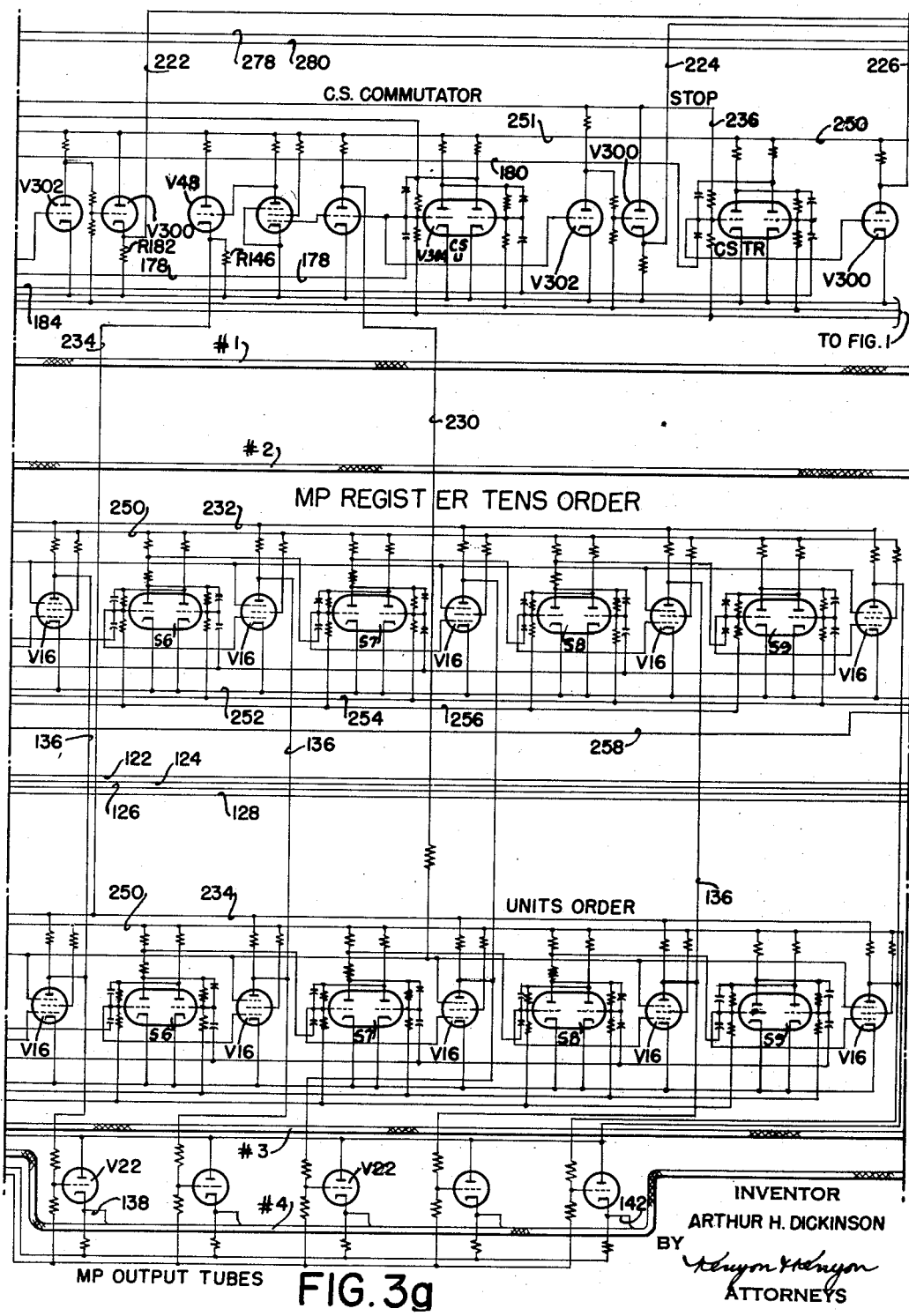
Figure 3H:
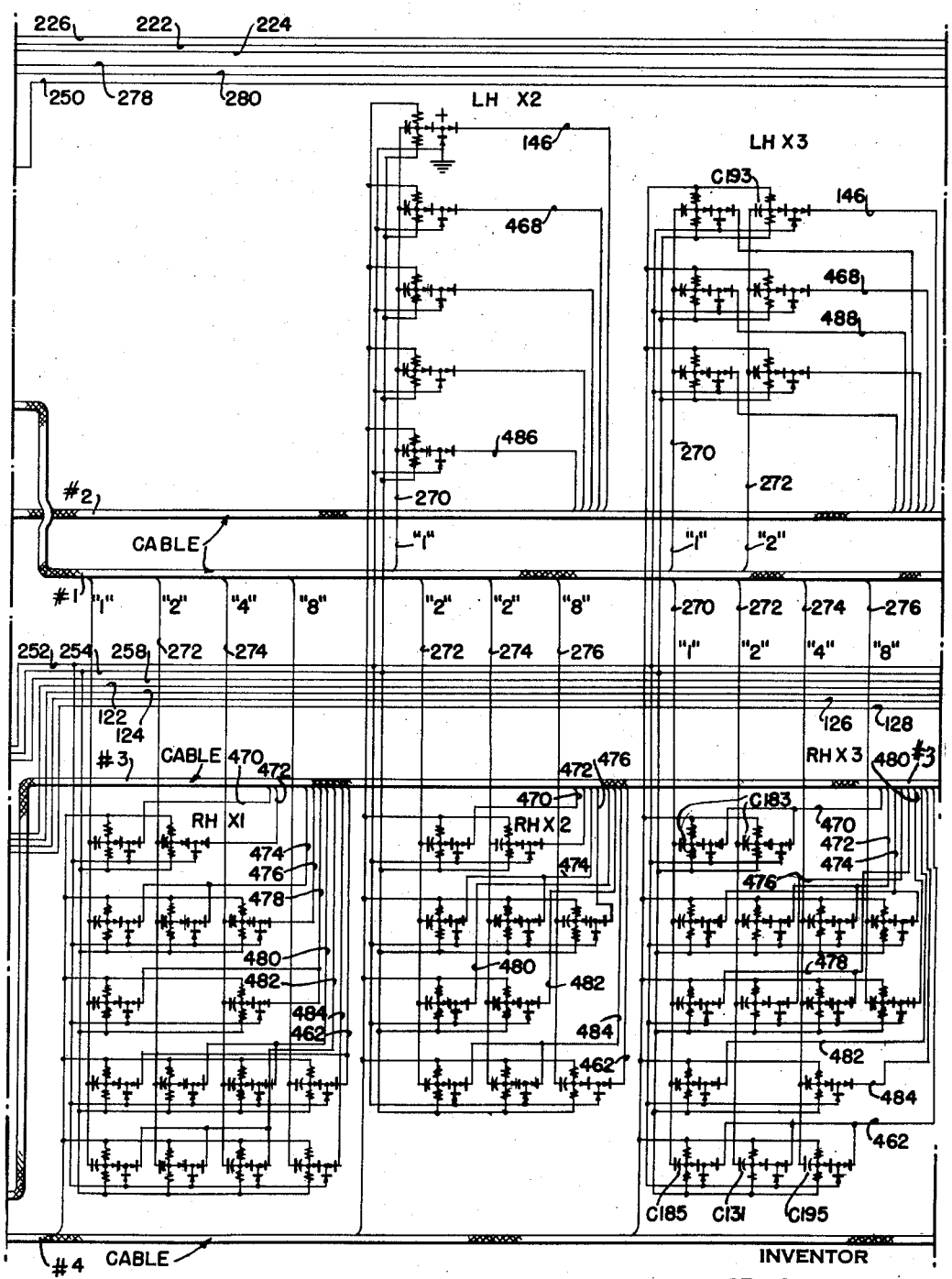
Figure 3J:
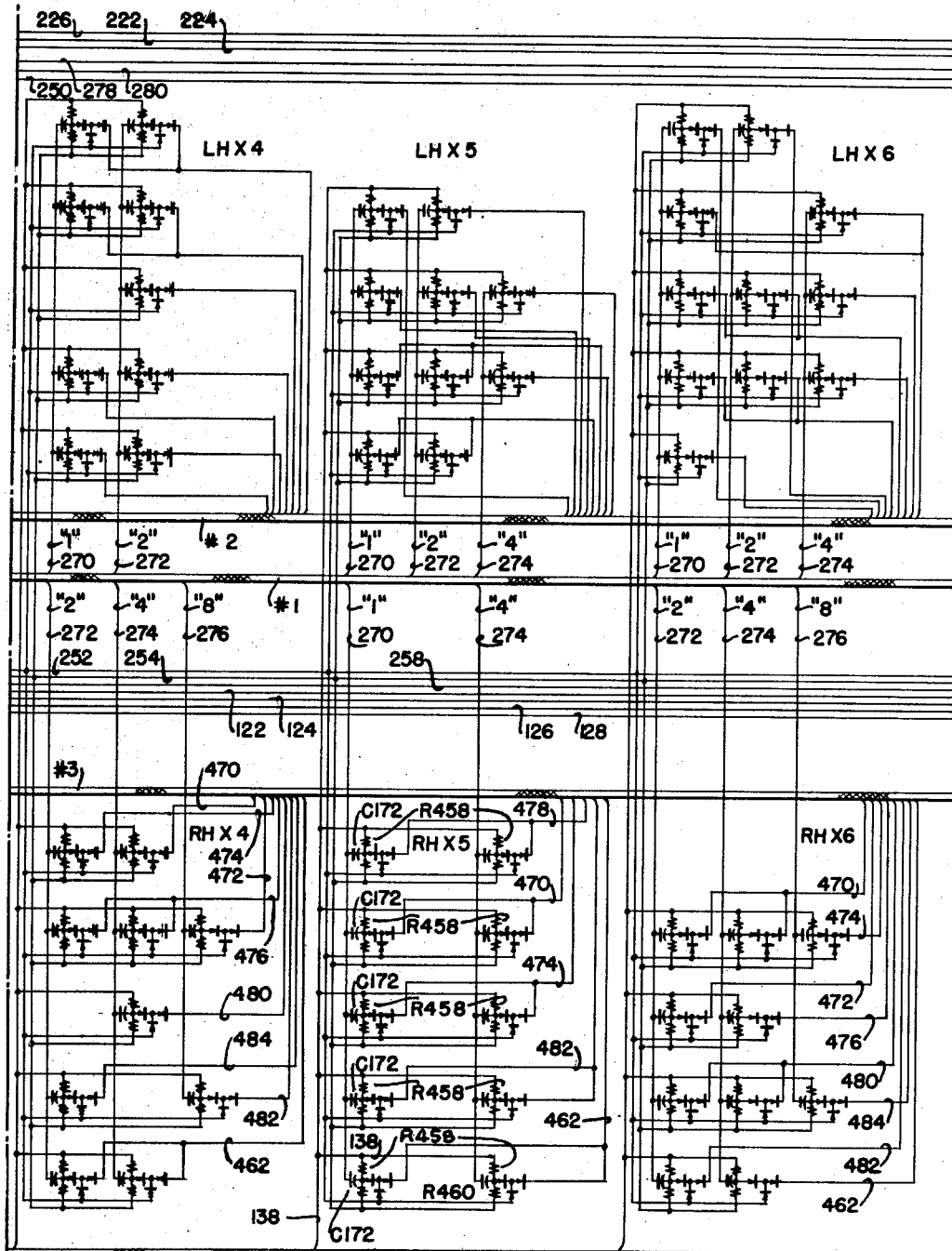
Figure 3K:
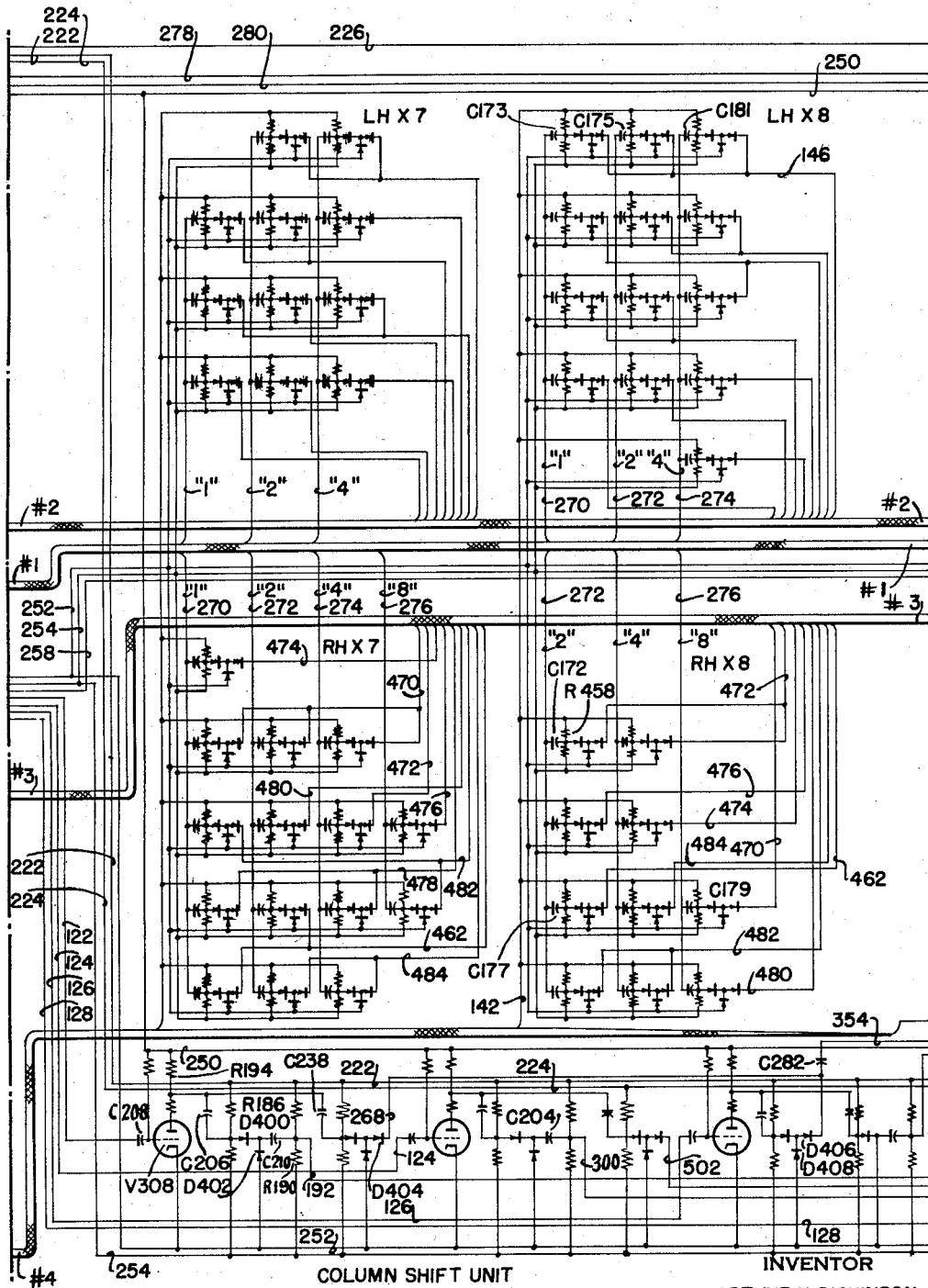
Figure 3M:
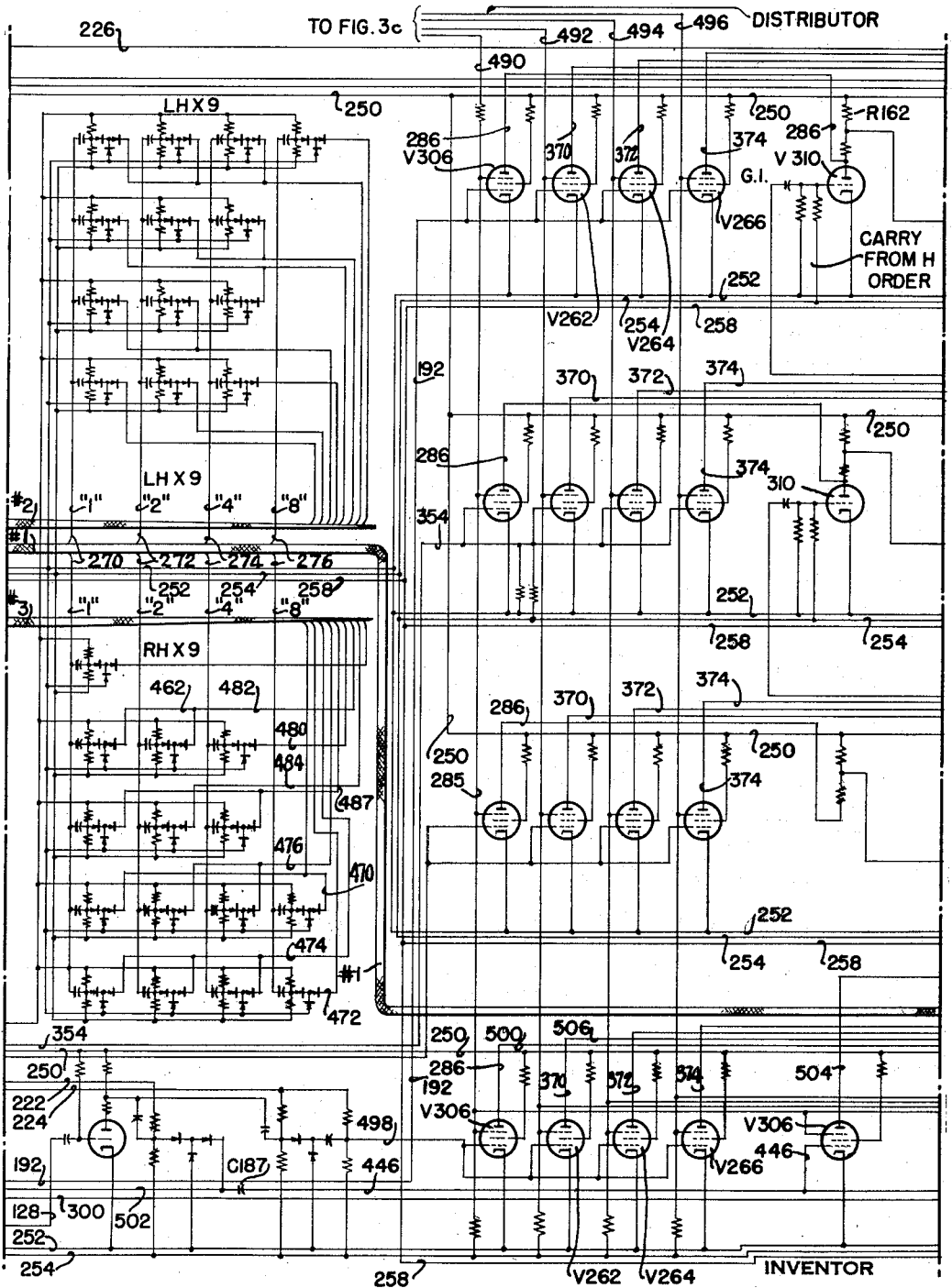
Figure 3N:
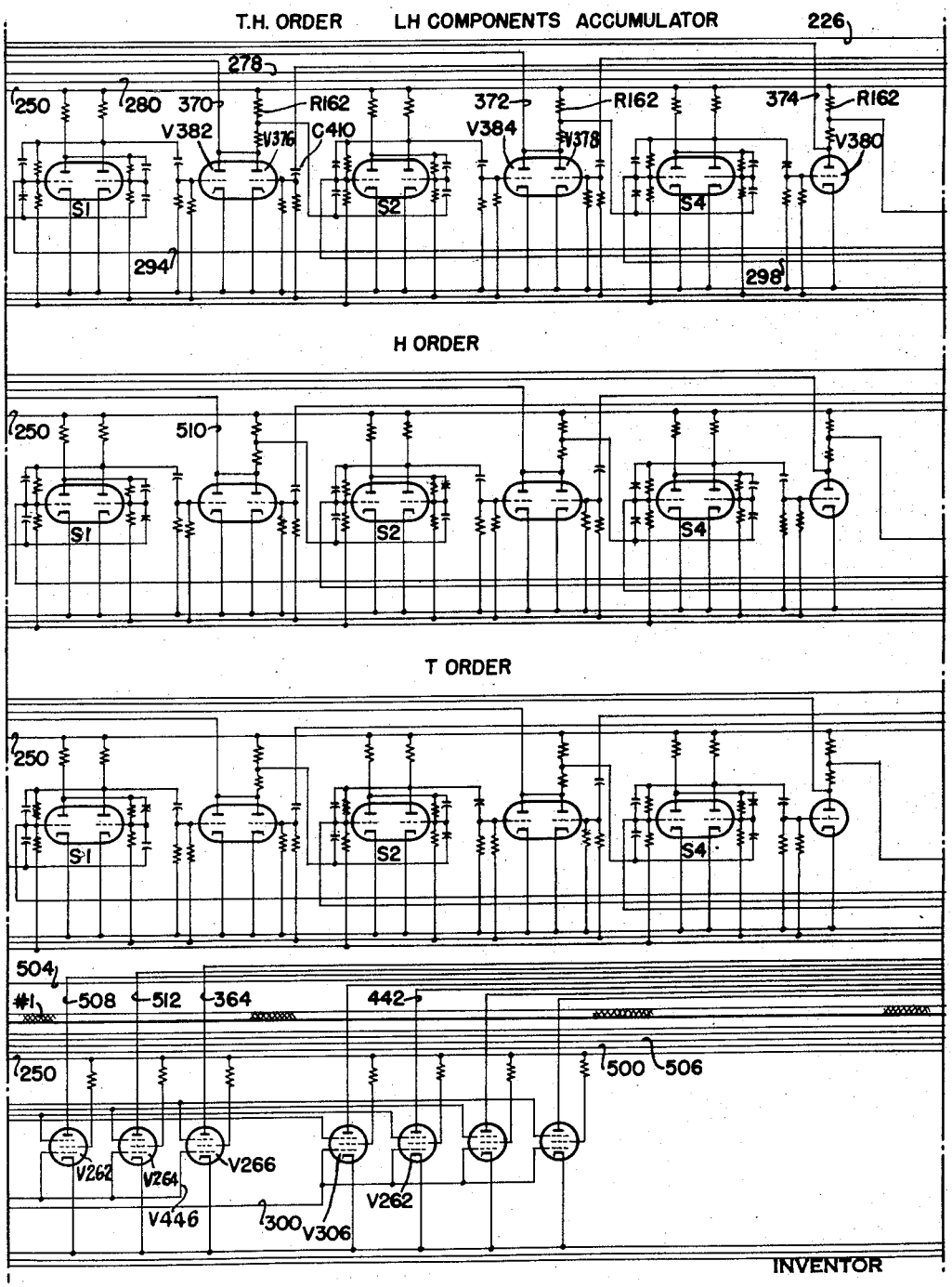
Figure 3P:
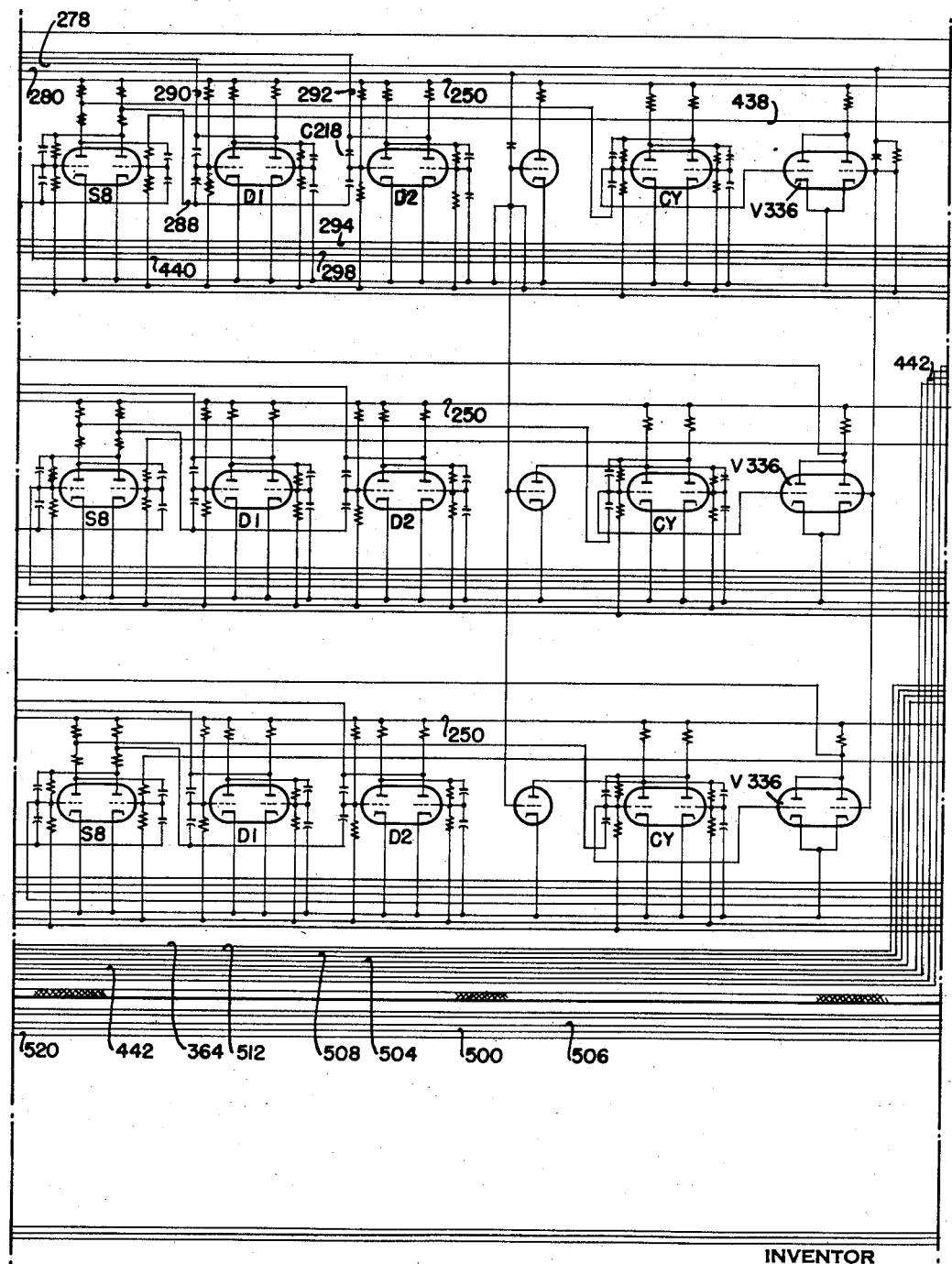
Figure 3Q:
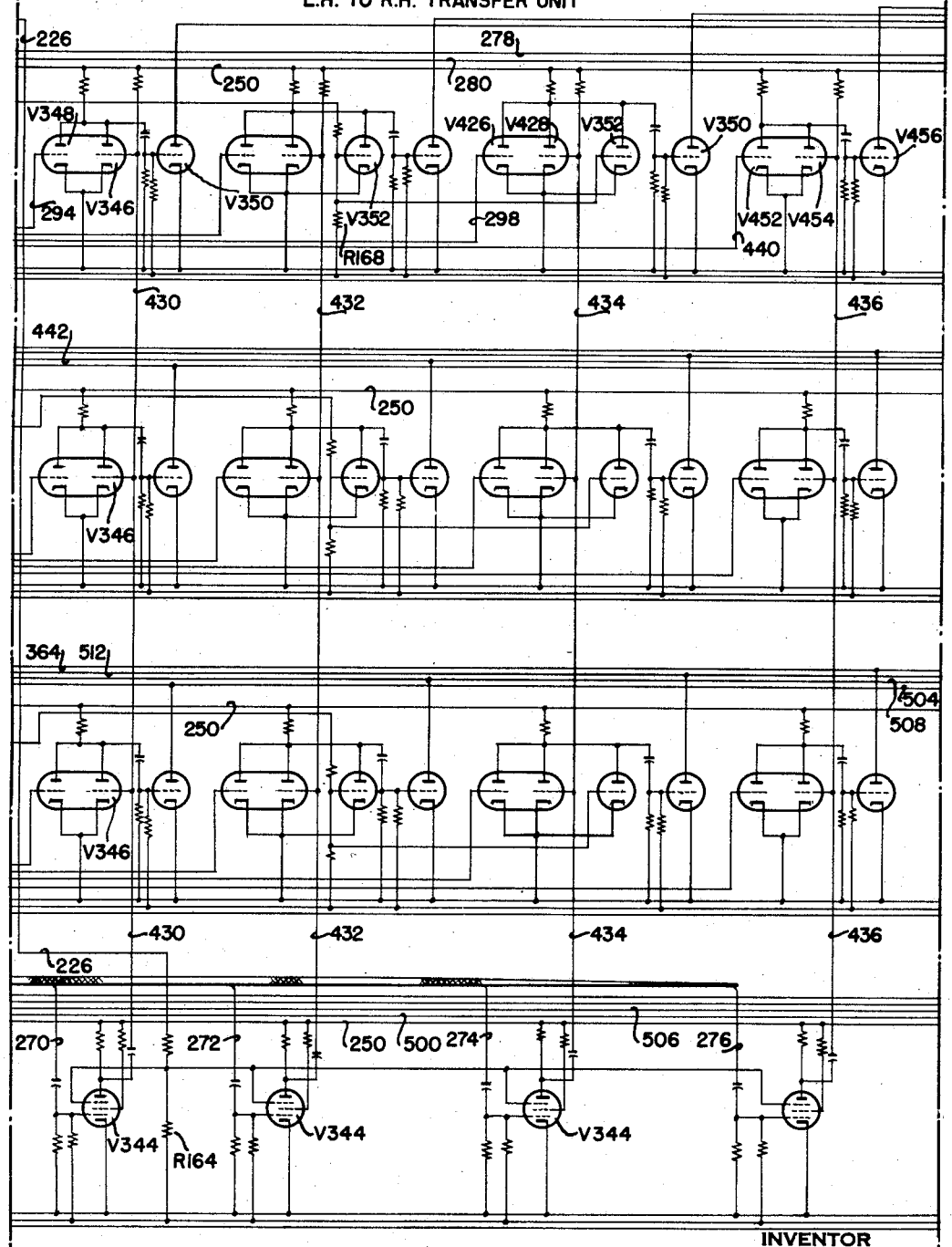
Figure 3R:
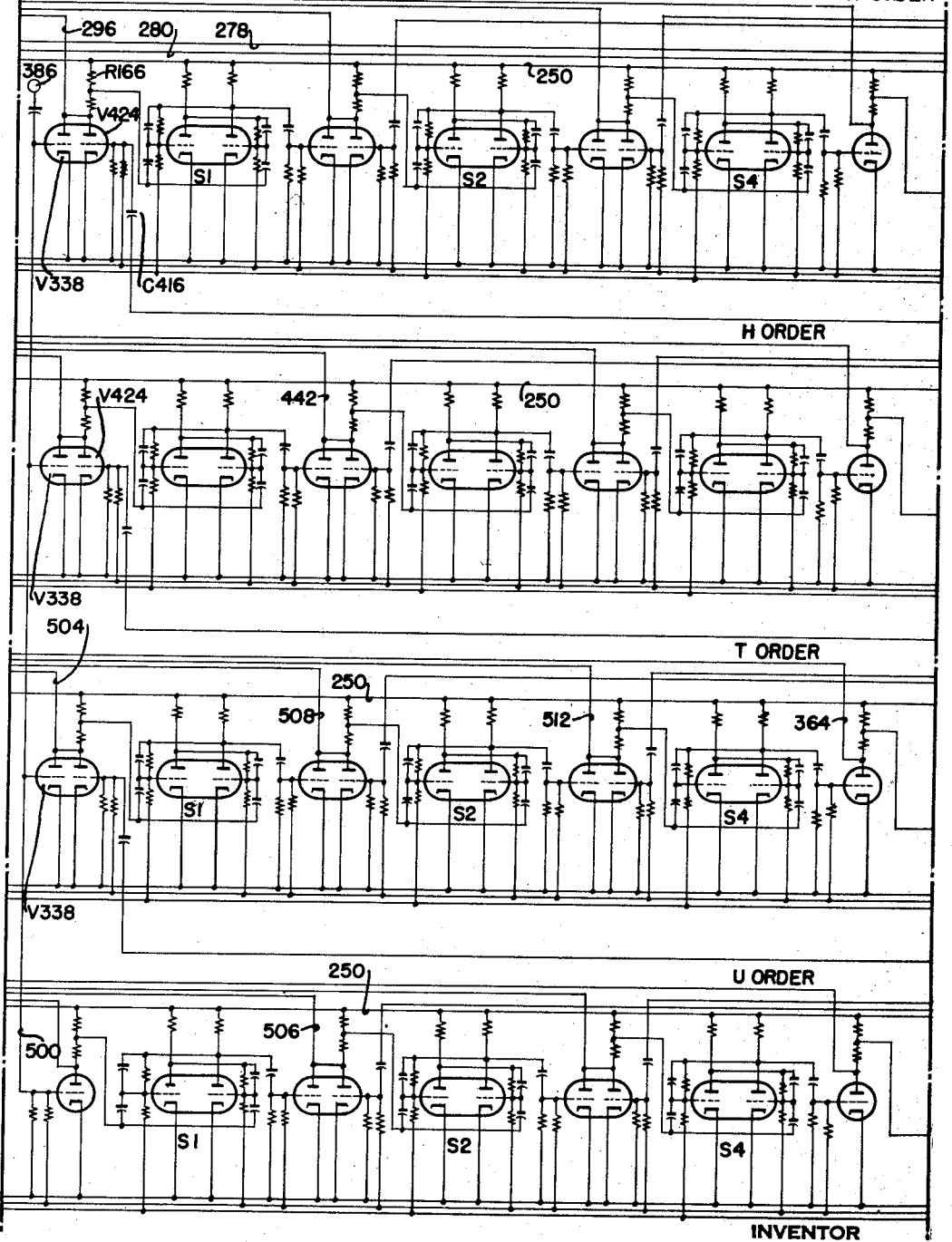
Figure 3S:
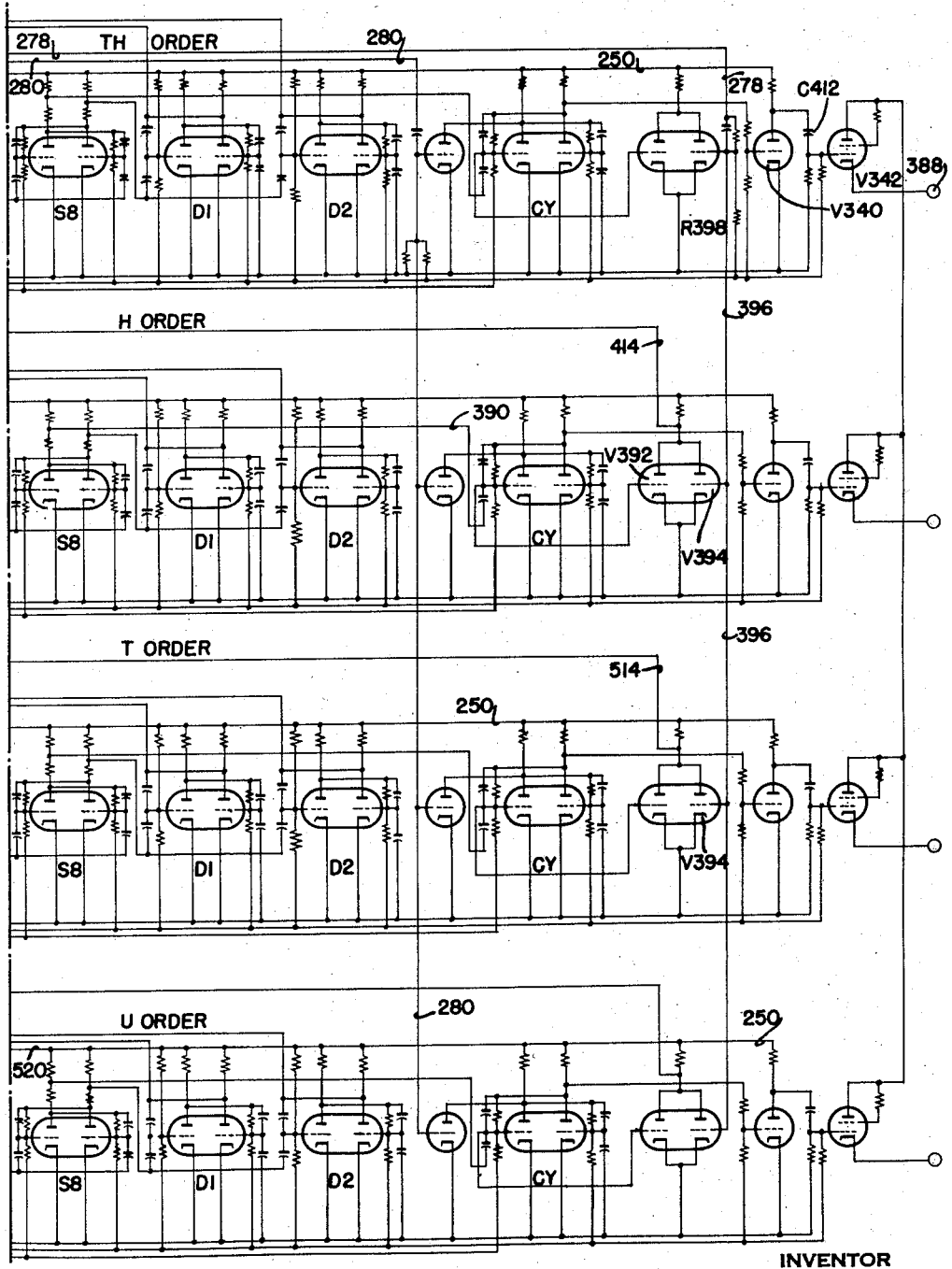

As later explained, at some index point corresponding to the value originally stored, a positive output pulse will be emitted at hubs 388 (Fig. 3s). Such output hubs are plug wired to a selected group of punch magnet hubs shown in Fig. 3a. Each plug hub feels a differential timed output pulse to a punch magnet which is effective to operate a selected punch 78 to perforate the card. The common side of the punch magnets is terminated through cam contact P10 at line 252. P10 is closed for ten index points −9− through −0−.

Bi-stable trigger circuit

A fundamental electronic trigger circuit employing vacuum tubes comprises the basic memory device in this machine. It is of the form shown in Fig. 8a in U.S. Patent No. 2,514,035. The on status of the trigger is assumed to be that condition where the RH tube is conducting while the LH tube is off.

MC register

The multiplicand entry receiving device is referred to as the MC register. Its function is to store the MC factor and to control the forming of related partial products. Each of the two orders shown comprises ten stages labelled S0 through S9 (Figs. 3b, 3c) connected in cascade. More orders may be provided for larger multiplicands. Prior to receiving an entry, the MC register is reset to zero by means which will be subsequently described.

In zero status, stage S0 is on while all other stages are off. Assume entry of MC amount is 30. With reference to Fig. 3b as will be subsequently explained, trigger T101 will be turned on by means of a positive pulse appearing at input hub 196 as a read brush makes contact through the digit −3− hole in the tens column of the card. Post 198 receives positive pulses at mid-index point nine times during read-in cycles—these being synchronous with the passage of read brushes 70 past the nine digit positions on the cards. With trigger T101 on, its tube V6 is shut off and its anode is at high potential. Thus, the voltage drop across R130 is also high, causing the control grid bias of V10 to be reduced. Since the trigger T101 was turned on from a −3− hole in the card, the three remaining pulses appearing at post 198 will be effective to generate three negative pulses on wire 50.

The first of these three remaining pulses appearing on wire 50 is effective to shut off stage S0. In so doing, a negative pulse is generated on R132 and applied via wire 52 to stage S1 which thereupon is turned on. The second pulse on wire 50 will turn off S1 which in turn will turn on S2. The third pulse on wire 50 will turn off S2 which, in going off, turns on S3. The digit −3− now stands in the tens order of the MC register. A similar process occurs in the units order of the register if there are digits in the units column on the card being read. Since, in the present example, the MC amount 30 is being entered, there will be no read-in pulses in the units order to trigger T101 and consequently no pulses will appear on wire 50 in the units order. Therefore, zero remains unchanged in this position.

Operation of the MC register output circuits will now be explained. Each stage S1 to S9 in the register has a corresponding output stage in the series O−1 to O−9. With S3 on in the tens order V4 of S3 is conducting. Its grid, therefore, is at high potential and is connected via wire 54 (Figs. 3b, 3c, 3d) to the number one grids of tubes V12 and V14, thus reducing the number 1 grid bias on tubes V12 and V14. These tubes are not conditioned for plate conduction whenever a positive pulse is applied to their number three grids. Tube V12 responds to such pules directed via wire 112 from the LH × plates (left-hand multiplying plates) while tube V14 is impulsed by the RH × plates (right-hand multiplying plates) via wire 114, C116 and wire 118. The anode of V12 is connected to the LH common output wire 122, and the anode of V14 is connected to the RH common output wire 124. The effect of the negative pulses on wires 122 and 124 will be later explained.

Since the units MC order contains a zero for which no corresponding output tube is provided this order in the present example will suppress all LH and RH pulses arriving from the × plates.

It should be observed that two output tubes V12 and V14 are provided for each stage O−2 to O−9 in the MC register in both the tens and units order and connected, as just described, for the tens −3−. One output tube controls the forming of LH components, while the other controls the forming of RH components. No output tube is provided for stage S0 or for LH output from stage S1 (O−1) since such outputs are not mathematically required.

Also, it should be understood that all orders of the MC factor are operated upon simultaneously so that maximum computing speed may be attained.

MP register

The MP register (Figs. 3e, 3f and 3g) comprises ten stages labelled S0 through S9 connected in cascade fashion similar to the arrangement just described for the MC register. MP amounts are entered in a similar fashion and simultaneously with the MC entry. That is to say, trigger tubes T101 are actuated by pulses from the respective tens and units read brushes 79 and 80 (Fig. 3a) to permit registry of mid-index pulses coming over wire 284. For example, if the digit −3− is read by the read-in brushes, three mid-index pulses will get through tubes V10 to turn on stage S3.

The MP register differs from the MC register primarily in the arrangement of its output control circuits. The function of the MP unit is to store the MP factor and to control the selecting of a multiplier relay plate, hereafter referred to as × plate corresponding to the value of the MP digit. For example, if the MP digit is a –5–, the ×5 relay plates will be selected. As previously stated, the LH and RH component system of multiplication requires MP column by column selection of × plates. Hence, each MP digit is effective during one computing cycle only. The sequential order in which the MP digits are made effective is inconsequential. However, in the present machine, the sequence progresses from the higher to the lower order under control of the column shift commutator to be subsequently described.

Each stage of the MP register, with the exception of S0, is provided with a pentode output tube V16 which is under control of its associated stage and also under control of the column shift commutator. Assume now that a digit –5– has been entered into the tens MP order. Therefore, S5 is on, and its tube V18 is shut off as is its pentode V16 whose control grid is connected via wire 134 to the grid of V18. Since S5 is the only stage in on status in the tens MP order, all tubes V16 associated with these other stages will be in conducting status. Consequently, their anode potentials will be low, and all corresponding wires 136 connected to these anodes will be at low potential. Wire 136, associated with stage S5, however, will be at high potential since this tube V16 is shut off. This wire 136 leads to output tube V22 decreasing its grid bias causing V22 to conduct. Hence, wire 138 connected to the cathode of tube V22 will be at high potential. Wire 138 leads to the diode gates located in both ×5 plates. This line, therefore serves as a control to call in a pair of × plates which contain circuits capable of generating all the possible LH and RH component partial products when multiplying by –5–.

Pentodes V16 obtain anode and number three grid potentials from the CS (column shift) commutator. Briefly, when CST (column shift tens) is on, wire 228 is at high potential. Wire 228 is terminated by means of voltage divider R144A and R144B to line 254 (Fig. 3f). The junction point on divider R144 connects to the number three grid in each tube V16 in the MP tens order. Also, wire 232 is at high potential when CST is on. Wire 232 provides anode potential for all tubes V16 in the MP tens order.

When CST is on, CSU (Fig. 1g) is off. CSU maintains low potentials on wires 230 and 234 which feed number three grids and anodes of tubes V16 in the units MP order. In this manner, only the MP tens order is effective to select a pair of × plates at this time. The converse is true when CSU is on and CST is off. Detailed description of the CS commutator will be given later.

The MP zero analyzer unit

The function of the MP Zero Analyzer Unit is to save machine cycles whenever an MP order contains a zero. Referring to Fig. 3e, it will be observed that the grids of tubes V18 and V20 in stage S0 in the MP tens order are connected via wires 140 and 148 to tubes V24, V26 and V28 in the zero analyzer unit. Similarly, stage S0 in the MP units order is connected via wires 150 and 170 to the zero analyzer unit for purposes of controlling machine cycles dependent upon appearance of either a significant digit or a zero in the MP register.

Operation of the zero analyzer unit will now be described. Computing is initiated when cam contact P11 (Fig. 3b) located in the read and recording unit is transferred. At this time, a negative pulse will appear on wire 174 which feeds to the input of the MP zero analyzer. If both orders of the MP register contain a significant digit, the zero analyzer will provide a negative pulse on wire 176 which will be effective to turn on column shift commutator trigger CST (column shift tens). On the other hand, if MP tens contain a zero, the zero analyzer unit will provide a negative pulse on wire 178 thereby turning on stage CSU (column shift-units). If both orders of the MP register contain a zero, the zero analyzer unit will generate a negative pulse on wire 180 which is effective to turn on CSTR (column shift transfer). In this case, no computing cycles will be taken by the machine, but a single transfer cycle will ensue after which an automatic stop pulse will be applied to latch up the computing unit. If a zero appears in the units order only, the zero analyzer unit will cause the turning on of CST followed by the turning on of CSTR, thus skipping the CSU machine cycle. The latter case will be taken as an example for the detailed circuit description.

We will assume that P11 contact has just transferred to cause a negative pulse to appear on wire 174 and on capacitor C200, and thence to the parallel connected grids of tubes V30, 32 and 34, thus increasing the negative bias thereof. The aforementioned three tubes form parts of three separate triode gate circuits which are to select the proper output channel required in this example, e.g., the appearance of a negative pulse on wire 176. Since it has been assumed that a significant digit is entered into the MP tens order, stage S0 of that order will be off. Consequently, its tube V20 is shut off and wire 148 will be at low potential maintaining tube V28 shut off. Thus, upon the application of the negative pulse on wire 174 to the grid of the tube V30, V30 will be shut off and the common connected anodes will rise in potential and via C202 will apply a positive pulse to tube V36 causing it to conduct, thus generating the required negative pulse on wire 176. Although the above mentioned negative pulse on wire 174 is also applied to tubes V32 and V34, no output results from their respective gates because these gates are blocked at this time. Since MP tens stage S0 is off, wire 140 is at high potential. Thus, tubes V24 and V26 conduct to block their associated gates.

In the present example, the MP units order contains a zero. Therefore, the MP zero analyzer is required to save a machine cycle by advancing the CS commutator to its transfer cycle position, thereby eliminating an unnecessary cycle where the MC factor would be multiplied by –0–.

Near the end of the first machine cycle in a manner to be later described, the CST trigger will be turned off. Its RH anode will rise in potential to apply a positive pulse on wire 220. This positive pulse is applied to the parallel connected control grids of pentodes of V38 and V40. Since units MP contains a zero its stage S0 will be on. Accordingly, its tube V18 is shut off, and its anode is at high potential. This high potential is effective via wire 150 to maintain the suppressor grid of tube V38 at zero bias. Upon application of the positive pulse to wire 220, V38 will conduct. The resulting negative pulse on its anode will be applied via wire 180 to turn on trigger CSTR as required. It should be noted that the positive pulse concurrently applied by wire 220 to the control grid of tube V40 is ineffective to produce an output pulse on wire 178 at this time because the units MP stage S0 is on. With S0 on, wire 170 is at low potential and the V40 suppressor grid is thereby maintained at cut-off potential to prevent conduction through tube V40. Tube V40, therefore, cannot provide an output pulse on wire 178 and trigger CSU remains off.

Column shift commutator

The column shift commutator, hereafter referred to as the CS commutator, comprises one trigger stage for each column of MP register, plus one additional stage used for controlling LH and RH component transfer. As previously explained, the MP zero analyzer causes the CS commutator to advance one step provided both MP orders contain significant digits, or to skip any column shift position corresponding to either MP order which may contain a zero.

The function of the CS commutator is to sequentially allow multiplication to progress under column by column control of the MP digit value. Therefore, the CS commutator must control the selection of MP order which is to be effective during each computing commutator cycle, and to select the channels for routing the LH and RH components into their proper positions in the component accumulators. Also, after all partial products have been registered, the CS commutator switches the LH to RH component transfer circuits into operation so the complete result will be registered in the Products Accumulator. At the completion of this operation, the CS commutator provides a pulse to stop the compute commutator.

Since detailed description pertaining to the turning on and off of CS commutator stages has already been given under the heading MP Zero Analyzer Unit, only the output circuits will be treated here.

The CST trigger, when in on status, is in the condition where its left-hand tube V304 is shut off. Thus, the V304 grid is at low potential, as is the direct-connected grid of the tube V302 which, therefore, is shut off. The anode of V302 is now at high potential, and by voltage divider connection, causes output tube V300 to conduct through its load resistor R182, thus maintaining the potential of wire 222 at its higher value as long as CST is on.

A circuit similar to that just described causes a high potential to appear on wire 224 whenever CSU is on.

Wires 222 and 224 are connected to the CS switches in order to control the entry of LH and RH components into the proper orders of LH and RH component accumulators.

Similarly, wire 226 is maintained at high potential whenever CSTR is on, and thus places the LH to RH transfer unit into operation during transfer cycles.

The CS commutator is advanced by application of a negative pulse to wire 184 by means of the compute commutator near the end of each compute cycle. Since a transfer cycle must occur before each computation is completed, the CSTR trigger is invariably in on status during the last compute commutator cycle. The next negative pulse on wire 184 is effective to turn CSTR off. As a result of CSTR turning off, a positive pulse appears on wire 236. This positive pulse is utilized to turn off trigger T102 which causes the compute commutator to latch up at zero.

CST and CSU each have two additional outputs which are necessary for controlling the MP register. Wires 228 and 230 are controlled by CST and CSU, respectively, to control the suppressor grid potentials of pentodes V16 in the MP register. When CST is one, for example, tube V44 is shut off. Therefore, its anode and wire 228 are at high potential. Wire 228 is connected via a voltage divider R144A and R144B so as to reduce the suppressor grid bias and thereby partially condition the pentodes V16 in the MP tens order. The control grids of tubes V16 are wired to their associated S1 to S9 stages in such a manner that all such stages which are in off status will cause their associated tubes V16 to conduct, provided adequate positive plate supply voltage is available. Therefore, these tubes V16 will produce low anode potentials. If, however, the MP tens order contains a significant digit, one of its stages S1 to S9 will be on, and its associated tube V16 will be shut off by virtue of a low potential on its control grid. Consequently, its anode potential will be high.

Tubes V16 in the tens order MP receive anode supply voltage from V48 associated with CST. With CST on, pentode V46 is shut off, and its anode is at high potential causing V48 to conduct. A pentode is chosen for V46 since a wide anode potential excursion is desired for adequate control of V48. Tube V48 is preferably a triode having a very low plate resistance such as the type 6AS7G.

With V48 conducting, its cathode and wire 232 will be at high potential which is nearly that of line 250. Wire 232, therefore, supplies the operating anode potential for all tubes V16 in the tens MP order when CST is on. On the other hand, when CST is off, wire 232 will be at low potential, thus preventing any tube V16 in the tens MP order from developing a high anode potential. The tens MP, therefore, is ineffective to control computing operations at this time. Similarly, tube V48 associated with CSU controls the potential of wire 234 which supplies anode potential to the tubes V16 in the units MP when CSU is on.

*Compute commutator*

The compute commutator comprises six stages labeled S1, S2, S4, S8, C1 and C2. These stages are cascade connected in such a manner that the pattern of operation is sequenced in the order given above. This commutator comprises a ring-type commutator where only one stage can be in on status at any given time. When any stage is on, a negative going pulse on wire 242 is effective to turn it off. In going off, a negative pulse is applied to the succeeding stage turning it on and progressing in that manner until the last stage C2 is turned off. Stage C2, in going off, applies a negative pulse to the first stage S1. This pulse may or may not be effective to turn on the S1 depending upon other conditions to be subsequently described. The purpose of the compute commutator is to electronically time all pulses utilized during compute cycles.

The compute commutator is started under control of cam contact P11 located in the read record unit. When P11 contact is in the position shown in Fig. 3b, capacitor C212 is charged to the potential of the junction point on voltage divider R152, R154 which is connected between lines 250 and 252. After the multiplying factors have been read from the card into the factor registers cam contact P11 is transferred, causing compute start trigger T104 to be turned on and generating a negative pulse on wire 244 which is effective to turn T102 on. With T102 on its right-hand tube is conducting and its grid is, therefore, at zero bias, as is the parallel-connected control grid of V312, thereby partially conditioning this tube to conduct. The next positive-going pulse appearing on wire 240 is applied to the suppressor grid of V312, thereby causing plate conduction. The anode of V312 is parallel-connected to the anode of the LH tube in trigger T104. Consequently, when V312 conducts, it is effective to turn off compute start trigger T104.

When trigger T102 was turned on, the bias on the grid of its RH tube was reduced to zero as was the parallel-connected grid of V314, thus generating a negative pulse on wire 174 which leads to the MP zero analyzer unit. The effect of this negative pulse on wire 174 has been previously explained in the section describing operation of the MP zero analyzer.

Whenever compute start trigger T104 is turned off, the positive pulse appearing on wire 246 is impressed at the grid of tube V316. The parallel-connected anode of V316 is effective to turn on stage S1 in the compute commutator. S1 will remain on until the next negative-going pulse appears on wire 242. Thus, stage S1 of the commutator is on for one cycle point. As is now understood, as S1 turns off, it turns on stage S2. S2 in turn is on for one cycle point and in turning off, it turns on stage S4. Progressing in this manner, a compute commutator cycle is completed when stage C2 turns off.

In the machine of the present case, at least one compute commutator cycle is required and a maximum of three commutator cycles can be obtained in performing a complete multiplication. If both the MP and MC factors read in from the card are zeros, the compute commutator will take one cycle but no LH or RH components will be generated. At the end of this cycle, a compute stop pulse will be applied by CSTR to wire 236 which is effective to turn off trigger T102. With T102 off, its LH tube is conducting and its grid is at zero bias, as is the parallel-connected grid of V318. The anode of tube V318 is direct-connected to the LH tube of stage S1, thus blocking S1 so that it cannot be turned on. Therefore, at the completion of this compute commutator cycle which is measured by the turning off of stage C2, even though the negative pulse appears upon wire 248, stage S1 remains blocked in off status and the compute commutator becomes latched up.

On the other hand, if, for example, both MP and MC registers have received significant digits, the compute commutator would take three complete cycles because compute trigger T102 will remain on until the end of the third cycle. Therefore, the pulse appearing on wire 248 near the end of the first two cycles will be effective to initiate another cycle.

The output circuits of the compute commutator include five double triode gates. The purpose of these gates is to apply output pulses on wires 270, 272, 274, 276 and 278. The pulse on wire 270 is generated as follows: when stage S1 of the commutator is on, its left-hand grid is at low potential, as is the parallel-connected grid of tube V320. Consequently, the triode gate comprising tubes V320 and V321 is partially unblocked. Consequently, when the next negative-going pulse appears on wire 240, tube V321 will be unblocked, thereby decreasing the drop across resistor R156 and increasing the drop across R158. This causes cathode follower V322 to generate a positive pulse on wire 270. This pulse is timed midway during the first cycle point as can be seen by referring to Fig. 5 which shows the electronic timing diagram. Similarly wires 272, 274 and 276 receive positive impulses midway in the −2−, −4− and −8− cycle point intervals. These four lines carry the afore-mentioned mid-index pulses to input terminals on each of the 17 × plates and also the LH to RH transfer unit. Thus, the compute commutator provides differential timed impulses which are required for the multiplying circuits.

Three additional control pulses are required to be generated by the compute commutator. For example, a negative pulse must be applied to wire 184 for the purpose of advancing the CS commutator. This pulse must appear midway in the last cycle point, namely, when stage C2 is on. At this time the LH tube of stage C2 is at cut-off bias as is the parallel-connected tube V324. Therefore, when the next negative-going pulse on wire 240 is applied to tube V326, the drop across R160 is decreased and a resulting positive pulse is applied to the grid of V328. V328 thereupon conducts and generates the required negative pulse on wire 184 connected in its anode circuit.

The last two cycle points of each compute commutator cycle are reserved for effecting necessary carry operationse in the component accumulators. Such operations require that a negative potential be maintained on wire 278 during these last two cycle points. This condition is satisfied in the following manner: Trigger T106 is turned on by a negative pulse applied to wire 366 by the turning on of stage C1. This trigger T106 remains on until stage C2 is turned off. The going off of stage C2 applies a negative pulse to wire 248 which is effective to turn off T106. As long as T106 remains on, its right-hand anode is at low potential and cathode follower V368 is maintained in a low conducting status. Its cathode and wire 278 thereby provide the required controlling potential for the aforementioned carry operations.

As trigger T106 is turned off at the end of a compute commutator cycle its RH anode rises in potential. Hence, a positive pulse is applied via C214 to the grid of tube V330 causing it to conduct, and the negative pulse on its anode is applied to the grid of tube V332 momentarily shutting it off. The resultant positive pulse on the anode of V332 is transmitted via wire 280 to the LH and RH component accumulators for the purpose of restoring any carry triggers which may have been previously turned on. This same wire is utilized for effecting reset of carry triggers during record cycles. Such reset is desired to insure that no further perforations will be made in the card after the required one has been punched.

During record cycles, the record unit generates positive pulses at mid-index times which are applied to post 198 in the MC register input circuit. These positive pulses appearing at post 198 are applied via capacitor C216 (Fig. 3b) to wire 284, eventually reaching the grid of tube V334 (Fig. 3e), causing it to momentarily conduct, thus applying a negative pulse to the grid of V332 which, as before, generates a positive pulse on wire 280 which again is effective to restore any carry trigger which may have been turned on in the products accumulator.

The basic impulses for operating the multiplying circuits of this machine are provided by the pulse generator 120 of the type fully described in U.S. Patent No. 2,514,023. It is sufficient to state that the output of this generator is in the form of two continuous trains of square wave impulses (Fig. 5), each 180° apart. One set of pulses is applied to wire 240 and the second set is applied to wire 242.

× *plates*

A complete set of nine multiply relay plates or × plates is provided for setting up all possible values of RH components, while a set of eight × plates is provided for setting up the LH components. The × plates are labelled LH ×2, ×3, ×4, etc. and RH ×1, ×2, ×3, etc. × plates are selected under control of a single MP order digit at any given time. In this machine, when the compute start pulse turns on a CS trigger, a digit in one order of MP register will immediately select a pair of × plates corresponding to the value of the MP digit. For example, assuming that the MP factor is −37−, the CST trigger will be turned on when the P11 contacts transfer. When CST is on, the MP tens order will select the ×3 plates since digit −3− stands in the tens order of MP. During the initial compute commutator cycle which follows, the MC factor will be multiplied by −3−. However, the resulting LH and RH components are directed via certain channels so their entry into the component accumulators will equal the product obtained when the MC factor is multiplied by −30−.

Near the end of the carry portion of the first compute cycle the CST trigger will be turned off and CSU will turn on. With CSU on, the MP units order which contains a −7− will select the ×7 plates. During the second compute cycle the MC factor will be multiplied by −7−.

Each × plate contains a predetermined combination of dioded gates of the type employed in the CS switch unit. Since detailed description of the operation of this type of gate is given in the discussion of the CS switch unit, it will not be repeated here. All × plate gates are alike and comprise the arrangement shown, for example, in the lower part of the RH ×5 plates (Fig. 3j), i.e., capacitor C172 connected to voltage divider R458, R462 and thence to three crystal diodes as shown. A positive potential applied to R458 prepares the gate to allow a positive pulse from C172 to through the right-hand diode. If R458 is not made positive, the pulse from C172 goes through the lower diode only.

The specific combination of diode gates in any given × plate is determined by the corresponding mathematical times table. For example, the right-hand ×3 plate contains a group of fifteen diode gates so connected that all RH binary components resulting from the multiplication of 3×1, 3×2, 3×3, etc. through 3×9 will be generated. Similarly, the left-hand ×3 plate contains a group of six diode gates which generate all possible LH binary components when digits −1− through −9− are multiplied by −3−. All components are in the form of binary combinations represented as partial differential values.

As previously stated, the MP register selects the pair of × plates to be used during each computing cycle. It has been mentioned, for example, that a positive potential on wire 138 (Fig. 3j) is effective to select the ×5 plates. Wire 138 leads from MP output tube V22, associated with the MP stages S5, and connects to a voltage divider R458, R460 in each diode gate located in the ×5 plates. As is now understood, a positive potential applied via wire 138 to any gate resistor R458 is effective to condition that gate for producing an output pulse whenever a positive input pulse is applied via capacitor C172 associated with that gate.

Such positive input pulses are the differential pulses generated by the compute commutator and are fed to the various × plates via wires 270, 272, 274 and 276 (Fig. 3d and Fig. 5). It should be observed that each MP output line, such as wire 138, is effective to condition all gates in its associated × plates for an interval of time greater than the adding portion of the compute cycle. Also, the differential timed pulses –1–, –2–, –4– and –8– occur at mid-cycle-point times within the adding portion of the cycle. Thus the conditioning interval of the gates is established to adequately span the times when differential pulses will arrive to effect output pulses from the gates.

The RH × plate output lines are fed to a group of nine wires leading to the pentode gates located in the MC register. Wire 462 (Figs. 3e and 3 h, j, k, m) is one such output line. Specifically it is the line which carries the RH component values produced by any selected RH × plate involving a multiplation of digit –9–. For example, if the ×5 plates have been selected, differential –1– and –4– pulses will appear on wire 462 in the RH ×5 plate. The –1– and –4– represent the binary equivalent of digit –5–, and –5– is the RH component resulting from the multiplication of 5×9.

On the other hand, if the ×3 plates had been selected, differential values –1–, –2– and –4– would appear on RH ×3 plate output wire 462. Differential values –1–, –2– and –4– are the binary equivalent of digit –7–, and –7– is the RH component resulting from the multiplication of 3×9. Since wire 462 as well as corresponding wires in each of the remaining RH × plates all connect to main output wire 462, it is obvious that wire 462 must lead to the RH MC pentode gate controlled by its S9 stage in each order of MC. Thus any order of MC which may contain a digit –9– will pass along the RH component values on wire 462 to the CS switch unit. On the other hand, any order of MC which does not contain a –9– will block out the RH component values appearing on wire 462.

In a similar manner, outputs from the LH × plates are applied to a group of output wires, such as wire 468, shown in Figs. 3 h, j, k, m. However, since multiplication of any digit 1 through –9– by –1– fails to produce a LH component, the LH output wires total eight in number instead of nine required for the RH × plates.

In order to more clearly understand the circuit arrangement of diode gates required to produce the partial differential component values, the ×2 plates will be described in detail.

Since 2×1 equals 2, a diode gate is provided in the RH ×2 plate for directing a differential –2– pulse to output wire 470. The 2×2=4 gate connects to wire 472.

The 2×3=6 gate comprises two diode gates whose outputs are parallel-connected to wire 474. The first gate places a –2– and the second places a –4– pulse on wire 474.

The 2×4=8 gate sends an –8– pulse to wire 476.

The 2×5=10 gate is not required in the RH × plate since the RH component is –0– and therefore no connection is made to wire 478 from the RH ×2 plate. However, the LH component is a –1–. Therefore, the LH ×2 plate includes a diode gate which sends a –1– via wire 486 to output wire 488.

The 2×6=12 gates include one gate in the RH plate which sends a –2– to wire 480, and another in the LH plate which sends a –1– to an output wire not numbered, but which feeds the MC –6– LH output gates.

The 2×7=14 gates include a RH –4– gate connected to wire 482, and an LH –1– gate feeding the MC –7– output gates.

The 2×8=16 gates include RH –2– and –4– gates feeding wire 484 and an LH –1– gate feeding the MC –8– tubes.

The 2×9=18 gates include an RH –8– gate feeding wire 462 and an LH –1– gate feeding the MC –9– tubes.

The internal gate connections required in other × plates may be similarly analyzed.

It is now clear that all possible RH and LH components in a given pair of selected × plates are generated simultaneously during each compute cycle. It is the function of the MC register to use or to reject RH and LH components as required according to the value of the MC factor.

*Column shift switch unit*

The CS switch unit comprises a group of electronic switches employing vacuum tubes and crystal diodes. Its function is to select proper channels under control of the column shift commutator for entering the LH and RH components into the proper order in the component accumulators. When CST in the CS commutator is on, a positive potential is maintained on wire 222. This potential conditions the column shift (CS) switches to direct the LH and RH components into the higher order positions of the component accumulators.

Referring to Fig. 3k, a positive potential on wire 222 (from CST when on—Fig. 3g) raises the voltage drop across divider R186 and R188, thus raising the potential of the intersection between these two resistors to which the anode of diode D400 is connected. Thus, the potential applied across diode D400 is in the forward direction with respect to this diode. The cathode of D400 is connected to the cathode of D402, the anode of D402 being connected to line 252. Therefore, the potential across diode D402 is applied in the inverse direction and D402 consequently presents a high resistance. The diode switch is now in condition to produce an output pulse whenever a positive pulse is applied via capacitor C206. Also, the positive potential on wire 222 increases the voltage drop across R190 thus via wire 192 partially conditioning tube V306 (top of Fig. 3m) to conduct.

During computing cycles, a negative pulse may appear, for example, on wire 122 (from the LH output of MC register tens—Figs. 3d and 3e). This pulse is applied via capacitor C208 to the grid of zero biased tube V308, thus momentarily shutting it off. Consequently, a positive pulse will appear across resistor R194. This positive pulse is applied simultaneously to the inputs of two diode gates, one of which has already been conditioned by virtue of a positive potential on wire 222. The second gate is not conditioned since its control wire 224 (cf. Fig. 3g) is maintained at low potential because CSU in the column shift commutator is off. Thus, the second gate will produce no output pulse on its wire 268. The first switch receiving the positive pulse via capacitor C206 will produce a positive pulse at the junction point of diodes D400 and D402 which is coupled via capacitor C210 and wire 192 to the grids of tubes V306, V262, V264 and V266 located in the distributor unit (Fig. 3m—top). Operation of the distributor unit will be subsequently described in detail.

When the CS commutator advances one step where CSU is on, the second gate is conditioned by a high potential on wire 224, as has been previously explained. Negative pulses arriving from the MC register via wire 122 are again effective to momentarily shut off tube V308 to produce positive anode pulses which are applied via capacitor C238 to the second gate. This gate is already conditioned as explained above, and, therefore, will apply output pulses via wire 268, capacitor C282, and wire 354 to another group of four tubes in the distributor unit.

It should be appreciated that the first and second gate circuits operate in substantially similar manner. The first gate serves to column shift or direct the tens MC LH component values into a specific channel leading eventually to the TH order of the LH component register, while the second gate directs the tens MC LH component values eventually to the H order of the LH register.

The output circuits of these two gates differ in detail since the output of the second gate is operated in parallel with still another gate. For this reason, all such parallel-operated gates are provided with a third diode which acts as a one-way coupling device. For example, the second gate is provided with an additional diode D404. The output of this gate is operated in parallel with another gate which is shown as the fifth gate in the CS switch unit circuit. This fifth gate is provided with a diode D406 which corresponds with D404 in the second gate circuit. Since these two gates are never simultaneously conditioned, only one or the other will produce a positive output pulse at any given instant of time. If, for example, the second gate produces a positive output pulse, D404 will operate in its forward or low resistance direction to apply a substantial positive pulse on wire 268. Diode D406, also connected to wire 268 will then be operated in its reverse or high resistance direction and, therefore, serves to decouple the fifth gate. Since the fifth gate is inoperative at this time, its diode D408 is biased in the forward direction. In this condition, D408 presents a low value of resistance which would seriously attenuate the desired pulse on wire 268 if diode D406 were not included in the circuit.

It will be observed that all X-plate gates have parallel-connected outputs and, therefore, each gate includes this third diode for decoupling purposes.

The circuits just described are representative of all CS switch circuits and, therefore, no further description is deemed necessary.

*Distributor*

As is now understood, the LH and RH component values are routed from the X plates through the MC register, thence to the CS switch unit and finally to CS output wires such as 192 and 354. These components are in the form of partial differential values potentially containing all usual combinations of 1, 2, 4 and 8 pulses on each wire. Obviously these differential values must be spread out into four channels, each of which will contain only one class of differential values. Thus, the –1– pulses must be directed into the –1– channel, the –2–'s into the –2– channel, etc., so that the components may be entered laterally into the component registers. Such separation and distribution is the function of the distributor unit.

The distributor comprises a group of four pentode gates for each CS output wire such as 192 or 354. Wire 192, for example, applies positive pulses to the #1 grids of pentodes V306, V262, V264 and V266. These positive pulses comprise binary combinations of –1–, –2–, –4– and –8– differential values. The #3 grids of tubes V306, V262, V264 and V266 are controlled by wires 490, 492, 494 and 496 respectively. These four wires are connected to the compute commutator. Wire 490, for example, is connected to the anode of a tube V42 located in the compute commutator. The grid of V42 is direct-connected to the LH grid of commutator stage S1. Thus, when stage S1 is on, tube V42 is non-conducting and its anode is at high potential. Therefore, wire 490 is also at high potential as long as S1 is on. Since S1 remains on for one cycle point, wire 490 and its associated voltage divider maintain the first tube V306 in each distributor group in grid #3 zero bias condition during the first compute cycle point. Hence, when any tube V306 receives a differential –1– pulse it will conduct, causing a negative anode pulse to appear on wire 286 and register R162. This negative pulse is effective to reverse the status of stage S1 in the LH components TH order, which is equivalent to entering a –1– in that order.

Similarly, wire 492 is maintained at high potential during the second cycle point, and consequently a differential –2– pulse appearing on wire 192, for example, will be effective to render tube V262 plate conductive. Wire 370 will transmit the resulting negative pulse to R162 and stage S2 in the LH components TH order. Therefore, stage S2 will be reversed to register the entry of a –2– in that position.

The –4– and –8– pulses are similarly distributed. Other groups of distributor gates distribute and direct the component values to proper LH and RH component register orders.

*LH component register*

The LH component register or accumulator (Figs. 3n and 3p) receives the LH partial differential values generated in the X plates and MC register during multiplying. It comprises three orders labeled TH, H and T. Each order includes fundamentally four stages S1, S2, S4 and S8 for registering respectively the binary components –1–, –2–, –4– and –8–. Each stage comprises a basic trigger circuit employing vacuum tubes and arranged such that when any stage goes off it reverses the next, although in going on it leaves the next unaffected. The trigger circuits are connected in cascade fashion and are thus serially responsive to impulses applied at wires 286 or through tubes V310 as carry impulses from a lower order. Adjusting circuits are provided for maintaining each order in the tens notation, these being in the form of an arrangement described below which causes S8 whenever turned on to turn on also S2 and S4. Carry circuits are also provided for determining and applying a carry to the next higher order when a lower order passes from –9– to –0–. Each order is also arranged for the lateral entry of partial differential values (at wires 370, 372 and 374). Such method of effecting an entry requires that in addition to the usual cascade connections between one trigger and the next, each stage must be provided with an independent input which must be capable of switching its related trigger to its alternate status.

Three lateral input lines 370, 372 and 374 lead to the anodes of tubes V376, V378 and V380, respectively. Tubes V382, V384 and V380 associated with stages S2, S4 and S8, respectively, are utilized for impulsing these stages from the stage preceding it whenever those preceding stages are turned off. Anode load resistors R162 develop increased voltage drops when entry pulses are received. The resulting negative pulses are effective to reverse the status of their associated stages S1, S2, S4 and S8, respectively.

Prior to receiving any entry pulses it should be understood that the component accumulator must be reset to zero status. Chart A, below, indicates the manner in which an order of the component accumulator responds to entry pulses applied to the first stage only.

CHART A.—COMPONENTS ACCUMULATORS
[0=off]

| Entry pulse No. | S1 | S2 | S4 | S8 |
| --- | --- | --- | --- | --- |
| 0 | 0 | 0 | 0 | 0 |
| 1 | ON | 0 | 0 | 0 |
| 2 | 0 | ON | 0 | 0 |
| 3 | ON | ON | 0 | 0 |
| 4 | 0 | 0 | ON | 0 |
| 5 | ON | 0 | ON | 0 |
| 6 | 0 | ON | ON | 0 |
| 7 | ON | ON | ON | 0 |
| 8 | 0 | ON[1] | ON[1] | ON |
| 9 | ON | ON | ON | ON |

[1] Initial position reversed by D1 and D2—see below.

it will be seen that each pulse up to the seventh establishes a true binary representation of its number by the ON tubes; i.e., for the seventh pulse –1– + –2– + –4– which equals seven. The eighth and ninth pulses are represented by binary –14– (–2– + –4– + –8–) and –15– (–1– + –2– + –4– + –8–), respectively. By this means the tens notation is preserved.

Chart B indicates the manner in which an order responds to successive lateral entries of partial differential values –9– through –1– commencing with the initial zero setting.

CHART B.—COMPONENTS ACCUMULATORS
Lateral Entry of Partial Differential Values
[0=off]

| Digits entered in order of 9 to 1 | Partial diff. value entry | Result | S1 | S2 | S4 | S8 | CY |
|---|---|---|---|---|---|---|---|
| 9 | 1 | 0 | 0 | 0 | 0 | 0 | 0 |
|   | 8 | 9 | ON | ON¹ | ON¹ | ON | 0 |
| 8 | 8 | 7 | ON | ON | ON | 0 | 0² |
|   | 1 |   | 0 | ON¹ | ON¹ | ON | 0 |
| 7 | 2 |   | 0 | 0 | ON | 0 | ON |
|   | 4 | 4 | 0 | 0 | ON | 0 | 0² |
| 6 | 2 |   | 0 | ON | ON | 0 | 0 |
|   | 4 | 0 | 0 | 0¹ | 0¹ | 0 | 0² |
| 5 | 1 |   | ON | 0 | ON | 0 | 0 |
|   | 4 | 5 | ON | 0 | ON | 0 | 0 |
| 4 | 4 | 9 | ON | ON | ON | ON | 0 |
|   | 1 |   | 0 | 0 | 0 | 0 | ON |
| 3 | 2 | 2 | 0 | ON | 0 | 0 | 0² |
| 2 | 2 | 4 | 0 | 0 | ON | 0 | 0 |
| 1 | 1 | 5 | ON | 0 | ON | 0 | 0 |

¹ Subject to reversal by D1 and D2, see below.
² Initially on but turned off by carry operation.

Timed value pulses are applied via the input wires 286, 370, 372 and 374, and according to Chart B the first digit to be entered into the order is –9–. This is represented by a timed value pulse –1– on wire 286 and –8– on wire 374. The pulses act to increase the drop across resistors R162 sequentially. This machine is so sequenced that the –1– pulse will be the first received. Consequently, S1 will be switched from off to on. A short time later the –8– pulse will be received on wire 374 causing stage S8 to switch on. S8 in turning on generates a negative pulse on wire 288 which is effective to excite the time delay circuits, two of which are employed. These time delay circuits comprise two monostable trigger devices D1 and D2 which are identical except for the choice of time constants whereby the time constant of trigger D2 is arranged to provide approximately twice the delay provided by trigger D1. Thereby they operate sequentially in pulsing S2 and S4—not simultaneously. Since these two triggers are otherwise identical, detailed operation of trigger D1 only will be given.

When the negative pulse on wire 288 reaches the lefthand tube of trigger D1, its grid is driven to cut off potential. Thus, D1 flips over to its unstable state where the righthand tube is conducting and the lefthand tube is shut off. While in this status, capacitor C218 begins to charge, thus permitting the grid potential of the LH tube to rise. This charging continues until the grid potential of the lefthand tube reaches critical value, causing the tube to conduct, thereupon initiating a triggering action which rapidly builds up until the trigger has been restored to its original stable status where the lefthand tube is conducting and the righthand tube is shut off. Upon restoring to its initial stable status, a positive pulse appears on wire 290 and is applied via capacitor C410 to the grid of V376 causing it to momentarily conduct. The resulting negative pulse on R162 is applied to reverse S2. A short time thereafter, the second delay trigger D2 will restore and apply a similar pulse to wire 292 which is effective to reverse stage S4. At this time all stages S1, S2, S4 and S8 are on, since the necessary corrections have been made and –9– stands in the order.

It will be noted that a –9– is manifested as a binary –15–. It can, therefore, be seen that the effect of the adjusting just described is to add a –6– automatically into an order when S8 switches from off to on. Such action occurs invariably.

It should be noted that the time delays of D1 and D2 are long enough to permit S1, S2, S4 and S8 to operate in their normal manner instantaneously. Thus, if for example, S1, S2 and S4 were on with S8 off, and a lateral –8– pulse came into S8, S8 would go on, D1 would turn S2 off after a brief delay, then S4 would be switched off instantaneously by S2, then S8 would be switched off instantaneously by S4, and finally, after longer delay, D2 would switch S4 on again.

The second entry into the component accumulator is that of an –8– as indicated in Chart B. During this cycle, a negative –8– time value pulse is received on wire 374 which is effective to switch S8 from on to off thus leaving stages S1, S2 and S4 on indicating the result digit –7–. A switching off of S8 is indicative that the order has passed from –9– to –0–. When such occurs, it is required that the carry determining circuit be operated. This fundamentally comprises a trigger circuit CY. When CY switches on (as S8 switches off), its lefthand tube is shutoff as is the related tube V336, thus partially conditioning a triode gate which shortly thereafter will produce a positive output pulse which represents the carry out of this order to the next higher order. As will be understood, CY switches off again before the next carry operation.

The remainder of Chart B is illustrative of the pattern of operation which the triggers S1 through S8 of the component accumulators effect when digits –7– through –1– are also added during subsequent computing cycles. While these entries are typical of those which may be effected into any order they are not necessarily all-inclusive nor do they indicate only those occasions when automatic self-adjusting operations occur. Neither is it all-inclusive on the occasions when the carry must be effected out of the order.

There has now been described the manner in which the component accumulators receive entries of partial differential lefthand or righthand component values. While detailed descripton has been had of a single accumulator order, it is understood that entries are effected in a plurality of orders concurrently. It is further understood that like digits comprising a partial differential are entered concurrently in a plurality of orders. In the description it has been pointed out that a timed value impulse directly effects operation of a trigger having a similar value. It has also been noted that entries are effected by use of binary coded pulses which are entered into accumulating circuits connected fundamentally in binary fashion.

Actually, the component accumulators comprise groups of circuits connected for basic binary operation. Each group, however, possesses an automatically operated adjusting circuit which maintains the natural frequency based at radix 10. Accordingly, the advantages of binary methods of adding are retained while at the same time manifestation and readout in the tens notation are obtained. The description has pointed out the conditions determining when the mentioned adjustments must occur. Further, it was noted that two adjustments per order are required, each occurring independently of the other. There has also been described the fact that monostable triggers are utilized to effect the two adjustments.

*RH components or PR register*

The RH components or PR register (Figs. 3r and 3s) comprises four orders labeled TH, H, T and U. Each order comprises basically four stages S1, S2, S4 and S8 which are substantially the same as the LH components triggers. In addition, two adjusting triggers D1 and D2 are provided which have the same function as the corresponding triggers in the LH component accumulator. Each order contains a carry determining trigger CY.

Since it is required that the computed results be read out of this register at suitable times, an additional input circuit has been provided consisting of a tube V338 (Fig. 3r). During each read-out cycle ten positive impulses are applied to post 386 by means to be subsequently described. These pulses are effective to reduce the grid bias of tube V338 thereby causing that tube to conduct thereby reducing its anode potential which consequently is effective to switch stage S1. Since ten pulses in all are applied to post 386, the counter order will be advanced by ten digital amounts, thus returning it to its original value. Thus, the counter order is assured of passing from –9– to –0–, and trigger CY (Fig. 3s) will, therefore, be turned on coincidentally with the turning off of stage S8. At the moment when trigger CY turns on its righthand anode drops to low potential causing tube V340 to shut off. The resulting positive anode pulse on V340 is applied via capacitor C412 to the grid of output tube V342 causing it to conduct. The cathode of tube V342 is directly connected to output post 388. It should be explained that the advancing pulses applied to input post 386 are differentially timed to occur at index times; therefore, the output pulse at post 388 will occur at an index time corresponding to the digit value which is to be recorded. The manner in which this output pulse is utilized to perforate the card will be subsequently described.

In order to explain operation of the carry circuits, assume that the RH accumulator H order has just received an entry causing it to pass through –0–. Such entry may have occurred during either the –1–, –2–, –4– or –8– cycle point times of the compute commutator. These four cycle points may be considered as the adding portion of the compute commutator cycle. During this time the carry determining circuit is set up but actual carry operation must be delayed until some later time so that carry will not interfere with the possible entry of partial differential values into the same accumulator position.

As previously stated, the RH register has just passed through –0–. This condition is indicated by the turning off of stage S8. As S8 turns off, its LH anode generates a negative pulse on wire 390 which is applied to the LH grid of carry trigger CY in the H order of the RH register, causing CY to turn on. Carry trigger CY in on status thus indicates that this order has passed through zero at some time during this cycle and, therefore, a –1– must be added into the TH order.

With CY on, its LH tube is at cutoff bias, and by direct connection tube V392 is maintained in nonconducting status and gate V392, V394 is now conditioned. As the compute commutator progresses in its cycle until stage S8 turns off and C1 turns on, the adding portion of the cycle has terminated and the carry portion has begun.

At this time, as previously explained, the potential on wire 278 falls to a lower value causing a decreased potential across resistor R398. Thus, wire 396, which is connected to the RH gate tube V394 in each order, will apply cutoff bias to all tubes V394. Since we have assumed that the H order CY trigger is already on, the H order gate V392, V394 will now produce a positive pulse in its anode circuit. This positive pulse is transmitted via wire 414 and capacitor C416 to the grid of tube V424 associated with stage S1 in the TH order of the accumulator. Thus, V424 will momentarily conduct to apply a negative anode pulse to stage S1 which is effective to reverse its status, and a carry-over has occurred from the H to the TH order.

If a carry through nines condition should occur during normal operation of this machine, the carry circuits will operate in a similar manner as just described, but in this case only the lowest order carry trigger CY will be turned on during the adding portion of the cycle. Then, at the beginning of carry time, as the negative potential is applied to wire 396 the lowest order gate will produce a carry pulse which will advance the next higher order from –9– to –0–. This action will cause its trigger CY to turn on. Since wire 396 is maintained at cutoff potential, the second carry gate will immediately pulse the next higher order causing it to advance from –9– to –0–. In this manner the carry impulses will ripple through all orders which contained a –9–.

In the present machine it is improbable that a carry through nines operation would require more time than is provided by one cycle point of the compute commutator. Therefore, stage C2 is not essential in the present case. However, stage C2 has been included in order to teach how the capacity of the machine may be expanded.

LH to RH transfer unit

As previously explained, in this machine, a maximum of two compute commutator cycles is required to form all LH and RH component values which at this time are stored in their respective LH and RH component accumulators. Therefore, an additional compute commutator cycle is required for the purpose of transferring the LH components into proper columnar position in the RH component or PR register.

The LH to RH (Fig. 3q) transfer unit performs this function. It comprises basically four triode gates, one for each of the differential values –1–, –2–, –4– and –8–. One group of four such gates is required for each order of the LH accumulator, in the present case, three. During each LH to RH transfer cycle CS commutator trigger CSTR is on. As previously explained, a positive potential is thereby applied to wire 226. This positive potential increases the voltage drop across R164 and thereby reduces the suppressor grid bias of tubes V344 to provide output pulses whenever their respective control grids receive value timed impulses from the compute commutator. As is now understood, the differential timed impulses –1–, –2–, –4– and –8–, developed by the compute commutator, are applied to wires 270, 272, 274 and 276, respectively. Thus, during transfer cycles tubes V344 develop negative output pulses on wires 430, 432, 434 and 436. The pulse on wire 430 appearing midway in the first cycle point of the compute commutator is applied to tubes V346 which comprise the RH tube in the above mentioned triode gates similarly with wires 432, 434 and 436.

Assume that the digit –5– is stored in the lefthand component accumulator TH order at transfer time. This digit –5– is required to be entered into the RH accumulator TH order. A –5– is represented by the on condition of stages S1 and S4. When S1 is on its lefthand tube is shut off. Wire 294 connects the LH grid of S1 to the grid of V348 in the LH to RH transfer unit. Thus, as long as S1 is on, V348 will be shut off. As previously stated midway in the first compute commutator cycle point a negative pulse on wire 430 is applied to the grid of V346 causing it to shut off. Since tubes V348 and V346 are both now shut off, their parallel-connected anodes will rise in potential causing tube V350 to momentarily conduct. The anode of V350 is direct-connected to the anode of V338 in the RH accumulator by wire 296. The conducting of V350, therefore, causes a voltage drop across R166. The resulting negative pulse is applied to stage S1, TH order of the PR register. Thus, the status of S1 is reversed and in effect a –1– has been added.

In order to complete the transferring of a –5–, the next partial differential value to be treated will be the –4–. When stage S4 in the compute commutator is on, a positive pulse will be applied to wire 274 causing V344 to emit a negative pulse onto wire 434. Since lefthand components trigger S4 is on, wire 298 will maintain the grid of tube V426 at cutoff potential. Consequently, when the negative pulse on wire 434 reaches the grid of tube V428, the lefthand to righthand transfer gate associated with the –4– pulse will produce a positive potential in its anode circuit. This positive pulse is applied to the grid of associated tube V350 causing it to momentarily conduct. The resulting negative pulse is applied to the input of stage S4 in the RH accumulator and PR register and will be effective to reverse its status.

Thus, the entry of the –1– and –4– into the PR register constitutes a transfer of digit –5– from the lefthand to the righthand accumulator.

It should be noted that since the adjusting circuits in each accumulator order automatically add a –6– into the order whenever the S8 stage turns on, digits –8– and –9– are represented by –14– and –15–, respectively. Thus, whenever it is required to transfer an –8–, for example, the transfer of the –2– and –4– must be suppressed. Similarly, the –2– and –4– must be suppressed whenever a –9– is transferred. Such suppression of the –2– is effected by providing a tube V352 (Fig. 3q) in the gate circuit used for transferring a –2–. The grid of V352 is controlled by the LH anode potential of stage S8. Similarly, another tube V352 is provided in the gate circuit which normally transfers a –4–. This tube V352 is also controlled by the LH anode potential of stage S8. Accordingly, whenever S8 is on its lefthand anode is at high potential and both tubes V352 are maintained in conducting status to effectively block the –2– and –4– transfer gates. Assume now that digit –8– is to be transferred. Digit –8– is represented by a binary –14– where stages –2–, –4– and –8– are on. Since S8 is on it is required that transfer of the –2– and –4– be suppressed. Wire 438 connected to the lefthand anode of S8 is, therefore, at high potential which produces an increased voltage drop across R168. Hence, the tubes V352 associated with the –2– and –4– gates are both in conducting status. Consequently, no output pulse can be produced by these two gates. Therefore, the required suppression has been established. Since the lefthand S8 is on, wire 440 is maintained at low potential thus shutting off tube V452 associated with the –8– transfer gate. Therefore, when wire 436 applies a negative pulse to V454 a positive output pulse is produced at the anodes of V452 and V454. This positive pulse momentarily causes V456 to conduct and thereby applies a negative pulse to the righthand components stage –8–. It has been shown that the TH lefthand components digit –8– which was registered as a binary –14– has been transferred into the righthand components TH order as an –8– partial differential value only and that the –2– and –4– differential values have been suppressed.

*Reset*

Previous mention has been made of the necessity for initial and cyclical reset of the various bistable triggers employed in this machine. For this purpose two cam contacts P8 and P9 are provided in the record handling machine (Fig. 3a). The main reset line 256 is controlled by cam P8 which is timed to break momentarily just before –9– of each machine cycle. The LH voltage divider in each trigger circuit, except those in the component registers, is terminated at reset line 256. Thus, when cam contact P8 is open the negative potential is removed from the lower end of these voltage dividers. The potential of the junction point, to which the trigger LH grids are connected, will, therefore, rise, causing the LH tubes to conduct. When P8 closes a moment later, the triggers remain in the above off status.

Cam contact P9 is similar to P8 except that it is timed to break just after –0– of each machine cycle. Therefore, all component accumulator triggers are reset at this time over wire 258.

*Multiplying*

Previous sections have given detailed description of the various units incorporated in this machine. A complete multiplying operation will now be described.

As is now understood, it is required that each record card containing MC and MP amounts is to be run through the record handling machine where the MC and MP values will be read. The indicated multiplication will be performed in the electronic unit and the computed result will be punched into that card containing the pertinent MC and MP factors.

With switch 103 on and cards placed in the hopper 56, after a brief initial warm-up period required by the electronic unit, the operator may initiate a card feed cycle by depressing start key 107. During the first card feed cycle the first record card is advanced to the read brushes 70. Early in the second CF cycle cam contacts P8 momentarily break to effect resetting of all bistable trigger circuits except those in the component registers, thus assuring that the MC and MP registers are cleared before entry is made and that all computing circuits are in proper status before multiplying begins.

During this second CF cycle the first card traverses the read brushes 70, and the MC and MP amounts are simultaneously read into their respective registers. Shortly after –0– in this cycle, cam contacts P9 momentarily break to effect resetting of the component registers, thus assuring that these registers are in zero status before computing begins. Soon after –11– in this cycle, contacts P11 transfer to initiate an electronic computing operation. In a relatively short interval of time the MC and MP factors are multiplied and the result is stored in the RH register well before the end of this second CF cycle. Also during this cycle the second card is advanced to the read brushes 70.

During the third CF cycle the first card traverses the punches 78 which are operated in a manner to record the result which was computed near the end of the second CF cycle.

At the beginning of this third CF cycle cam contacts P8 again open to clear the MC and MP registers, and soon thereafter a new set of MC and MP values are read in from the second card as this card traverses the read brushes 70. Again, shortly after –0– and after the result has been recorded in the first card, cam contacts P9 open to reset the component registers. Soon after –11–, cam contacts P11 again transfer to initiate the second multiplication. Also during this third CF cycle, a third card is advanced from hopper 56 to the read brushes 70.

Detailed description of a complete electronic multiplication operation will now be given.

Assume that the MC and MP factors contained in the first card are –91– and –83– respectively. Accordingly, during the second CF cycle, –91– will be entered into the MC register with the –9– in the tens order and the –1– in the units order. Simultaneously, with the entry of –91– into the MC, –83– will be entered into the MP register.

Soon after –11– in this second CF cycle, cam contacts P11 transfer to initiate an electronic computation.

As P11 transfers, compute start trigger T104 is turned on, causing T102 to turn on (Fig. 3b). As T102 turns on, V314 conducts to place a negative pulse on wire 174 leading to the MP zero analyzer unit. Since the tens MP contains the significant digit –8–, the negative pulse on wire 174 will be effective via tubes V30 and V36 to place a negative pulse on wire 176 to turn trigger CST on. With CST on, the tens order MP is immediately effective to select the ×8 plates.

As noted above, triggers T104 and T102 are now both on. With T102 on, the first positive-going pulse from voltage generator 120 on wire 240 is effective to turn off T104 via tube V312. As T104 turns off, a positive pulse via wire 246 causes conduction of tube V316 which, as previously explained, turns on stage S1 in the compute commutator. Thus, the first electronic multiplying cycle is initiated. During this first compute commutator cycle the entire MC value –91– will be multiplied by the tens order MP –8–.

It has been pointed out above that the ×8 plates are already selected. Such selection is due to a high potential on wire 142 leading from MP output tube V22 associated with the tens order MP stage S8 which is now on. Wire 142 leads to the LH and RH ×8 plates, thus conditioning all diode gates in these two × plates. Since the ×8 plates are the only plates conditioned during this time, no other plate can develop output pulses at this time. The ×8 plates, however, will develop all possible LH and RH components involved with the multiplication of digits –1– through –9– by –8–.

These ×8 plate output pulses will appear on the LH × plate and RH × plate output wires which lead to the MC register. Since we have assumed for this example that the MC factor is –91–, only the MC pentode gates associated with the tens MC stage S9 and units stage S1 are conditioned by means previously explained. Therefore, only the ×8 plate output pulses arriving at the MC register via wires 146, 462 and 470 will be effectively passed along to the output of the MC register. All other pulses will be blocked at the unconditioned MC gates.

As stated above, the initial compute commutator cycle is initiated as compute commutator stage S1 is turned on. Midway in this first cycle point a positive pulse via wire 270 will be impressed across capacitor C173 in the LH ×8 plate to produce a differential –1– pulse on output wire 146. Thus, via wire 146 and tube V12 in the MC gate associated with MC stage S9, a negative pulse is applied to wire 122. This negative –1– pulse is fed to CS switch tube V308 where it is inverted to a positive –1– pulse.

Since CST is on at this time, the #1 CS diode gate is conditioned. Therefore, this positive –1– pulse is applied via C210 to wire 192. Wire 192 transmits this positive –1– pulse to the #1 grid of tube V306 in the distributor unit. Tube V306 is conditioned by a positive potential on its #3 grid during the entire first cycle point as has been explained in an earlier section. Therefore, this mid-cycle point –1– pulse on its #1 grid is effective to produce plate conduction and a resulting negative –1– pulse on wire 286. This pulse via wire 286 is applied to R162 located in the TH order of the LH component register. The drop across R162 is effective to switch stage S1 on in this order.

As the compute commutator advances, a mid-cycle point –2– pulse is emitted on wire 272. Wire 272 feeds this –2– pulse to one gate in each ×8 plate. The LH circuit leads from wire 272 and C175 in the LH ×8 plate to wire 146. This –2– pulse follows the same circuit described for the –1– pulse above until it reaches the distributor unit.

Since we are now midway in the second cycle point, tube V262 in the distributor is conditioned. Therefore, this tube V262 will apply a negative –2– pulse via wire 370 to turn on stage S2 in the TH order of the LH register.

This same –2– pulse, on wire 272 mentioned above, simultaneously traverses a circuit through the RH ×8 plate as follows:

Wire 272, C177 in RH ×8 plate, wire 462, MC tens tube V14 associated with stage S9, wire 124, CS gate #3, C204, wire 300, tube V262, wire 422 to turn on stage S2 in the H order of the RH register.

Again, as the compute commutator cycle advances, a differential –4– pulse on wire 274 is applied to the LH ×8 plate via C181 to place a –4– pulse on output wire 146. This LH –4– pulse follows the same circuit described above for the LH –1– and –2– pulses up to the the distributor. Since we are now midway in the third compute cycle point, distributor tube V264 will place a negative –4– pulse on wire 372 which is effective to switch on stage S4 in the TH order of the LH register.

The compute commutator again advances to its fourth cycle point where stage S8 is on. Thus a differential –8– pulse is applied to wire 276. This –8– pulse traverses the following circuit:

Wire 276, RH ×8 plate, C179, output wire 470, MC gate tube V14 associated with units order S1, wire 128, CS gate 7, wire 446, distributor tube V266 and wire 364 to turn on stage S8 in the tens order of the RH register. As is now understood, the turning on of stage S8 causes the adjusting circuits to operate whereby stages S2 and S4 are also turned on.

The compute commutator now advances through its last two cycle points which are reserved for carry operation. However, since this is the initial cycle, no carry operation is required.

Midway in the last cycle point when C2 is on, the compute commutator generates a negative pulse on wire 184 which, as earlier explained, causes CST to turn off. As is now clear, CSU turns on since MP units contain significant digit –3– according to our original assumption for this example. As CST turns off, the ×8 plates are deconditioned, and as CSU turns on, the ×3 plates are selected. Thus, as the compute commutator begins its second cycle, all circuits are prepared to effect multiplication of the MC factor –91– by MP units digit –3–.

The following Chart C will illustrate the condition of the accumulators:

CHART C
Sample problem: MP × MC = PR
83 × 91 = 7553

|  | LH register | | | RH register | | | |
| --- | --- | --- | --- | --- | --- | --- | --- |
|  | TH | H | T | TH | H | T | U |
| 1st cycle (80×91): | 0 | 0 | 0 | 0 | 0 | 0 | 0 |
| –1– | 1 | 0 | 0 | 0 | 0 | 0 | 0 |
| –2– | 3 | 0 | 0 | 0 | 2 | 0 | 0 |
| –4– | 7 | 0 | 0 | 0 | 2 | 0 | 0 |
| –8– | 7 | 0 | 0 | 0 | 2 | 8 | 0 |
| C1 | 7 | 0 | 0 | 0 | 2 | 8 | 0 |
| C2 | 7 | 0 | 0 | 0 | 2 | 8 | 0 |
| 2nd cycle (3×91): | | | | | | | |
| –1– | 7 | 0 | 0 | 0 | 2 | 9 | 1 |
| –2– | 7 | 2 | 0 | 0 | 2 | 1 | 3 |
| –4– | 7 | 2 | 0 | 0 | 2 | 5 | 3 |
| –8– | 7 | 2 | 0 | 0 | 2 | 5 | 3 |
| C1 | 7 | 2 | 0 | 0 | 3 | 5 | 3 |
| C2 | 7 | 2 | 0 | 0 | 3 | 5 | 3 |
| 3rd cycle: | | | | | | | |
| –1– | 7 | 2 | 0 | 1 | 3 | 5 | 3 |
| –2– | 7 | 2 | 0 | 3 | 5 | 5 | 3 |
| –4– | 7 | 2 | 0 | 7 | 5 | 5 | 3 |
| –8– | 7 | 2 | 0 | 7 | 5 | 5 | 3 |
| C1 | 7 | 2 | 0 | 7 | 5 | 5 | 3 |
| C2 | 7 | 2 | 0 | 7 | 5 | 5 | 3 |
| | | | | | | (Result) | |

At the end of the first compute cycle a –7– stands in the LH TH order, a –2– stands in the RH H order, and a binary –14– representing –8– stands in the RH T order.

During the second compute cycle, × plate output wires 146, 462 and 470 are again the only ones actively involved since the MC factor –91– is still stored in the MC register. Accordingly, a differential –1– pulse appears on wire 270 and enters the RH ×3 plate where it branches off into two paths. One path is traced as follows:

Wire 270, RH ×3 plate, capacitor C183, output wire 470, MC pentode tube V14 associated with units order stage S1, MC output wire 128, CS switch gate #8 now conditioned because CSU is on, wire 498, associated distributor tube V306 now conditioned because compute commutator stage S1 is on, wire 500 to RH component register units order stage S1 which is now turned on. The second path traversed by the above mentioned –1– pulse is traced as follows:

Wire 270, RH ×3 plate to C185, wire 466, wire 462, MC tube V14 associated with the tens order stage S9, output wire 124, CS gate #4, capacitor C187, wire 446, associated distributor tube V306, wire 504 to RH components register tens order stage S1 which is thereby turned on.

During the next cycle point a differential –2– pulse on wire 272 is split three ways. The first path is traced as follows: Wire 272, RH ×3 plate to C189, output wire 470, MC tube V14, wire 128, CS gate #8, wire 498, associated distributor tube V262 now conditioned, wire 506 to RH register units order S2 which thereby is turned on. The second path is as follows:

Wire 272, RH ×3 plate to C191, wire 466, wire 462, MC tube V14 associated with tens order S9, wire 124, CS gate #4, wire 502, C187, wire 446 associated distributor tube V262, wire 508 to RH register tens order stage S2.

Because of previous entries of –8– and –1–, this tens order already stands at –9– which in a manner previously explained is registered as a binary –15– where all four stages are on. Therefore, when the above mentioned –2– pulse is applied, stage S2 is turned off causing S4 to turn off. This causes S8 to turn off, and S1 alone remains on to indicate a –1–. However, the turning off of S8 causes carry trigger CY to turn on.

The third path traversed by the –2– pulse is as follows: Wire 272, LH ×3 plate to C193, wire 146, MC tens S9 tube V12, wire 122, CS gate #2, wire 268, C282, wire 354, LH register H order S2 which is thereby turned on.

During the next cycle point a –4– is entered into RH tens order as follows: wire 274, RH ×3 plate, C195, wire 466, wire 462, MC tens S9 tube V14, wire 124, CS gate #4, wire 502, C187, wire 446, associated distributor tube V264 now conditioned, wire 512, to RH tens order S4 which is thereby turned on. This order which previously contained a –1– now registers a –5–.

During the next cycle point when compute commutator stage S8 is on, no further entries are effected. At this time the RH register stands at 0253, and the tens order carry trigger CY is on. Therefore, at the beginning of the next cycle point when compute trigger C1 turns on, wire 396 drops to a low potential to shut off RH tens order gate tube V394. A positive pulse on its anode is transmitted via wire 514 to the grid of the H order input tube V424 causing it to conduct. The resulting negative anode pulse is effective to turn on the RH H order stage S1. Since stage S2 is already on, this order now contains a –3–. Thus, the amount standing in the RH register is now 0353.

Since no other carry triggers CY are on, no further carry operations are called for in the present example. It should be observed that the LH register contains the amount 720. However, since the LH register contains no units order, the above 720 figure mathematically represents 7200.

As the cycle continues, midway in the next cycle point when compute trigger C2 is on, in a manner previously explained, CSU is turned off causing CSTR to turn on. At the end of this compute cycle a third cycle is initiated. During this final cycle the LH 720 will be transferred in proper columnar relation so as to effect the entry of 7200 into the RH register.

The manner in which such transfer is effected has been previously described in detail and will, therefore, not be repeated here.

At the completion of this transfer cycle, the RH register contains the amount 7553 which is the sum of RH 0353 and LH 7200. This amount 7553 is also the product of 83×91 as required. Near the end of this third compute cycle CSTR is turned off and a stop pulse is produced which causes trigger T102 to turn off. This causes the compute commutator to latch up with all stages in off status, thus terminating the electronic multiplying operation.

The actual time required for multiplying is relatively short. Since only three compute cycles of six cycle points each are required, it can be seen that only 18 impulses from the voltage generator are utilized to perform the complete electronic multiplication.

Modification

For purposes of simplification (although at some sacrifice of speed), a modification of the first embodiment (Figs. 1 to 5) has been conceived and will now be described. The modification substantially simplifies the × plate and MC register circuit structures. In this system, multiplying is again effected according to the LH and RH partial products method. Therefore, most of the machine as already described remains unchanged. However, the modification differs from the main embodiment in that the MC amount is now represented on a combinational or binary basis. Thus the MC register consists of four bistable triggers and seven output pentodes per order as compared with ten triggers and seventeen pentodes in the first embodiment. This not only simplifies the MC register but also the × plate arrangement since the × plates need be prepared to multiply the MP digits only by the four binary components –1–, –2–, –4– and –8–, rather than by the nine MP digits of the main embodiment.

Since the MC is now represented on a binary basis it is necessary, however, to utilize four transfer cycles per MP digit in order to prevent interference. For this purpose a secondary commutator is provided. This commutator is a four-stage binary device and its inclusion in the circuit increases computing time by a factor of three. However, computing is still much faster than can be attained in a machine employing over and over addition.

MP zero elimination has been retained. The secondary and CS commutators are advanced when stage C2 in the compute commutator turns on. Control circuit sequence will be explained first, followed by a sample multiplication.

Since essentially only the MC register and the × plates are changed and only the secondary commutator is new, the Fig. 6 showing the modification shows corresponding parts of Fig. 3 in block form. Reference may be made back to Fig. 3 for these parts where necessary. Fig. 7 is the modified electronic timing diagram.

Control circuits

Read in and read out circuits are unchanged, and the reset circuits function as before. The four stage secondary commutator is arranged so that stage S1 resets to its on status while stages S2, S3 and S4 reset to off status.

As cam contacts P11 (Fig. 3) transfer to initiate a computing operation, triggers T102 and T104 operate as previously explained to start the compute commutator. Assuming that the MP contains only significant digits, CST is turned on as trigger T102 turns on. This is indicated in the electronic timing diagram of Fig. 7. Also bear in mind that secondary commutator stage S1 is already on from reset action. Thus, from Fig. 6a, it is seen that with secondary stage S1 on its RH tube is conducting, as is direct-connected tube V516. The anode of V516 and wire 518 are, therefore, at low potential as long as stage S1 remains on. Wire 518 is connected via voltage divider to the grid of tube V520 which comprises the RH tube of a triode gate associated with each MC order stage S1. The LH gate tube 520A is at cutoff bias if the MC S1 stage is on (via wire 520B). Thus when wire 518 is at low potential and the MC tens order contains an odd number, both tubes (V520 and V520A) of the gate will be shut off. The resulting high anode potential is applied via voltage divider to grid 3 of pentode V522. Thus this tube V522 is conditioned to produce negative output pulses on wire 124 whenever positive pulses arrive at its grid 1 via wire 556 from RH X plates.

With reference to Fig. 7 it can be seen that secondary S1 is on during the first compute cycle only. Thus any MC S1 values are multiplied by the MP tens digit during this first compute cycle.

As the compute commutator advances during this first compute cycle, the time arrives when stage C2 turns on. As C2 turns on, wire 526 swings to zero bias potential causing tube V528 to conduct. The resulting drop in anode potential, via wire 530 causes secondary stage S1 to turn off. As S1 turns off, the resulting negative anode pulse is effective via wire 532 to turn on stage S2.

Secondary S2 remains on during the second compute cycle. By means of circuits shown, which are similar to those described above for S1, S2 in both the secondary commutator and MC register conditions V522A and V522B to produce negative output pulses whenever positive pulses are received from the X plates and any MC S2 values are now multiplied. Since MC S2, S4 and S8 values may produce both LH and RH components, each associated triode gate must condition two pentodes V522A and V522B. The LH pentode (522A) receives LH differential pulses on its grid 1 while the RH pentode (V522B) receives RH pulses from the X plates.

As will be apparent, during the third compute cycle, secondary S3, MC S4, V522C and V522D behave similarly to multiply MC S4 values. That is, V528 via C2 turns off S2 which turns on S3; and S3 cooperates with MC S4 to condition V522C and V522D.

Similarly during the fourth compute cycle, secondary S4 alone is on and any MC S8 values are multiplied via V564 and V566. As compute stage C2 (fourth cycle) turns on, a negative pulse on wire 530 causes secondary S4 to turn off. As S4 turns off, a negative pulse on wire 534 turns secondary S1 on. At this instant the LH grid of S4 shifts to zero bias. Therefore, associated tube V536 conducts, causing a negative anode pulse to appear on wire 184. This wire 184 is connected in a manner previously described so as to advance the CS commutator. Thus CSU turns on, causing the CS switches to shift and also causing the MP units digit to select a corresponding X plate.

During the next four compute cycles the secondary commutator will again step along through four positions, S1, S2, S3, S4. Thus the MC binary values will be sequentially multiplied by the MP units digit. Near the end of the eighth compute cycle, all of the LH and RH components will have been entered into the component accumulators. Therefore, one additional compute cycle must be executed for the purpose of transferring the LH components into the RH register.

As compute stage C2 turns on near the end of the eighth cycle, a negative pulse on wire 530 turns off secondary S4. Thus, secondary S1 is turned on in a manner now understood. Also, tube V536 conducts to place a negative pulse on wire 184. This pulse on wire 184 causes CSU to turn off. CSU turns on CSTR which conditions the LH to RH transfer unit.

Since both CST and CSU are off, all X plates are deconditioned. Therefore, as the compute commutator executes its ninth cycle, the LH components will be transferred into the RH register in a manner now understood.

As compute stage C2 turns on in this ninth cycle of operation, a negative pulse on wire 530 causes secondary S1 to turn off. S1 turns on S2. From Fig. 7 we see that secondary S2 and CSTR are both now on. This coincidence is utilized to signal that a complete computation has occurred and the compute commutator may now be latched up. The circuit operates as follows:

With CSTR on, tube V300 (Fig. 3) is shut off. Thus wire 226 is at high potential. Wire 226 thus brings tube V538 grid 3 to zero bias. But secondary S2 is also on at this time, and its RH grid is at high potential. Thus, via wire 540, tube V538 grid 1 is also at high potential and V538 conducts, causing a low potential on the grid of V542 which thereby is shut off. Half a cycle point later, in a manner previously explained, tube V328 (compute commutator—see Fig. 3) momentarily conducts to place a negative pulse on wire 544. This wire 544 leads the negative pulse to the grid of zero biased tube V546 causing it to momentarily shut off. The resulting positive anode pulse is fed via wire 236 to the grid of tube V548 (compute commutator—see Fig. 3) which is effective to turn off compute trigger T102. With T102 off, tube V318 is maintained in conducting status to block compute stage S1 in the off status. Thus the compute commutator latches up with all six stages off.

At this time all control commutator triggers are in off status, except secondary S2 and CSTR which are both on. These two triggers are subsequently reset to off status when reset cam contacts P8 (Fig. 3) break before –9– in the next machine or card feed cycle. At this same time, secondary stage S1 is reset to on status and MC and MP registers are cleared. Thus the electronic unit is ready to receive the new MC and MP amounts, and to simultaneously read out and record from the RH register into the record card in the manner described for the main embodiment. After read out, cam P9 breaks to clear the component registers and the electronic unit is ready to begin a new computing operation.

*Multiplying*

Having explained operation of the control circuits employed in the modification, a sample multiplication will now be described. Since comparison of the two methods may serve to facilitate understanding of the operations involved, the same sample problem as previously used will be described.

This problem assumes that the MC factor is –91– and the MP factor is –83–. Accordingly, these amounts are read in, and the MC tens order stands at –9– which is registered by the on status of stages S1 and S8. The MC units S1 is on. The MP tens S8 and units S3 are on. Also, secondary S1 was reset to on just before –9– during the read-in cycle.

It is understood that the MC register now counts similarly to the accumulators, i.e., the turning off of any stage reverses its successor; the turning on of any stage leaves its successor unaffected. Thus, the previously discussed nine read-in pulses or any lesser number of them, will be counted in binary code –1–2–4–8– if injected into the input of stage S1 of the MC register when all are initially off.

Just after –0– in the CF cycle, cam P9 breaks to reset the result registers.

Soon after –11–, cam contacts P11 transfer to initiate a computing operation.

As previously explained, P11 turns on trigger T104. T104 turns on T102. T102 causes a negative pulse on wire 174 to be fed to the MP zero analyzer unit. Since the MP tens contains a significant digit, CST is turned on. With CST on, the MP tens order digit –8– selects the X8 plate, and the CS switch unit is conditioned to direct the LH and RH components into the higher order channels of component registers.

With T102 on, the next positive-going pulse on wire 240 is effective to turn off T104. As T104 turns off, a positive pulse on wire 246 causes V316 to turn on compute commutator stage S1 to start computing cycle number one.

Fig. 7 should now be referred to from time to time, and also the following chart which shows when each entry is made into the component registers during the computing of this sample problem.

Sample problem: MP × MC
83 × 91 = 7553
(Modification)

| Cycle No. | | LH register | | | RH register | | | |
|---|---|---|---|---|---|---|---|---|
| | | TH | H | T | TH | H | T | U |
| 1 | 1 | 0 | 0 | 0 | 0 | 0 | 0 | 0 |
| | 2 | 0 | 0 | 0 | 0 | 0 | 0 | 0 |
| | 4 | 0 | 0 | 0 | 0 | 0 | 0 | 0 |
| | 8 | 0 | 0 | 0 | 0 | 8 | 8 | 0 |
| | C1 | 0 | 0 | 0 | 0 | 8 | 8 | 0 |
| | C2 | 0 | 0 | 0 | 0 | 8 | 8 | 0 |
| 2 | 1 MP | 0 | 0 | 0 | 0 | 8 | 8 | 0 |
| | 2 | 0 | 0 | 0 | 0 | 8 | 8 | 0 |
| | 4 ×83 | 0 | 0 | 0 | 0 | 8 | 8 | 0 |
| | 8 | 0 | 0 | 0 | 0 | 8 | 8 | 0 |
| | C1 | 0 | 0 | 0 | 0 | 8 | 8 | 0 |
| | C2 | 0 | 0 | 0 | 0 | 8 | 8 | 0 |
| 3 | 1 | 0 | 0 | 0 | 0 | 8 | 8 | 0 |
| | 2 | 0 | 0 | 0 | 0 | 8 | 8 | 0 |
| | 4 | 0 | 0 | 0 | 0 | 8 | 8 | 0 |
| | 8 | 0 | 0 | 0 | 0 | 8 | 8 | 0 |
| | C1 | 0 | 0 | 0 | 0 | 8 | 8 | 0 |
| | C2 | 0 | 0 | 0 | 0 | 8 | 8 | 0 |
| 4 | 1 | 2 | 0 | 0 | 0 | 8 | 8 | 0 |
| | 2 | 6 | 0 | 0 | 0 | 1 2 | 8 | 0 |
| | 4 | 6 | 0 | 0 | 0 | 2 | 8 | 0 |
| | 8 | 6 | 0 | 0 | 1 | 2 | 8 | 0 |
| | C1 | 6 | 0 | 0 | 1 | 2 | 8 | 0 |
| | C2 | 6 | 0 | 0 | 1 | 2 | 9 | 1 |
| Col. shift 5 | 1 | 6 | 0 | 0 | 1 | 2 | 1 1 | 3 |
| | 2 | 6 | 0 | 0 | 1 | 2 | 1 | 3 |
| | 4 | 6 | 0 | 0 | 1 | 3 | 1 | 3 |
| | 8 | 6 | 0 | 0 | 1 | 3 | 1 | 3 |
| | C1 | 6 | 0 | 0 | 1 | 3 | 1 | 3 |
| | C2 | 6 | 0 | 0 | 1 | 3 | 1 | 3 |
| 6 | 1 | 6 | 0 | 0 | 1 | 3 | 1 | 3 |
| | 2 | 6 | 0 | 0 | 1 | 3 | 1 | 3 |
| | 4 | 6 | 0 | 0 | 1 | 3 | 1 | 3 |
| | 8 | 6 | 0 | 0 | 1 | 3 | 1 | 3 |
| | C1 MP | 6 | 0 | 0 | 1 | 3 | 1 | 3 |
| | C2 | 6 | 0 | 0 | 1 | 3 | 1 | 3 |
| 7 | 1 ×83 | 6 | 0 | 0 | 1 | 3 | 1 | 3 |
| | 2 | 6 | 0 | 0 | 1 | 3 | 1 | 3 |
| | 4 | 6 | 0 | 0 | 1 | 3 | 1 | 3 |
| | 8 | 6 | 0 | 0 | 1 | 3 | 1 | 3 |
| | C1 | 6 | 0 | 0 | 1 | 3 | 1 | 3 |
| | C2 | 6 | 0 | 0 | 1 | 3 | 1 | 3 |
| 8 | 1 | 6 | 0 | 0 | 1 | 3 | 1 | 3 |
| | 2 | 6 | 2 | 0 | 1 | 3 | 1 | 3 |
| | 4 | 6 | 2 | 0 | 1 | 3 | 5 | 3 |
| | 8 | 6 | 2 | 0 | 1 | 3 | 5 | 3 |
| | C1 | 6 | 2 | 0 | 1 | 3 | 5 | 3 |
| | C2 | 6 | 2 | 0 | 1 | 3 | 5 | 3 |
| LH to RH trans. cycle 9 | 1 | 6 | 2 | 0 | 3 | 5 | 5 | 3 |
| | 2 | 6 | 2 | 0 | 7 | 5 | 5 | 3 |
| | 4 | 6 | 2 | 0 | 7 | 5 | 5 | 3 |
| | 8 | 6 | 2 | 0 | 7 | 5 | 5 | 3 |
| | C1 | 6 | 2 | 0 | 7 | 5 | 5 | 3 |
| | C2 | 6 | 2 | 0 | 7 | 5 | 5 | 3 |
| | | | | | | | Result | |

[1] Carry set up.

During each cycle of the compute commutator, positive mid cycle point pulses appear on wires 270, 272, 274 and 276 and are fed to all X plates. Since the only X plate conditioned at this time is the ×8 plate, we will confine our attention to this plate only.

Referring to Fig. 6 we see that ten diode gates comprise the ×8 plate. These diode gates, when impulsed from wires 270, 272, 274 and 276, will generate all the LH and RH components resulting from the multiplication of digits −1−, −2−, −4− and −8− by digit −8−.

Thus, the X plate output wires 550, 552 and 554 will carry the LH components to the MC register, while wires 556, 558, 560 and 562 will carry the RH components to the MC register.

It should be recalled, however, that only the MC output gates which are conditioned by digits stored therein will permit LH or RH values to pass along to the component registers.

Accordingly, we need consider only the active output wires leading from the ×8 plate. Since the MC tens order contains a −9− or binary −1− and −8−, the active output wires are 556, 562 and 554. MC units order contains a −1− which will be operated upon by the same wire 556 mentioned above.

We are now ready to trace the circuits which are active to form the various component values required in the sample problem.

Since secondary S1 is on during the first compute cycle, only the MC −1−'s will be operated upon. Therefore, only wire 556 is active during this cycle. Accordingly, no entries are effected until compute commutator S8 is on. Midway in this cycle point a differential −8− pulse appears on wire 276 to actuate the diode gate in the upper right corner of the ×8 plate. Thus, an −8− pulse is placed on output wire 556. This wire 556 applies a positive −8− pulse to the now conditioned tubes V522 in both MC orders. Thus, a negative −8− pulse appears on wires 124 and 128.

The −8− on wire 124 is transmitted via column shift gate #3, C204, wire 300 (see Fig. 3), associated distributor tube V266, and wire 524 to RH register H order stage S8 which is thereby turned on. When S8 turns on the adjusting circuits operate, in the manner explained in the description pertaining to the main embodiment, so that stages S2 and S4 are also turned on. Thus, digit −8− is registered as a binary −14−.

Simultaneously with this entry −8− into the H order, and −8− is entered into the T order as follows:

Wire 128, CS gate #7, capacitor C187, wire 446, associated distributor tube V266, wire 364 to RH register tens S8 which is thereby turned on. Again, the adjusting circuits in this order operated to register this −8− as a binary −14−.

Since the MC register contains no binary −2− or −4− values, the next two compute cycles will be ineffective to cause entry into the component registers. The MC tens order contains an −8− which will effect entries during the next cycle when secondary S4 is on.

During the fourth compute cycle, ×  plate output wires 554 and 562 will be actively involved in multiplying processes. When compute commutator stage S2 is on, a differential −2− pulse on wire 272 enters the ×8 plate, operates the upper diode gate and emerges as an LH −2− pulse on wire 554. This pulse proceeds to the LH component register by means of the following circuit: Wire 554, MC output tube V564 now conditioned, wire 122, CS gate #1 (see Fig. 3), wire 192, associated distributor tube V262, wire 370 to LH components TH order stage S2 which is thereby turned on.

When S4 is on, a differential −4− pulse on wire 274 enters the ×8 plate, and operates the upper diode gate to produce a differential −4− pulse on output wire 554. This −4− pulse on wire 554 traverses the following circuit: Wire 554, MC output tube V564, wire 122, CS gate #1 (Fig. 3), wire 192, associated distributor tube V264, wire 372 to LH components TH order stage S4 which is thereby turned on. Since a −2− was previously stored in this order, it now registers a total of −6−.

Simultaneous with the entry of −4− into the LH register a −4− is also entered into the RH register as follows: Wire 274, ×8 plate, diode gate connected to output wire 562, MC output tube V566, wire 124, CS gate #3 (Fig. 3), wire 300, associated distributor tube V264, wire 568 to RH register H order S4 which is thereby reversed in status. Since this order previously contained −8− which was registered as a binary −14−, stages S2, S4 and S8 were already on. When this entry of −4− is made, stage S4 switches off causing S8 to turn off. This stage S2 alone remains on as required. The turning off of S8 indicates that this order has passed through zero and, therefore, carry trigger CY is turned on. Actually, carry into the next higher order will be effected later in this cycle. When compute stage C1 turns on, wire 278 drops to a low potential to effect cut off bias of carry gate tubes V394. Since carry trigger CY in RH register H order is already on, the carry gate comprising tubes V392 and V394 will provide a positive pulse on wire 414 which is effective to turn on stage S1 in the RH register TH order. At the end of this fourth compute cycle, the LH register stands at –600– and the RH register stands at –1280–.

Prior to the completion of this fourth compute cycle as compute stage C2 turns on, a positive potential on wire 526 causes tube V528 to conduct. The resulting negative anode pulse on wire 530 is applied to switch secondary stage S4 off. As S4 switches off, S1 is switched on in a manner now familiar. Also as S4 switches off, associated tube V536 conducts to produce a negative output pulse on wire 184. This pulse on wire 184 is effective to switch trigger CST off. Since the MP units order contains a significant digit, in a manner now understood, the MP zero analyzer unit conditions associated circuits to cause the switching on of CSU. With CSU on, the CS switch unit is effective to switch the result register input lines to the next lower columnar positions. CSU is also effective to condition the MP output circuits so that the ×8 plate is deconditioned and the ×3 plate is conditioned. Thus, column shift has now taken place and the ×3 plate is selected for the purpose of multiplying the MC value –91– by MP digit –3–.

At the beginning of the next or fifth compute cycle, when compute stage S1 is on, a differential –1– pulse appearing on wire 270 enters the ×3 plate and operates the upper left diode gate whose output is connected to wire 556. This –1– pulse traverses the following circuit: Wire 556, MC tube V522 in the tens order and tube V522 in the units order. The tens order output is traced via wire 124, CS gate #4 (Fig. 3) now conditioned because CSU is on, wire 502, capacitor C187, wire 446, associated distributor tube V306, wire 504 to the right-hand register T order stage S1 which is thereby turned on. This order now registers a –9– as a binary –15–.

This differential –1– pulse on wire 556 branches off at the MC units output tube V522 to wire 128, CS gate #8, wire 498, associated distributor tube 306, wire 500 to the RH register U order stage S1 which is thereby turned on.

During the next cycle point when compute stage S2 is on, a –2– will be entered into RH register units and tens orders as follows: Wire 272, ×3 plate through upper center diode gate connected to output wire 556, MC tens output tube V522 and wire 124, CS gate #4, wire 502, capacitor C187, wire 446, associated distributor tube V262, wire 508, to the RH tens order S2 which thereby reverses its status. Since this order contained a –9– registered as a binary –15–, all stages were on. Therefore, this differential –2– pulse switches S2 off. S2 switches S4 off, S4 switches S8 off, and S8 switches carry trigger CY on. It can be seen that S1 and CY are the only triggers remaining on at this time. The differential –2– pulse on wire 556 branches into a second channel as follows: Wire 556, MC units tube V522, wire 128, CS gate #8 (Fig. 3), wire 498, associated distributor tube V262, wire 506 to RH register U order stage S2 which is thereby turned on. No further entries occur during the adding portion of this cycle. However, since RH tens order carry trigger is now on, carry will be effected into the hundreds order when compute commutator stage C1 turns on. Therefore, at the end of this fifth compute cycle the left-hand register contains the value –600– and the RH register contains the value –1313–. During the next two compute cycles, no entries will be effected into the component registers because the MC register contains no –2's– or –4's–. During the next or eighth compute cycle, the differential –2– and –4– pulses will be entered into the component registers as follows: The differential –2– pulse on wire 272 enters the ×3 plate, operates the lower diode gate and emerges on wire 554. This –2– pulse on wire 554 operates MC tens tube V564 and appears on wire 122, traverses through CS gate #2, wire 268, C282, wire 354, associated distributor tube V262, wire 510 to LH register H order stage S2 which thereby is turned on. During the next cycle point, a differential –4– pulse on wire 274 enters the ×3 plate, operates the upper right gate, and emerges on wire 562. From wire 562 the pulse traverses through MC output tube V566, wire 124, CS gate #4, wire 502, C187, wire 446, associated distributor tube V264, wire 512 to the RH register T order stage S4 which thereby is turned on. No further entries or carries are called for during the balance of this eighth computing cycle.

At this time, the LH register contains the value –620– and the RH register contains the value –1353–. Since the LH register comprises the TH, H and tens orders only, this value –620– represents the accumulated LH components totaling –6200–. During the final or ninth cycle, this value –6200– must be transferred to the RH register. The sum of the LH components –6200– and the RH components –1353– now total up to –7553– which is the correct product resulting from multiplication of –91–×–83–. Since the transfer operation is identical to that previously described, repetition will not be made here.

What is claimed is:

1. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising MP and MC registers each comprising for each order a group of counter tubes selected ones of which register the respective MP and MC digits in response to corresponding digital impulses at the input of the group, a compute commutator comprising a source of a repetitive series of code pulses each representing one of a code of components which can be added to form all digits, a code channelling network for each possible MP digit comprising a plurality of gates capable when conditioned for operation of passing all code pulses from the compute commutator required to form the product of that possible MP digit by all possible MC digits, means whereby a registering tube in each order of the MP counter may successively condition for operation the network corresponding to the digit registered by that tube and means whereby one registering tube in each order of the MC counter concurrently may select from the network so conditioned for operation for each MP order successively only those code pulses required to form the product of the registered MP digits by the registered MC quantity, a column shift switch for shifting all pulses thus selected into their proper order, partial products accumulators for the PR comprising for each order tubes to receive pulses corresponding to each code component, a distributor controlled by code pulses from the compute commutator for distributing all the pulses thus selected into their corresponding tubes in the partial products accumulators for the PR, means in the networks, the column shift switch, the distributor and the accumulators for keeping the pulses representing LH and RH partial products separate until all have been accumulated, transfer means for thereafter combining the LH and RH partial products to indicate the PR, and means by which the transfer means is controlled by the compute commutator, and in which the compute commutator repeats its series of code pulses for all MP orders until all partial products have been formed, and then repeats the series once for operation of the transfer means.

2. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising MP and MC registers each comprising for each order a group of counter tubes selected ones of which register the respective MP and MC digits in response to corresponding digital impulses at the input of the group, a compute commutator comprising a source of a repetitive series of code pulses each representing one of a code of components which can be added to form all digits, a code channelling network for each possible MP digit comprising a plurality of gates capable when conditioned for operation of passing all code pulses from the compute commutator required to form the product of that possible MP digit by all possible MC digits, means whereby a registering tube in each order of the MP counter may successively condition for operation the network corresponding to the digit registered by that tube and means whereby one registering tube in each order of the MC counter concurrently may select from the network so conditioned for operation for each MP order successively only those code pulses required to form the product of the registered MP digits by the registered MC quantity, both of said MP and MC registers comprising a counter tube for each decimal digit for each order, the compute commutator repeating its series of code pulses once for each MP order, and means responsive to the occurrence of a zero in any MP order for causing the machine to skip that order.

3. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising MP and MC registers each comprising for each order a group of counter tubes selected ones of which register the respective MP and MC digits in response to corresponding digital impulses at the input of the group, a compute commutator comprising a source of a repetitive series of code pulses each representing one of a code of components which can be added to form all digits, a code channelling network for each possible MP digit comprising a plurality of gates capable when conditioned for operation of passing all code pulses from the compute commutator required to form the product of that possible MP digit by all possible MC digits, means whereby a registering tube in each order of the MP counter may successively condition for operation the network corresponding to the digit registered by that tube and means whereby one registering tube in each order of the MC counter concurrently may select from the network so conditioned for operation for each MP order successively only those code pulses required to form the product of the registered MP digits by the registered MC quantity, said MP register having a counter tube for each decimal digit in the MP for each order thereof, the MC register having in each order a counter tube for each code component whereby MC decimal digits are indicated by the counter tubes in terms of the code, the compute commutator repeating its series of code pulses for each MP order a number of times equal to number of code components.

4. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising MP and MC registers each comprising for each order a group of counter tubes selected ones of which register the respective MP and MC digits in response to corresponding digital impulses at the input of the group, a compute commutator comprising a source of a repetitive series of code pulses each representing one of a code of components which can be added to form all digits, a code channelling network for each possible MP digit comprising a plurality of gates capable when conditioned for operation of passing all code pulses from the compute commutator required to form the product of that possible MP digit by all possible MC digits, means whereby a registering tube in each order of the MP counter may successively condition for operation the network corresponding to the digit registered by that tube and means whereby one registering tube in each order of the MC counter concurrently may select from the network so conditioned for operation for each MP order successively only those code pulses required to form the product of the registered MP digits by the registered MC quantity, said MP register having a counter tube for each decimal digit in the MP for each order thereof, the MC register having in each order a counter tube for each code component whereby MC decimal digits are indicated by the counter tubes in terms of the code, the compute commutator repeating its series of code pulses for each MP order a number of times equal to number of code components, and means responsive to the occurrence of a zero in any MP order for causing the machine to skip that order.

5. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising MP and MC registers each comprising for each order a group of counter tubes selected ones of which register the respective MP and MC digits in response to corresponding digital impulses at the input of the group, a compute commutator comprising a source of a repetitive series of code pulses each representing one of a code of components which can be added to form all digits, a code channelling network for each possible MP digit comprising a plurality of gates capable when conditioned for operation of passing all code pulses from the compute commutator required to form the product of that possible MP digit by all possible MC digits, means whereby a registering tube in each order of the MP counter may successively condition for operation the network corresponding to the digit registered by that tube means whereby one registering tube in each order of the MC counter concurrently may select from the network so conditioned for operation for each MP order successively only those code pulses required to form the product of the registered MP digits by the registered MC quantity, said MC register comprising tubes arranged to indicate decimal digits in terms of the code of components, and including means whereby the series of code pulses is repeated by the compute commutator for each order of the MP counters once for each code component.

6. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising MP and MC registers each comprising for each order a group of counter tubes selected ones of which register the respective MP and MC digits in response to corresponding digital impulses at the input of the group, a compute commutator comprising a source of a repetitive series of code pulses each representing one of a code of components which can be added to form all digits, a code pulse channelling network for each possible MP digit comprising a plurality of gates selectively connected with the compute commutator so as to be capable when conditioned for operation of passing from the compute commutator to the MC register all groupings of code pulses required for form the products of that possible MP digit by all possible MC digits, a column shift commutator for activating successively for each order the MP groups of counter tubes whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulses required to form the product of the registered MP digits for each order successively by the registered MC quantity, a column shift switch controlled by the column shift commutator for shifting all the pulses thus selected into their proper order, partial products accumulators for the PR comprising tubes to receive pulses corresponding to each code component, a distributor controlled by code pulses from the compute commutator for distributing all the pulses thus selected into their corresponding tubes in the partial products accumulators for the PR, means in the networks, the column shift switch, the distributor and the accumulators for keeping the pulses representing LH and RH partial products separate until all have been accumulated, transfer means for thereafter combining the LH and RH partial products to indicate the PR, and means by which the transfer means is controlled by the compute commutator, and in which the compute commutator repeats its series of code pulses for all MP orders until all partial products have been formed, and then repeats the series once for operation of the transfer means.

7. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising MP and MC registers each comprising for each order a group of counter tubes selected ones of which register the respective MP and MC digits in response to corresponding digital impulses at the input of the group, a compute commutator comprising a source of a repetitive series of code pulses each representing one of a code of components whch can be added to form all digits, a code pulse channelling network for each possible MP digit comprising a plurality of gates selectively connected with the compute commutator so as to be capable when conditioned for operation of passing from the compute commutator to the MC register all groupings of code pulses required to form the products of that possible MP digit by all possible MC digits, a column shift commutator for activating successively for each order the MP groups of counter tubes whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulses required to form the product of the registered MP digits for each order successively by the registered MC quantity, both said MP and MC registers comprising a counter tube for each decimal digit for each order, the compute commutator repeating its series of code pulses once for each MP order, and means responsive to the occurrence of a zero in any MP order for causing the machine to skip that order.

8. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising MP and MC registers each comprising for each order a group of counter tubes selected ones of which register the respective MP and MC digits in response to corresponding digital impulses at the input of the group, a compute commutator comprising a source of a repetitive series of code pulses each representing one of a code of components which can be added to form all digits, a code pulse channelling network for each possible MP digit comprising a plurality of gates selectively connected with the compute commutator so as to be capable when conditioned for operation of passing from the compute commutator to the MC register all groupings of code pulses required to form the products of that possible MP digit by all possible MC digits, a column shift commutator for activating successively for each order the MP groups of counter tubes whereby a registering tube in each order of the MP counter may successively condition for operation all gates in the network corresponding to the digit registered by that tube and means whereby one registering tube in each order of the MC counter concurrently may select from the network so conditioned fo roperation for each MP order successively only those code pulses required to form the product of the registered MP digits for each order successively by the registered MC quantity, said MP register having a counter tube for each decimal digit in the MP for each order thereof, the MC register having in each order a counter tube for each code component whereby MC decimal digits are indicated by the counter tubes in terms of the code, the compute commutator repeating its series of code pulses for each MP order a number of times equal to number of code components.

9. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising MP and MC registers each comprising for each order a group of counter tubes selected ones of which register the respective MP and MC digits in response to corresponding digital impulses at the input of the group, a compute commutator comprising a source of a repetitive series of code pulses each representing one of a code of components which can be added to form all digits, a code pulse channelling network for each possible MP digit comprising a plurality of gates selectively connected with the compute commutator so as to be capable when conditioned for operation of passing from the compute commutator to the MC register all groupings of code pulses required to form the products of that possible MP digit by all possible MC digits, a column shift commutator for activating successively for each order the MP groups of counter tubes whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulses required to form the product of the registered MP digits for each order successively by the registered MC quantity, said MP register having a counter tube for each decimal digit in the MP for each order thereof, the MC register having in each order a counter tube for each code component whereby MC decimal digits are indicated by the counter tubes in terms of the code, the compute commutator repeating its series of code pulses for each MP order a number of times equal to number of code components, and means responsive to the occurrence of a zero in any MP order for causing the machine to skip that order.

10. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising read mechanisms for cards having digital positions for recordation of all possible MP and MC digits including specifically recorded MP and MC digital positions, comprising sensing means for sensing the recorded digital positions as the card and sensing means move relative to each other, means for generating a series of impulses synchronously with the passage of the sensing means past all digital positions, and trigger means responsive to the sensing of a recorded digital position for separating the remainder of the series of impulses as an indication of the recorded digital position; MP and MC registers each comprising for each order a series of counter tubes selected ones of which register the respective MP and MC digits in response to the introduction of the remainder of the impulses at the input of the series of tubes, a compute commutator comprising a source of a repetitive series of code pulses each representing one of a code of components which can be added to form all digits, a code pulse channelling network for each possible MP digit comprising a plurality of diode gates selectively connected with the compute commutator so as to be capable when conditioned for operation of passing from the compute commutator to the MC register all groupings of code pulses required to form the products of that possible MP digit by all possible MC digits, means whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulse groupings required to form the product of the registered MP digits by the registered MC quantity, a column shift switch for shifting all the pulses thus selected into their proper order, partial products accumulators for the PR comprising tubes for each order to receive laterally and serially pulses corresponding to each code component, a distributor controlled by code pulses from the compute commutator for distributing all the pulses thus selected into their corresponding tubes in the partial products accumulators for the PR, means in the networks, the column shift switch, the distributor and the accumulators for keeping the pulses representing LH and RH partial products separate until all have been accumulated, transfer means for thereafter combining the LH and RH partial products to indicate the PR, means for thereafter recording the PR in digital positions on cards from which the MP and MC have been read, and means by which the transfer means is controlled by the compute commutator and in which the compute commutator repeats its series of code pulses for all MP orders until all partial products have been accumulated and then repeats the series once for operation of the transfer means.

11. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising read mechanisms for cards having digital positions for recordation of all possible MP and MC digits including specifically recorded MP and MC digital positions, comprising sensing means for sensing the recorded digital positions as the card and sensing means move relative to each other, means for generating a series of impulses synchronously with the passage of the sensing means past all digital positions, and trigger means responsive to the sensing of a recorded digital position for separating the remainder of the series of impulses as an indication of the recorded digital position; MP and MC registers each comprising for each order a series of counter tubes selected ones of which register the respective MP and MC digits in response to the introduction of the remainder of the impulses at the input of the series of tubes, a compute commutator comprising a source of a repetitive series of code pulses each representing one of a code of components which can be added to form all digits, a code pulse channelling network for each possible MP digit comprising a plurality of diode gates selectively connected with the compute commutator so as to be capable when conditioned for operation of passing from the compute commutator to the MC register all groupings of code pulses required to form the products of that possible MP digit by all possible MC digits, means whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulse groupings required to form the product of the registered MP digits by the registered MC quantity, both said MP and MC registers comprising a counter tube for each decimal digit for each order, the compute commutator repeating its series of code pulses once for each MP order, and means responsive to the occurrence of a zero in any MP order for causing the machine to skip that order.

12. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising read mechanisms for cards having digital positions for recordation of all possible MP and MC digits including specifically recorded MP and MC digital positions, comprising sensing means for sensing the recorded digital positions as the card and sensing means move relative to each other, means for generating a series of impulses synchronously with the passage of the sensing means past all digital positions, and trigger means responsive to the sensing of a recorded digital position for separating the remainder of the series of impulses as an indication of the recorded digital position; MP and MC registers each comprising for each order a series of counter tubes selected ones of which register the respective MP and MC digits in response to the introduction of the remainder of the impulses at the input of the series of tubes, a compute commutator comprising a source of a repetitive series of code pulses each representing one of a code of components which can be added to form all digits, a code pulse channelling network for each possible MP digit comprising a plurality of diode gates selectively connected with the compute commutator so as to be capable when conditioned for operation of passing from the compute commutator to the MC register all groupings of code pulses required to form the products of that possible MP digit by all possible MC digits, means whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulse groupings required to form the product of the registered MP digits by the registered MC quantity, the MP register having a counter tube for each decimal digit in the MP for each order thereof, the MC register having in each order a counter tube for each code component whereby MC decimal digits are indicated by the counter tubes in terms of the code, the compute commutator repeating its series of code pulses for each MP order a number of times equal to number of code-components.

13. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising read mechanisms for cards having digital positions for recordation of all possible MP and MC digits including specifically recorded MP and MC digital positions, comprising sensing means for sensing the recorded digital positions as the card and sensing means move relative to each other, means for generating a series of impulses synchronously with the passage of the sensing means past all digital positions, and trigger means responsive to the sensing of a recorded digital position for separating the remainder of the series of impulses as an indication of the recorded digital position; MP and MC registers each comprising for each order a series of counter tubes selected ones of which register the respective MP and MC digits in response to the introduction of the remainder of the impulses at the input of the series of tubes, a compute commutator comprising a source of a repetitive series of code pulses each representing one of a code of components which can be added to form all digits, a code pulse channelling network for each possible MP digit comprising a plurality of diode gates selectively connected with the compute commutator so as to be capable when conditioned for operation of passing from the compute commutator to the MC register all groupings of code pulses required to form the products of that possible MP digit by all possible MC digits, means whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulse groupings required to form the product of the registered MP digits by the registered MC quantity, the MP register having a counter tube for each decimal digit in the MP for each order thereof, the MC register having in each order a counter tube for each code component whereby MC decimal digits are indicated by the counter tubes in terms of the code, the compute commutator repeating its series of code pulses for each MP order a number of times equal to number of code components, and means responsive to the occurrence of a zero in any MP order for causing the machine to skip that order.

14. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising read mechanisms for cards having digital positions for recordation of all possible MP and MC digits including specifically recorded MP and MC digital positions, comprising sensing means for sensing the recorded digital positions as the card and sensing means move relative to each other, means for generating a series of impulses synchronously with the passage of the sensing means past all digital positions, and trigger means responsive to the sensing of a recorded digital position for separating the remainder of the series of impulses as an indication of the recorded digital position; MP and MC registers each comprising for each order a series of counter tubes selected ones of which register the respective MP and MC digits in response to the introduction of the remainder of the impulses at the input of the series of tubes, a compute commutator comprising a source of a repetitive series of code pulses each representing one of a code of components which can be added to form all digits, a code pulse channelling network for each possible MP digit comprising a plurality of diode gates selectively connected with the compute commutator so as to be capable when conditioned for operation of passing from the compute commutator to the MC register all groupings of code pulses required to form the products of that possible MP digit by all possible MC digits, means whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulse groupings required to form the product of the registered MP digits by the registered MC quantity, the MC register comprising tubes arranged to indicate decimal digits in terms of the code of components, and including means whereby the series of code pulses is repeated by the compute commutator for each order of the MP counters once for each code component.

15. A machine adapted to compute the product (PR) resulting from the multiplication of a multiplicand (MC) by multiplier (MP), wherein the digit (RH) designates the lower order digit in said product and the digit (LH) designates the higher order digit therein, said machine comprising read mechanisms for cards having digital positions for recordation of all possible MP and MC digits including specifically recorded MP and MC digital positions, comprising sensing means for sensing the recorded digital positions as the card and sensing means move relative to each other, means for generating a series of impulses synchronously with the passage of the sensing means past all digital positions, and trigger means responsive to the sensing of a recorded digital position for separating the remainder of the series of impulses as an indication of the recorded digital position; MP and MC registers each including for each order a series of counter tubes selected ones of which register the respective MP and MC digits in response to the introduction of the remainder of the impulses at the input of the series of tubes, a compute commutator comprising a source of a repetitive series of code pulses each representing one of a binary code of components which can be added to form all decimal digits, a code pulse channelling network for each possible MP digit comprising a plurality of diode gates selectively connected with the compute commutator so as to be capable when conditioned for operation of passing from the compute commutator to the MC register all groupings of code pulses required to form the products of that possible MP digit by all possible MC digits, a column shift commutator for activating successively for each order the MP groups of counter tubes whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulse groupings required to form the product of the registered MP digits for each order successively by the registered MC quantity, a column shift switch controlled by the column shift commutator for shifting all the pulses thus selected into their proper order, partial products accumulators for the PR comprising tubes to receive laterally and serially pulses corresponding to each code component, a distributor controlled by code pulses from the compute commutator for distributing all the pulses thus selected into their corresponding tubes in the partial products accumulators for the PR, means in the network, the column shift switch, the distributor and the accumulators for keeping the pulses representing LH and RH partial products separate until all have been accumulated, transfer means for thereafter combining the LH and RH partial products to indicate the PR, and means by which the transfer means is controlled by the compute commutator and in which the compute commutator repeats its series of code pulses for all MP orders until all partial products have been accumulated and then repeats the series once for operation of the transfer means.

16. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising read mechanisms for cards having digital positions for recordation of all possible MP and MC digits including specifically recorded MP and MC digital positions, comprising sensing means for sensing the recorded digital positions as the card and sensing means move relative to each other, means for generating a series of impulses synchronously with the passage of the sensing means past all digital positions, and trigger means responsive to the sensing of a recorded digital position for separating the remainder of the series of impulses as an indication of the recorded digital position; MP and MC registers each including for each order a series of counter tubes selected ones of which register the respective MP and MC digits in response to the introduction of the remainder of the impulses at the input of the series of tubes, a compute commutator comprising a source of a repetitive series of code pulses each representing one of a binary code of components which can be added to form all decimal digits, a code pulse channelling network for each possible MP digit comprising a plurality of diode gates selectively connected with the compute commutator so as to be capable when conditioned for operation of passing from the compute commutator to the MC register all groupings of code pulses required to form the products of that possible MP digit by all possible MC digits, a column shift commutator for activating successively for each order the MP groups of counter tubes whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulse groupings required to form the product of the registered MP digits for each order successively by the registered MC quantity, both said MP and MC registers comprising a counter tube for each decimal digit for each order, the compute commutator repeating its series of code pulses once for each MP order, and means responsive to the occurrence of a zero in any MP order for causing the machine to skip that order.

17. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising read mechanisms for cards having digital positions for recordation of all possible MP and MC digits including specifically recorded MP and MC digital positions, comprising sensing means for sensing the recorded digital positions as the card and sensing means move relative to each other, means for generating a series of impulses synchronously with the passage of the sensing means past all digital positions, and trigger means responsive to the sensing of a recorded digital position for separating the remainder of the series of impulses as an indication of the recorded digital position; MP and MC registers each including for each order a series of counter tubes selected ones of which register the respective MP and MC digits in response to the introduction of the remainder of the impulses at the input of the series of tubes, a compute commutator comprising a source of a repetitive series of code pulses each representing one of a binary code of components which can be added to form all decimal digits, a code pulse channelling network for each possible MP digit comprising a plurality of diode gates selectively connected with the compute commutator so as to be capable when conditioned for operation of passing from the compute commutator to the MC register all groupings of code pulses required to form the products of that possible MP digit by all possible MC digits, a column shift commutator for activating successively for each order the MP groups of counter tubes whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulse groupings required to form the product of the registered MP digits for each order successively by the registered MC quantity, the MP register having a counter tube for each decimal digit in the MP for each order thereof, the MC register having each order a counter tube for each code component whereby MC decimal digits are indicated by the counter tubes in terms of the code, the compute commutator repeating its series of code pulses for each MP order a number of times equal to number of code components.

18. A machine adapted to compute the product (PR) resulting from the multiplication of a multiplicand (MC) by a multiplier (MP), wherein the digit (RH) designates the lower order digit in said product and the digit (LH) designates the higher order digit therein, said machine comprising read mechanisms for cards having digital positions for recordation of all possible MP and MC digits including specifically recorded MP and MC digital positions, comprising sensing means for sensing the recorded digital positions as the card and sensing means move relative to each other, means for generating a series of impulses synchronously with the passage of the sensing means past all digital positions, and trigger means responsive to the sensing of a recorded digital position for separating the remainder of the series of impulses as an indication of the recorded digital position; MP and MC registers each including for each order a series of counter tubes selected ones of which register the respective MP and MC digits in response to the introduction of the remainder of the impulses at the input of the series of tubes, a compute commutator comprising a source of a repetitive series of code pulses each representing one of a binary code of components which can be added to form all decimal digits, a code pulse channelling network for each possible MP digit comprising a plurality of diode gates selectively connected with the compute commutator so as to be capable when conditioned for operation of passing from the compute commutator so as to be capable when conditioned for operation of passing from the compute commutator to the MC register all groupings of code pulses required to form the products of that possible MP digit by all possible MC digits, a column shift commutator for activating successively for each order the MP groups of counter tubes whereby a registering tube in each order of the MP counter may successively condition for operation all gates in the network corresponding to the digit registered by that tube and means whereby one registering tube in each order of the MC counter concurrently may select from the network so conditioned for operation for each MP order successively only those code pulse groupings required to form the product of the registered MP digits for each order successively by the registered MC quantity, the MP register having a counter tube for each decimal digit in the MP for each order thereof, the MC register having in each order a counter tube for each code component whereby MC decimal digits are indicated by the counter tubes in terms of the code, the compute commutator repeating its series of code pulses for each MP order a number of times equal to number of code components, and means responsive to the occurrence of a zero in any MP order for causing the machine to skip that order.

References Cited in the file of this patent

UNITED STATES PATENTS

| | | |
|---|---|---|
| 2,344,885 | Kozma et al. | Mar. 21, 1944 |
| 2,404,047 | Flory et al. | July 16, 1946 |
| 2,409,689 | Morton | Oct. 22, 1946 |
| 2,442,428 | Mumma | June 1, 1948 |
| 2,490,362 | Lake et al. | Dec. 6, 1949 |
| 2,521,788 | Grosdoff | Sept. 12, 1950 |
| 2,575,331 | Compton | Nov. 20, 1951 |

(Other references on following page)

UNITED STATES PATENTS

| | | |
|---|---|---|
| 2,587,979 | Dickinson | Mar. 4, 1952 |
| 2,624,507 | Phelps | Jan. 6, 1953 |
| 2,624,508 | Dickinson | Jan. 6, 1953 |
| 2,638,267 | Hartley | May 12, 1953 |
| 2,672,283 | Havens | Mar. 16, 1954 |

OTHER REFERENCES

Burks: "Electronic Computing Circuits of the Eniac," Proc. of IRE vol. 35, No. 8, August 1947, pp. 758 to 766.

"Synthesis of Electronic Computing and Control Circuits," vol. XXVII, Staff of Computation Lab., Harvard University, Harvard Press, 1951, date on file in Library of Congress, May 17, 1951, pp. 182 to 189, 198 to 203.

"Description of a Magnetic Drum Calculator," vol. XXV, Staff of Comp. Lab., Harvard Univ., Harvard Press. Copyright Aug. 22, 1952, pp. 100–110, 187 to 196.

UNITED STATES PATENT OFFICE
CERTIFICATE OF CORRECTION

Patent No. 2,895,672                                                      July 21, 1959

Arthur H. Dickinson

It is hereby certified that error appears in the printed specification of the above numbered patent requiring correction and that the said Letters Patent should read as corrected below.

Column 15, line 45, for "one" read -- on --; column 41, line 35, for "whch" read -- which --; column 42, line 11, for "fo roperation" read -- for operation --; column 48, lines 39 to 41, strike out "so as to be capable when conditioned for operation of passing from the compute commutator".

Signed and sealed this 19th day of January 1960.

(SEAL)
Attest:

KARL H. AXLINE                                               ROBERT C. WATSON
Attesting Officer                                         Commissioner of Patents